(12) United States Patent
McIntosh et al.

(10) Patent No.: US 10,311,694 B2
(45) Date of Patent: Jun. 4, 2019

(54) SYSTEM AND METHOD FOR ADAPTIVE INDIRECT MONITORING OF SUBJECT FOR WELL-BEING IN UNATTENDED SETTING

(71) Applicant: EMPOWERYU, INC., Santa Clara, CA (US)

(72) Inventors: Laura Janet McIntosh, Santa Clara, CA (US); Jeffrey Mark Sieracki, Silver Spring, MD (US); Kirk Wagner, Laurel, MD (US)

(73) Assignee: Empoweryu, Inc., Santa Clara, CA (US)

( * ) Notice: Subject to any disclaimer, the term of this patent is extended or adjusted under 35 U.S.C. 154(b) by 688 days.

(21) Appl. No.: 14/876,648

(22) Filed: Oct. 6, 2015

(65) Prior Publication Data

US 2016/0027278 A1    Jan. 28, 2016

Related U.S. Application Data

(63) Continuation-in-part of application No. 14/616,459, filed on Feb. 6, 2015.

(60) Provisional application No. 62/060,355, filed on Oct. 6, 2014, provisional application No. 61/936,575, filed on Feb. 6, 2014.

(51) Int. Cl.
*G06N 5/04* (2006.01)
*G08B 21/04* (2006.01)

(52) U.S. Cl.
CPC ......... *G08B 21/0423* (2013.01); *G06N 5/045* (2013.01); *G08B 21/0484* (2013.01); *G08B 21/0469* (2013.01)

(58) Field of Classification Search
CPC ...... G06F 3/0484; G06Q 50/22; G06Q 10/06; G06N 99/005; G06N 5/025; G06N 7/005; G06K 9/6256; G06K 9/6269
See application file for complete search history.

(56) References Cited

U.S. PATENT DOCUMENTS

| | | |
|---|---|---|
| 5,751,214 A | 5/1998 | Crowley et al. |
| 6,540,674 B2 | 4/2003 | Zadrozny et al. |
| 6,614,348 B2 | 9/2003 | Ciccolo et al. |
| 6,821,258 B2 | 11/2004 | Reed et al. |

(Continued)

*Primary Examiner* — Scott A. Waldron
*Assistant Examiner* — Ababacar Seck
(74) *Attorney, Agent, or Firm* — Rosenberg, Klein & Lee

(57) ABSTRACT

A system is provided for event-based monitoring of a subject's well-being within an unattended setting. A plurality of sensors are disposed within the setting for sensing disparate events, and an analytics processing portion is coupled to the sensors to collectively acquire sensing data therefrom, and map a plurality of sensed data points for a selected combination of disparate events to a conduct adaptively characterized for the subject. The mapping occurs according to a set of pre-established reference event patterns, relative to which each characterized conduct is screened for excessive aberration. The analytics processing portion actuates generation of a graphic user interface displaying at least one reporting page. The reporting page contains for each characterized conduct certain graphic indicia determined responsive to the screening thereof. At least one wirelessly coupled monitoring device actuates responsive to the analytics processing portion to render the graphic user interface for a remotely monitoring user.

19 Claims, 21 Drawing Sheets

(56) References Cited

U.S. PATENT DOCUMENTS

| | | |
|---|---|---|
| 6,950,017 B2 | 9/2005 | Smith |
| 6,989,742 B2 | 1/2006 | Ueno et al. |
| 7,113,090 B1 | 9/2006 | Saylor et al. |
| 7,145,461 B2 | 12/2006 | Lehrman et al. |
| 7,188,151 B2 | 3/2007 | Kumar et al. |
| 7,369,680 B2 | 5/2008 | Trajkovic et al. |
| 7,552,030 B2 | 6/2009 | Guralnik et al. |
| 7,589,637 B2 | 9/2009 | Bischoff et al. |
| 8,164,444 B2 | 4/2012 | Anderson et al. |
| 8,164,461 B2 | 4/2012 | Bischoff |
| 8,454,507 B2 | 6/2013 | Tremper et al. |
| 8,682,952 B2 | 3/2014 | Kutzik et al. |
| 2002/0118121 A1* | 8/2002 | Lehrman ............... A61B 5/0205 340/870.16 |
| 2003/0096590 A1 | 5/2003 | Satoh |
| 2005/0137465 A1 | 6/2005 | Cuddihy et al. |
| 2005/0234310 A1 | 10/2005 | Alwan et al. |
| 2007/0208263 A1* | 9/2007 | John .................... A61B 5/0452 600/509 |
| 2008/0084296 A1* | 4/2008 | Kutzik ................ G06F 19/3418 340/540 |
| 2009/0322540 A1 | 12/2009 | Richardson et al. |
| 2010/0223071 A1 | 9/2010 | Kland et al. |
| 2011/0173323 A1 | 7/2011 | Fimbel et al. |
| 2012/0083701 A1* | 4/2012 | Osorio ................ A61B 5/4094 600/483 |
| 2013/0095459 A1* | 4/2013 | Tran .................... A61B 5/6816 434/247 |
| 2014/0074504 A1 | 3/2014 | Nelson et al. |
| 2014/0257047 A1* | 9/2014 | Sillay ....................... A61B 5/11 600/301 |
| 2014/0279740 A1 | 9/2014 | Wernevi et al. |

\* cited by examiner

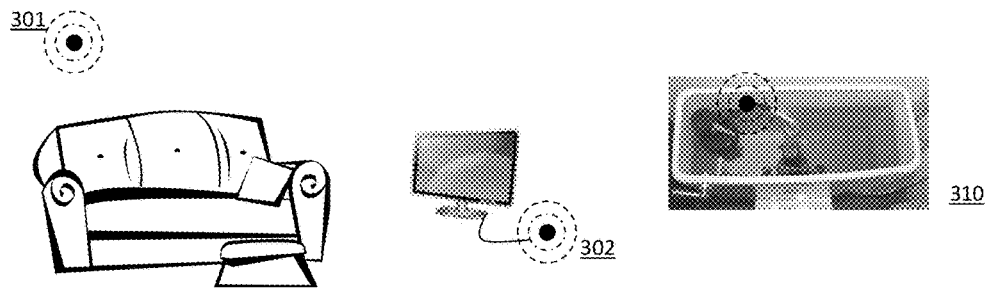
FIG. 3(A)
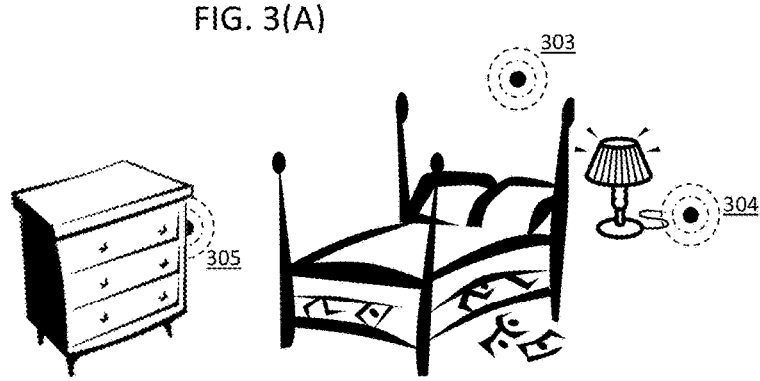
FIG. 3(B)
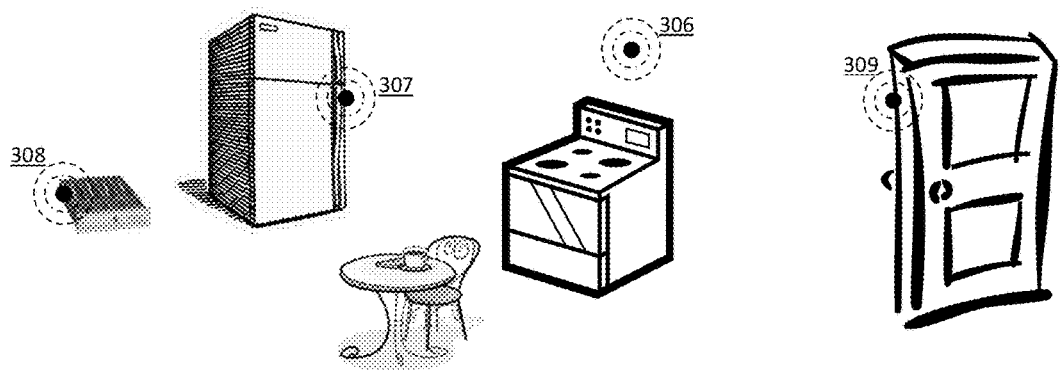
FIG. 3(C)
FIG. 3(D)

| Responder | Priority 8am-6pm | Priority 6pm - 8am |
|---|---|---|
| Person A | 1 | 2 |
| Person B | 2 | 1 |
| Person C | 3 | 3 |
| Person D | 4 | 4 |
| Default / Fallback | 5 | 5 |

FIG. 17B

SYSTEM AND METHOD FOR ADAPTIVE INDIRECT MONITORING OF SUBJECT FOR WELL-BEING IN UNATTENDED SETTING

RELATED APPLICATION DATA

This application is a Continuation-In-Part of co-pending patent application Ser. No. 14/616,459, filed 6 Feb. 2015; and is based on Provisional Patent Application No. 62/060,355, filed 6 Oct. 2014.

BACKGROUND OF THE INVENTION

The present invention is generally directed to the field of detection and monitoring of a subject's living activities. More specifically, it is directed to a system and method for indirect yet adaptive monitoring of an individual or other living subject's well-being within a predefined setting. The system and method in various embodiments provide for the adaptive monitoring for anomalous conduct within the predefined setting sufficient to raise concerns of the subject's well-being, as well as for confirmation of normal conduct. In certain applications, for example, the system and method provide for the remote autonomous monitoring of an elderly, disabled, or otherwise infirm subject within their usual dwelling place to alert another when sufficiently anomalous conduct is detected. Depending on the application, the system and method may also determine based on such factors as patterns of monitored activity the degree to which the presence or absence of certain activity is anomalous. The system and method provide for such monitoring in a discreet and minimally intrusive but highly effective manner.

One's home is a place of comfort, independence, familiarity, and happy memories, and an increasing number of people choose to remain in their own homes for as long as possible, despite increasing infirmities as they get older. However, the elderly are especially vulnerable to falls or sudden illness, and families worry about the safety of loved ones alone at their homes. Attempting to address these issues, some families employ a professional caregiver; but this tends to be expensive and is only reassuring for the time the caregiver is at the home. Communication technologies, such as phones and emergency buttons and similar devices known in the art tend to be effective only so long as an elder is physically willing and able to reach out for help. Legacy security technologies, like video surveillance cameras, are often seen as very intrusive by elders. Moreover, wearable sensors and personal emergency buttons are effective only to the extent the aging adults actively cooperate by actually carrying them at all times. Many elders are either unable to consistently remember, or are not entirely willing to carry such personal sensors.

In a similar vein, families or caregivers may wish to similarly monitor the well-being of individuals who may not necessarily be of advanced age, but have physical or mental disabilities. Others may wish to monitor those who may be able to function independently in many degrees but for various other reasons may have limited ability to call for help or report problems during unusual or unexpected situations. Still, some families may be interested in monitoring the status of young-adult children or other individuals who are of lawful age to be left unattended in the family home, but may actually lack the maturity to reliably and responsibly respond to potential situations that may arise.

Systems known in the art have generally provided for highly invasive systems, such as surveillance cameras, which are often unacceptable to one or another party involved in the monitoring process due to privacy issues. Other systems known in the art have exploited sensors, but report excessive volumes of unfiltered, raw, detailed information to be of practical use to a monitoring user. Too much information similarly tends to create privacy issues, for example by showing a subject's exact location in the house, or reporting their bathroom or other intimate personal habits. Too much information also tends to create information overload for the monitoring user—leaving the end user to sift through, for example, overly detailed movement graphs or sensor trip-time information in order to make sense of what conduct the subject person is actually engaged in.

Systems known in the art have also focused, in general, on the direct measurement of events or occurrences of interest. For example, the focus may be placed on when a monitored individual is in bed, sitting on a particular chair, or opening their medicine chest. Though some pattern detection has been considered, these systems are highly limited in their ability to infer behaviors or events that are not actually measured directly.

Additionally, the well-being of individuals within a controlled environment may be enhanced with improved or expanded utilization of social connectivity with monitoring. Yet, systems known in the art fail to effectively incorporate and utilize social connectivity measures to optimize monitoring toward that end.

There is therefore need for a system and method which provide for effective yet discreet, minimally intrusive monitoring of a subject's well-being within a certain setting. There is a need for such system and method which offers simple, manageable presentation of information to the monitoring user(s), especially when anomalous conduct is detected.

SUMMARY OF THE INVENTION

It is an object of the present invention to provide a system and method which carry out effective yet discreet, minimally intrusive monitoring of a subject's well-being within a certain setting.

It is another object of the present invention to provide a system and method which carry out indirect monitoring of a subject for anomalous conduct within a predefined setting.

It is yet another object of the present invention to provide a system and method which convey simple, manageable presentation of information to one or more monitoring users when anomalous conduct is detected, or when historically normal conduct is detected.

These and other objects are attained in a system formed in accordance with certain embodiments of the present invention for indirect event-based monitoring of a subject for well-being within a predefined unattended setting. The system generally includes a plurality of sensors disposed within the predefined setting for respectively sensing disparate events occurring therein, and an analytics processing portion coupled to the sensors. The analytics processing portion is programmably configured for execution to collectively acquire sensing data for the disparate events respectively from the sensors, and map a plurality of sensed data points from the acquired sensing data corresponding to a selected combination of the disparate events on to at least one conduct adaptively characterized for the subject. The sensed data points are mapped according to a set of pre-established reference event patterns. The analytics processing portion also executes to screen each characterized conduct for excessive aberration with reference to the pre-established reference event patterns, and to actuate generation of a graphic user interface displaying at least one reporting page. The reporting page contains for each characterized conduct certain graphic indicia determined responsive to the screening thereof. At least one monitoring device is coupled to the analytics processing portion by a wireless communications link. The monitoring device is actuated responsive to the analytics processing portion to render the graphic user interface for a remotely disposed monitoring user.

In accordance with certain embodiments and applications, a system is provided for indirect event-based monitoring of an infirm subject for well-being within a predefined unattended setting. The system generally includes a plurality of sensors disposed within the predefined setting for respectively sensing disparate events occurring within the predefined setting, and an analytics processing portion coupled to the sensors, which analytics processing portion is programmably configured for execution to collectively acquire sensing data for the disparate events respectively from the sensors. The analytics processing portion executes to periodically map a plurality of sensed data points from the acquired sensing data corresponding to a selected combination of the disparate events to at least one conduct adaptively characterized for the subject. The sensed data points are mapped according to a set of pre-established reference event patterns, the acquired sensing data being reduced by the mapping. The analytics processing portion also executes to determine a degree of anomaly for each characterized conduct with respect to the pre-established reference event patterns therein, and to actuate generation of a graphic user interface displaying at least one reporting page that presents a collective summary of the acquired sensing data relating to each conduct characterized for the subject. The reporting page contains for each characterized conduct graphic indicia corresponding to the degree of anomaly determined therefor. At least one remote monitoring device is coupled to the analytics processing portion by a wireless communications link, the monitoring device being actuated responsive to the analytics processing portion to visually render the graphic user interface for a remotely disposed monitoring user.

In accordance with certain other embodiments and applications, a method provides for indirect event-based monitoring of a subject for well-being within a predefined unattended setting. The method generally includes selectively installing a plurality of sensors within the predefined setting to respectively sense disparate events occurring within the predefined setting responsive to daily activity of the subject. A programmably configured analytics processing portion coupled to the sensors is executed to collectively acquire sensing data for the disparate events respectively from the sensors, and to map a plurality of sensed data points from the acquired sensing data, which corresponding to a selected combination of the disparate events, to at least one conduct adaptively characterized for the subject. The sensed data points are mapped according to a set of pre-established reference event patterns. The analytics processing portion is also executed to screen each characterized conduct for excessive aberration with reference to the pre-established reference event patterns, and to actuate generation of a graphic user interface displaying at least one reporting page. The reporting page contains for each characterized conduct certain graphic indicia determined responsive to the screening thereof. At least one monitoring device is coupled to the analytics processing portion by a wireless communications link, and actuated responsive to the analytics processing portion to visually render the graphic user interface for a remotely disposed monitoring user.

In accordance with certain embodiments and applications, a system is provided for indirect event-based monitoring of a subject for well-being within a predefined unattended setting. The system generally includes a plurality of sensors disposed within the predefined setting for respectively sensing data indicative of events disparately occurring within the predefined setting. A record portion stores in computer readable memory a history of activity and state data corresponding to the events, where the activity of the subject is defined by at least one corresponding event. An analytical processing engine coupled to the sensors and record portion includes a monitoring update portion which is programmably configured on a processor. The monitoring update portion executes to collectively acquire the sensed data respectively from the sensors, and to selectively detect the events from the sensed data according to at least one of a plurality of predetermined detection parameters. The detected events include at least one event directly sensed by a sensor configured therefor and at least one event indirectly inferred from at least one directly sensed event. The monitoring update portion also executes to screen the detected events according to at least one screening parameter and selectively assign one of a plurality of response conditions for each of the detected events; and, to actuate generation of a graphic user interface displaying at least one reporting page for access by at least one authorized person. The reporting page contains a graphically rendered activity portrait indicating the response condition adaptively updated for at least one detected event occurring within a selectively defined time window.

In accordance with certain embodiments and applications, a method provides for indirect event-based monitoring of a subject for well-being within a predefined unattended setting. The method generally includes selectively installing and actuating a plurality of sensors within the predefined setting to respectively sense data indicative of disparate events occurring within the predefined setting, and storing in a computer readable memory record portion a history of activity and state data corresponding to the events, the activity of the subject being defined by at least one corresponding event. An analytical processing engine coupled to access said sensors and record portion is actuated. A monitoring update portion is executed in the analytical processing engine to collectively acquire the sensed data respectively from the sensors, and to selectively detect the events from the sensed data according to at least one of a plurality of predetermined detection parameters. The detected events including at least one event directly sensed by a sensor configured therefor and at least one event indirectly inferred from at least one directly sensed event. The monitoring update portion is also executed to screen the detected events according to at least one screening parameter and selectively assign one of a plurality of response conditions for each of the detected events; and, to actuate generation of a graphic user interface displaying at least one reporting page for access by at least one authorized person. The reporting page contains a graphically rendered activity portrait indicating the response condition adaptively updated for at least one detected event occurring within a selectively defined time window.

In accordance with certain other embodiments and applications, a system is provided for indirect event-based monitoring of a subject for well-being within a monitored environment. A plurality of sensors are disposed within the monitored environment for respectively sensing data indicative of events disparately occurring within the monitored environment. A record portion stores in computer readable memory a history of activity and state data corresponding to the events, the activity of the subject being defined by at least one corresponding event. An analytical processing engine coupled to the sensors and record portion includes a monitoring update portion that is programmably configured on a processor. The monitoring update portion execution to collectively acquire the sensed data respectively from the sensors, and to selectively detect the events from the sensed data according to at least one of a plurality of predetermined detection parameters. The detected events include at least one event directly sensed by a sensor configured therefor and at least one event indirectly inferred from at least one directly sensed event. The monitoring update portion screens the detected events according to at least one screening parameter and selectively assigns one of a plurality of response conditions for each of the detected events, the response conditions including at least: normal and anomalous levels. The monitoring update portion also actuates generation of a graphic user interface displaying a reporting page for access by a plurality of authorized persons, which reporting page contains a graphically rendered activity portrait concurrently indicating occurrences of at least one detected event and the response condition adaptively updated therefor within a selectively defined time window. A system further includes a system adjust portion for adjustably configuring the monitoring update portion. The system adjust portion is programmably configured on a processor for execution to selectively set each of the predetermined detection parameters applicable to the detected events, and to selectively designate the authorized persons as responders and selectively assign system access limits therefor.

BRIEF DESCRIPTION OF THE DRAWINGS

FIGS. 3(A), 3(B), 3(C), and 3(D) are schematic diagrams illustrating various examples of sensor and living space relationships that may be employed to generate a sensor data stream during operation of the embodiment of FIG. 1;

FIG. 17B is a sample exemplifying a priority list which may be consulted during execution of the processes illustrated in FIG. 17A;

DETAILED DESCRIPTION OF THE PREFERRED EMBODIMENTS

Figure 1:
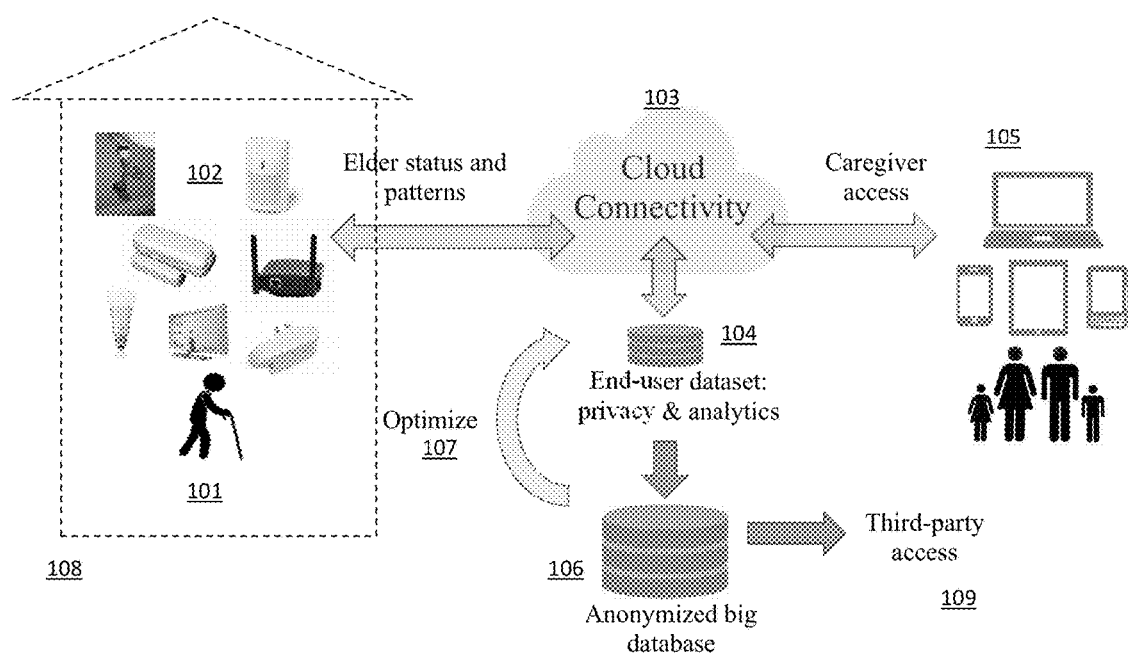
FIG. 1 is schematic diagram illustrating data flow connectivity in a system and/or method formed in accordance with one exemplary embodiment of the present invention.

Generally, a system and method formed in accordance with certain exemplary embodiments of the present invention serves to provide indirect, event-based monitoring of a subject within a predefined setting for anomalous conduct indicating potential disturbance to the subject's well-being. A system implemented in certain embodiments and applications preferably provide for the autonomous logging and summary reporting of specific activities of subject individuals in a controlled environment. The system monitors individuals such as elders, disabled persons, medical patients, or children circumstantially left unattended for extended periods in a household dwelling place or other predefined setting. The system employs a plurality of various commodity sensors suitably disposed and installed in the given setting, to be available as needed to acquire and provide a data stream helpful to answering key questions of interest to a monitoring third party user, questions relating to the continued well-being of the unattended individual.

The system is preferably configured to provide automated reduction of the sensor-provided data streams to status-indicative elements from which the needed answers may be reliably determined in automated manner. In this regard, the system carries out suitable analytic processing on acquired sensor data to adaptively determine baseline conditions relating to the subject's activity within the predefined setting during particular time periods. Upon selective reduction of the processed data to manageable form, the system delivers the resulting information to one or more monitoring users and presents the same in clearly and succinctly summarized graphic display form. A monitoring user is thereby alerted in a clear, reliable way when a potential threat to the monitored individual's well-being is determined based on detection of sufficiently anomalous conduct at the monitored setting.

As implemented in certain embodiments and applications, the system and method serve to monitor and report various human activities relevant to a controlled environment such as a home or other dwelling place. Depending on the particular application, the system and method execute to determine patterns of activity through event sensing with sufficient efficacy, for instance, to discriminate those situations where a lack of sensor activity is due to absence of monitored individual(s) within the controlled environment from other situations where it is actually due to a lack of activity by the monitored individual(s) though present. In certain applications, the system and method employ indirect measures computed from information acquired through available sensors to determine the presence, absence, and/or degree of one or more target activity types. In certain applications, the system and method generate a time-cycle, ACTIVITY PORTRAIT model of an individual and, based on such model, measure the degrees to which new events are consistent or anomalous.

Recognizing that the well-being of individuals within a controlled environment may be enhanced with improved or expanded social connectivity, the system and method make use of monitored actions and detected communications as Event Sensors. Where, for example, a monitored individual may have identified other individuals as authorized observers of their activity information, or may have even authorized them to receive notifications of certain potential events related to their activity, a categorization of persons for selectively directing system communications is thereby started. This may serve to establish electronically augmented social connections allowing cooperative parties to look in on each other. Moreover, such communications by or to a monitored individual may themselves be monitored and used to enhance the overall monitoring of the individual's well-being. That is, the very act of communication, whether initiated or received, may be positively exploited as a discreetly sensed event to help in tracking the individual's activity status.

Generally, terms such as activities, conduct, events, conditions and the like are used herein with reference to monitored individuals and/or monitored environments in both an affirmative and passive sense. That is, unless specifically noted otherwise, such terms may encompass both actions and non-actions, or both occurrences and non-occurrences pertaining to the particular aspect of monitoring in question.

In accordance with certain aspects of the present invention, the system preferably reduces the level of data detail exposed to any monitoring user, such that sufficient data detail is provided to indicate whether the subject is safe without exceeding a level of detail comfortable to the subject. This is an important compromise not achieved in monitoring systems known in the art. Additionally, the system preferably reduces the clutter of data to summary conditions that may be easily understood and acted upon by even a non-technical monitoring user. The system thus provides for "at-a-glance" status update displays, preferably employing a graphical user interface that quickly and simply identifies the monitored subject and/or the subject's status of conduct making creative use of non-text visual representations. The system provides an ideal solution for family members seeking daily reassurance that an elderly loved one or other individual residing alone at a remote dwelling is well, and does so non-intrusively, without requiring the monitored person to remember any cooperative action or to necessarily do anything to facilitate monitoring data collection.

As implemented in certain exemplary embodiments, the subject system and method offer an innovative approach that facilitates aging in place, while reassuring family members that their elderly relatives are safe and well while enjoying an independent lifestyle. The implemented system unobtrusively monitors activity inside the subject's dwelling, and the family member or other caregiving individual may at a glance on a Smartphone, tablet, or computer be reassured in the following ways:

1. Notifications—the system preferably generates and delivers suitable notices to them when important daily events for the monitored subject occur, such as the first activity of the day (for example, 'Grandma got out of bed'), or the refrigerator being opened (for example, 'Grandpa is eating at his usual mealtime'), or the like. Notifications may also be sent out when activities occur which are not within an expected, typical pattern, such as activity occurring during the middle of the night and activity occurring at a time when the subject is expected to be away from the monitored premises, among others. The notification parameters may be selectively set by the elder subject, by the elder's monitoring caregiver/representative, or by the system itself according to a default setting.
2. Predictive Analytics—the system preferably creates an activity pattern from the acquired sensor data, then alerts the monitoring user(s) if an expected activity fails to occur as expected (for example, 'Grandpa didn't watch the morning TV news as he normally does—perhaps he should be checked on;' 'Grandma didn't start dinner in the kitchen at the usual time—perhaps she should be checked on').
3. Activity Log—the system preferably establishes and maintains a baseline of activity that may be used as a comparative reference, in order to proactively detect for instance upward or downward behavior trends. The baseline reference may also be used to compare the monitored status pre- and post-event for a certain event or intervention, in order to explain a difference from a prior pattern or to determine a timeline slope from or toward a prior pattern of activity. Examples include a baseline frequency of nighttime waking and trips to the bathroom before and after administration of a pharmaceutical product, or daytime activity before and after introduction of an exercise bicycle or nutrition regimen. The baseline is preferably determined in adaptive manner from an activity log which correlates data from multiple sensors, such as periodic data from an exercise bicycle and periodic data from a weight scale, with measurement data for total daily activity and kitchen activity within the monitored setting/site. The system preferably allows entry of relevant data for purposes of correlation with patterns of activity to aid future predictability—such as, for instance, date of diagnosis of a urinary tract infection entered in order to correlate with frequency of toilet use prior to the date of diagnosis.

In certain preferred embodiments and applications, the system further focuses on logging ordinary daily activities generally experienced by most human subjects in their normal course, such as logging sleep and wake times, meal times, TV or media device use times, arrival and departure times, and general patterns of household activity.

The system in the illustrated embodiment includes a set of sensors strategically-placed throughout the predefined setting, a system controller (gateway), adaptive analytics programmably implemented for execution in the system controller, and software to protect data privacy and actuate presentation of information to designated caregivers or other monitoring users. Preferably, system data is classified according to sensitivity/level of privacy. The data may be designated as view only, may be presented as individual data or aggregate data, or may be downloadable into a secured third party system. The gateway constitutes a robust, compact hub that collects data from sensors, encrypts the information for privacy protection, and sends it to a secure server preferably though not necessarily in the so-called Cloud for storage and for pattern analysis. The system is suitably configured and equipped to provide privacy by design, including measures for meeting data protection standards used by third party oversight and certification standards groups.

The system in the illustrated embodiment is preferably configured to accordingly provide three types of selectable insights:
1. Daily Activities—Families and other monitoring users may choose to be notified by the system when certain specific events occur, such as the first activity of the day.
2. Unusual Events—Alerts are sent if daily activity diverges from prior patterns, which might indicate an accident or illness.
3. Long-term Trends—Trend analysis is carried out to track and characterize changes in activity patterns over time.

The system is preferably customized to individual needs. For example, the system in one embodiment and/or application may require only a few sensors, but users may selectively choose from numerous sensors of various types. Examples include: in home security (e.g. door locks or separation/proximity sensors), energy management (e.g. wireless thermostats or smart plugs), home safety (e.g. smoke alarms and water detectors or flow sensors), health and fitness (e.g. weight scales or exercise bicycles), entertainment (e.g. TVs and audio systems), work space (e.g. printers or computers), lighting (e.g. lamps or bulbs or switches), home automation (e.g. motion sensors or switches), appliances (e.g. stoves or refrigerators or clothes dryers), audio monitors (e.g. baby monitors or glass break sensors), and the like. The system preferably monitors and controls the selected sensors remotely through the same suitable network service provider for extra value and/or convenience.

Each family member and caregiver interacting with the system as a monitoring user via individual communication devices (such as a smartphone) may easily adjust their device access settings to suit individual preferences. Adjustable settings may include for example: a selectively set value for wait time before notification that an expected event was missed, a group of activities selected as important enough for daily updates, and the like. The system may establish connection with devices that push information or communicate to the monitoring user(s) responsive to certain detected events or certain combined strings of events. For example, lack of kitchen activity detection combined with concurrent cooking surface (stove) activation may be sufficiently anomalous to automatically trigger a telephone call to the elder subject being monitored, or otherwise trigger an automated stove turn off control feature that also reports the same to the elder.

The illustrated embodiment is easy to use and may be installed at the subject's dwelling place or other site to be monitored simply by connecting the gateway to an internet router, cellular connection, or any other communications network portal of suitable type known in the art available there at the site. The system's sensors are strategically placed throughout the site so that they may detect typical daily activities directly (i.e. motion sensors) or indirectly (i.e. water flow in a pipe to indicate bathing, toilet, or cooking activities). The sensors are thus placed and installed for operation, so that suitable combinations of their acquired data may be processed to infer in event-based manner the nature of conduct engaged in by the subject. In this way, any conduct of the subject that may be anomalous under prevailing conditions during certain periods/points in time is indirectly detected, so that the monitoring user(s) may be alerted and updated accordingly.

System interaction with a monitoring user is designed for security and simplicity, and to quickly and directly answer the important questions as to the subject's well-being typically arising in the user's mind rather than providing a sea of data. Preferably, an initial, or login, page presented on a monitoring user's display operably interconnected to the system serves to show at a glance, whether the subject—often a loved one, like a Grandma, is first of all awake and active. Then, responsive to the monitoring user's selected input, more detailed update information is made available for presentation on supporting supplemental display pages.

An additional feature preferably maintained by the system in the illustrated embodiment is an activity log of the type described in preceding paragraphs, which allows a monitoring user to see how certain previous events and intervention actions may have affected the monitored subject's activity pattern. (For example, information as to whether available use of an exercise bike has increased the subject's movement around the house; or, information as to whether prescription of a new medication has reduced night-time trips to the bathroom.) The system is suitably configured to execute adaptive analytics for creating and monitoring activity patterns from acquired sensor data and allow monitoring users to compare recent habits of the subject to past behaviors and proactively detect upward or downward activity trends.

Sustained operation of the system provides monitoring users, who are often caring family members of the subject, the daily reassurance they typically need as to the well-being of the subject, often an aging loved one. Toward that end, the system serves to effectively reduce the available sensor data to quick, succinct summaries intrinsically answering certain basic target questions through clear, instantly understood user interface displays. Typical questions in an elder care situation which are readily answered by such displays include for example:

1. Did Grandma get out of bed today?
2. Is Grandpa eating?
3. Is Grandma on her normal schedule?
4. Did Grandpa go to bed at his usual time?
5. Has there been an accident or illness?

Further details are not generally required, nor typically salient. Under many circumstances, the monitoring user simply wants to know that everything is OK and not have to pay further attention. That is, unless an issue arises or a trend analysis is wanted for longitudinal monitoring.

Various other types of questions may be adapted to situations in which other types of individuals, actions, or items are being monitored. For example, answers may be provided by the system intrinsically to such other questions as:

a. Has the individual reached home?
b. Has the individual left the house unexpectedly?
c. Has the individual opened the door to a stranger?
d. Is the individual in a part of the house he/she do not belong?
e. Has the individual taken his/her medicine on time?
f. Are there more persons in the house than have been authorized?
g. Are persons in the house at unusual times or when the subject is not home?
h. Has the individual opened a cabinet they should not have (e.g. a gun safe, a poison repository, a medicine or alcohol cabinet)?
i. Is a tagged item moved from its expected location (e.g. medication dispenser lifted, gun removed, food or beverage moved)?

Numerous other such questions may be suitably addressed during the course of system operation in certain embodiments, depending on the particular requirements of the intended application. In accordance with certain aspects of the present invention, such questions whose answers may not seem measurable by automated monitoring are in fact ascertained and effectively communicated to a monitoring user. In the case of questions c, for instance, the answer to whether the monitored individual has opened the door to a stranger may be ascertained by detecting anomalous patterns in a pertinent combination of events—perhaps, upon detection of unusual door opening times without exit or entry.

Turning now to FIG. 1, there are schematically illustrated certain critical data flow and connectivity elements as implemented in a system formed in accordance with one exemplary embodiment of the present invention. The system provides for effective indirect event-based monitoring within a predefined setting 108 for anomalous conduct on the part of one or more subjects 101. A subject 101, such as one or more elderly individuals, is monitored via a plurality of sensors 102 placed in their local environment 108. This environment may be any predefined setting, such as for instance the subject's residential household or dwelling place, or any other place of interest like a place of daytime habitation, a medical or social care center, or a work place. The sensors preferably include any suitable device known in the art for transducing a measurable condition to a sensing signal indicative of the measured condition. The sensors are placed in and around the setting to perform passive monitoring of the target individual(s) without requiring their active interaction with the sensing devices or any other part of the disclosed system. Thus, one or more motion or occupancy sensors may be used to for monitor activity within a specific room or area within the setting 108; one or more motion, separation, or vibrations sensors may be used to monitor for actions such as opening a box, cabinet, door, or refrigerator; one or more power-use sensors may be placed on appliances and lights to monitor their usage; one or more audio sensors tuned to detect specific sounds such as spoken language or breakage/impact may be installed; and, so on.

The system in certain alternate embodiments may include sensor devices placed on or about the target person, such as a panic alert button, accelerometer, etc., in accordance with various aspects of the spirit of the invention. These devices however, require active cooperation by the subject to ensure proper acquisition of target status information. Where such devices are employed, it becomes useful to automatically determine the status of the device—e.g., has the user put on their personal monitor or not?—thus, such extraneous information as whether or not the device is personally worn by the subject must be factored into the system analytics.

The monitored environment/setting 108 is linked via suitable communications measures to other portions of the system. The system's processing is preferably located remotely, on a common resource such as cloud connected server for instance; however, in certain embodiments such processing components of the system may operate on a local gateway or other processor within the monitored environment.

The cloud connectivity 103 comprises an interlinked series of communication networks of any suitable type known in the art, including, for example, the internet, mobile service networks, and the like, which jointly facilitate links between the sensing, processing, storage, and reporting portions of the illustratively embodied system.

Figure 2A:
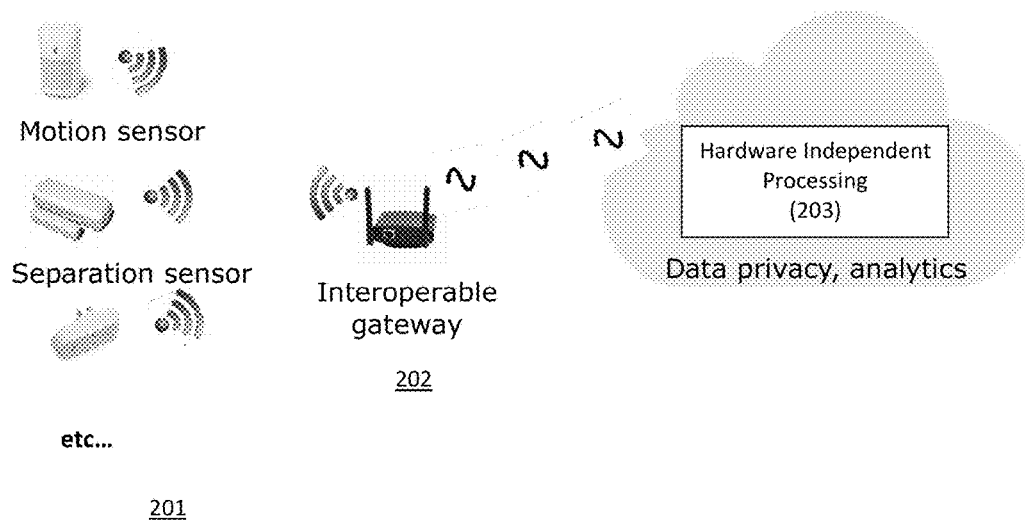
FIGS. 2(A)-2(B) are schematic diagram illustrating operational intercoupling between various examples of sensors collectively available in a dwelling place and a hardware independent processing portion during operation of the embodiment of FIG. 1.
Figure 2B:
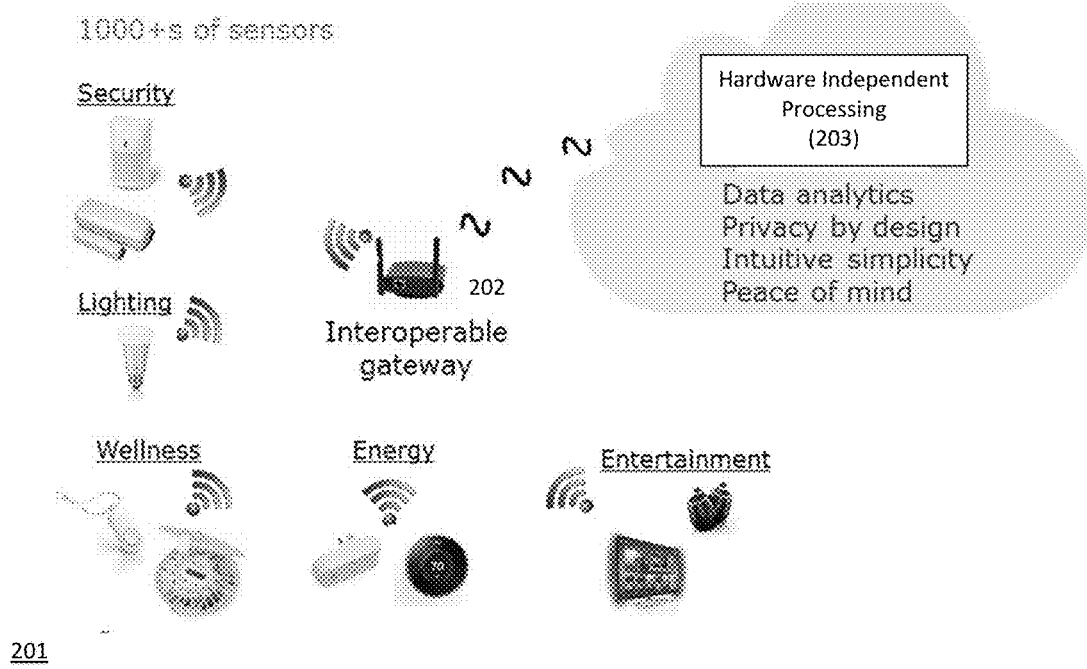

As illustrated in FIGS. 2(A) and 2(B), sensors 201 are typically connected locally to a gateway 202 within the environment of the target user, and this gateway concentrates information and transmits the same via the cloud to a primary processing portion 203. The sensors may be wired or wireless, as needed for the intended application. In one exemplary applications, a collection of z-wave based sensing devices are employed, linked to a gateway, with the gateway transmitting summary information via the internet out of the household environment 108. Sensors in various embodiments may be directly connected via network protocols such as TCP-IP so that the gateway may be replaced by a conventional router device. Thus, smart lights, thermostats, appliances, TV's, etc., may be suitably incorporated into the system's data gathering network in accordance with certain aspects of the present inventions.

The cloud-based primary processing portion 203 is preferably operable independent of the particular hardware which may be employed for sensing and transmission. As such, the primary processing portion is substantially adaptable for use with any available set of sensors or gateways from any vendor without substantial modification.

Referring back to FIG. 1, the system records user sensor data in an end-user specific dataset 104, on which data user-specific analytics are executed by the primary processing portion, as described further below. User privacy is thereby maintained via all communications channels, and such user-specific data is logically isolated so as to prevent propagation of information that might unduly compromise the target individual's privacy.

Putting aside for the moment the measures by which the analytics dataset operates, status information is provided only to monitoring parties having proper permission to receive it. Thus only caregivers, family members, and/or others having authorized relationship to the target individual being monitored may at any time access the target individual's status reports via Smartphone, tablet, website systems, or the like (105). As further described below, sensor data streams from sensors 102 are considerably reduced via suitable analytics to "at-a-glance" understandable status information for the monitoring users at remote devices 105. This provides advances over the art in minimizing the time, technical know-how, and skills necessary to assess the status of the person of interest and reducing dependence on any given monitoring user's personal ability to interpret and assess sensor data on their own.

The system operates to detect anomalies in the monitored subject's conduct within the predefined setting 108 based on events collectively sensed by the various sensors 102. The system then classifies the detected anomalies as those likely to represent harm to the subject individual, and in the event of possible harm, provide timely information to the monitoring users that the target person may require their attention. Some anomalies detected as such may not actually be classified as likely to represent harm where the system recognizes sufficient contextual factors to allay the concern. As described herein with reference to FIG. 9, for example, the system operates in certain embodiments to first classify event TYPES by tokenizing them, and searches within and across each of these TYPES for anomalies the given event pattern. Then, based on the TYPE of behavior and the degree of anomaly, the system in such embodiments determines a THREAT or CONCERN level for classification of detected anomalies. This keeps the system from bringing undue alarm to monitoring users.

For example, by tracking regularity of bed-time activities, the system detects and alerts/reports to the monitoring user when the target subject fails to rise from bed as expected. By tracking patterns of kitchen activity, the system detects and alerts/reports when the target subject misses a meal, or otherwise eats less/more frequently than what had been typical in the past. By tracking patterns of activity about the house, the system detects and alerts/reports when an individual is unusually inactive, potentially signaling need for require help or intervention. By tracking the environment's occupancy and exit/entry information, the system detects and alerts/reports when an individual has left the environment at an inappropriate time, or has failed to return by a typical, expected time. By tracking electrical usage of an appliance such as a TV, the system detects and alerts/reports when a typical viewing time is missed.

The system in certain embodiments, also operates to moderate or otherwise screen reports of increases/decreases or other perceived changes in normal expected activity due to context. For example, an increase in kitchen activity corresponding to a smoke alarm alert might normally trigger the system to detect an anomaly and accordingly report concern to a caregiver, whereas sensing only increased activity in the kitchen and family room may not constitute a sufficiently anomalous conduct and therefore suppress alert.

The precise events of interest, and the level and combination thereof required for anomaly detection and triggering of alert will depend on various prevailing factors for the given subject(s). For example, they may vary according to the household being monitored, the target individual's habits, and certain concerns of the monitoring users. As described further below, the system preferably executes to adaptively learn and determine not only the target individuals' patterns of conduct, but also the expected ranges of variance in their habitual patterns of conduct. This minimizes the likelihood of over-reporting anomalies that would appear as false-alarms from the monitoring users' perspective. This also represents an improvement over known systems in which users define preset fixed schedules (e.g., typical wake up time) and receives notices of missed scheduled events in a non-adaptive fashion.

The monitoring individuals in various embodiments of the system and method disclosed herein are preferably given access selectively—depending on their identity or relationship/function as to the subject, only to some or all of the data stream, or just to a summary of the data. For example, in a typical application of the illustrated embodiment, a family member of an elder subject may be granted selective access to all of the subject's daily activity. On the other hand, a medical caregiver may be granted selective access only have the subject's health-related data, such as records of blood-pressure cuff readings, weight scale readings, or the like.

The system preferably offers monitoring individuals certain report options, like the graphic presentation of summary information in primarily numeric or primarily graphic form, and the inclusion of a time indicia component if desired. Quantified data will be stored and can be presented in absolute value or compared to a calculated baseline.

When an anomaly in conduct is detected by the system, corresponding information is reported to the monitoring user(s), such that the report is available to alert them when the monitoring user(s) next check-in from their devices. In this regard, the system generates and sends a suitable notification signal to each monitoring user according to the settings in its software configuration. Concurrent notice is preferably also sent to each monitoring user via other measures such as: by push notification via phone call, text, email, app. alert, or the like. The system preferably allows each monitoring user to set their threshold of interest in anomalies and their preferred means of notification. In this context, the monitoring user's threshold of interest is preferably interpreted as a threshold or weighting factor on the degree to which a pattern must be anomalous before the monitoring user is notified. For example, in one illustrative embodiment using a normal statistical distribution of event occurrence times, a threshold of interest may be interpreted to trigger notification to the monitoring user whenever an expected event time exceeds a z-scored adjusted distance from the mean occurrence time While maintaining the privacy of the target subject's sensitive data details in the dataset 104, the system in this embodiment also accommodates aggregate analysis of different subjects' datasets. This is achieved by anonymizing each end-user's data according to applicable law, removing personally identifiable information to produce a conglomerate database 106. This provides a number of useful features. For instance, various longitudinal analytics over groups of users may be carried out, thus permitting patterns and behaviors typified over multiple households and situations to be abstracted and fed back to the individual levels of analytics through a suitably configured optimization process 107. In addition, this large database may be mined for behavioral information and other details of interest to third parties 109 engaged in various types of product development, research, or the like.

Returning to certain details of monitoring target subjects, FIGS. 3(A)-3(D) schematically illustrate specific examples of the sources and monitoring points typically found in a residential or other dwelling place of a monitored subject. As noted herein, a common application of the disclosed system is found, for example, in the monitoring of subject individuals for well-being in their home. In keeping with the goals of intrinsically answering specific natural questions on the subject's status and condition, as discussed above, the system preferably monitors a plurality of distinct areas within a given subject's setting. In addition to the examples noted in preceding paragraphs for the sensors that may be employed; similar or additional event-indicating information may be obtained using sensor devices of any suitable type known in the art appropriate for the given setting. Practical considerations like cost and convenience will normally dictate where and how many sensor devices are actually placed and used. A combination of sensors suitable for a particularly intended application are preferably employed to provide as much knowledge/information acquisition as possible while employing as few sensor devices as possible (in as economical a manner as possible). Further, sensor types that do not collect unneeded information are preferably employed, both to minimize invasion of the subject's privacy and to minimize data flow rates.

FIG. 3(A) illustrates examples of sensors installed to monitor distinct living spaces within the monitored subject's setting 108. A space such as a living room or office is fitted with a motion/occupancy sensor 301 in this example, employing such passive sensing devices of infrared, ultrasonic, RF, or other emissions according to any suitable technology well established in the art. Where used in an occupancy mode, a sensor activated for the system operates to record when activity has occurred in a room or designated living space within a block of time, say 4 minutes for instance. The sensor may also operate to record when a prolonged condition of stillness occurs within the room in a manner not consistent with the ordinary course of activity there—perhaps because of an adverse event such as fall or illness. The system preferably carries out such interpretive operation.

Lack of activity in the room may be mapped to an unoccupied condition. Where used in a motion detection mode, the same sensor may report activity and lack of activity on a much tighter time schedule, say 10-30 seconds for instance, thus providing the analytic processing portion of the system with a finer grain set of information with which to work. This tradeoff is preferably made in practice considering not only the analytic needs of the system, but also the higher energy costs incurred by the more frequent reports being generated and transmitted (such as the potential reduction in battery life of sensor devices). In certain embodiments, other areas of the house such as hallways and stairs are monitored with motion detectors to track transitory movement between floors and rooms within the house.

Also illustrated in FIG. 3(A) is a sensor to sense TV watching activity. As shown, a TV connected to the wall power socket is monitored by a power-usage monitor device 302 installed on the power connection. The device 302, which may be of any suitable type known in the art, senses and provides to the system's processing portion the amount of power in use at any given time, thus allowing the system to track those periods when the TV is turned on. The system may thus track the subject's regular habit of watching TV programs, for example, and establish patterns within this feature set for later comparison and anomaly testing. A subject's failure to follow a habitually established watching schedule, or the subject's failure to exhibit any watching activity at all during expected time periods may form one basis for alerting the monitoring user(s).

Such a sensor is preferably connected to a power consuming appliance or other equipment/device known to be used regularly by the target subject within the monitored setting. Other examples may include in addition to a TV: a coffee maker or toaster, a radio, a room/area illumination lamp, a reading lamp, a microwave oven, etc. The selection of device is ideally made to suit each system application based on certain prior knowledge of the target subject's habits. This instrumentation of selected appliances, equipment, devices within a subject's monitored setting, and configuration of the system's analytics to adaptively determine which appliances/equipment/devices deliver the most salient activity patterns are features that may be utilized in certain embodiments, depending on the particular tendencies of the subject and nature of the monitored setting.

FIG. 3(B) schematically illustrates sensor placement in a bedroom for certain embodiments of the system. A motion/occupancy sensor 303 is preferably employed and positioned on a wall or ceiling surface with its field of view oriented to encompass much if not all of the space at and around the bed in the room. The sensor's data stream would provide information as to when an individual has gotten out of bed or is moving around the bedroom. Once such activity ceases, and is followed by no other activity elsewhere in the house for a period thereafter, the system may, for example, infer that the target individual has gone to bed. Preferably, this detection is augmented by tracking a subject's estimated current state against a hypothesized change in state. In one particular example, once an individual falls into a verified sleep state, events within the bedroom (such as rolling around in bed) are down weighted against events that occur outside the bedroom so that spurious wake-up times are not erroneously generated. Such bedroom-related events are tracked according to their regularity, and statistical inferences of the likelihood of a subject having gone to bed in the normal course of a particular day may be drawn based on pertinent factors. For example, the anomaly of this activity pattern may be weighed in view of the time during the given day at which it occurs.

Also illustrated in FIG. 3(B) is a power-use monitoring sensor of any suitable type known in the art coupled to a bedside lamp 304. This sensor enables the system to track when the target subject is using the lamp 304, or conversely when the subject has turned the lamp off for sleep or rest. It will be clear that other sensing measures, including light metering, smart-light bulbs, pressure sensors, audio monitors, or the like known in the art may be employed as well to acquire equivalent data. The coupling or substantial concurrency of events such as bedroom activity, followed by a lamp being used and then turned out, may represent a typical pattern for certain subjects, indicating their turning in for the night. Joint, even redundant, information provided by multiple convergent data points tends to heighten confidence in the system's reliable estimation of the subject individual's activity status, hence the system's reliable indication of the subject individual's well-being. In particular, joint detection of occurrences which are separately irregular enough to cause concern heighten confidence all the more of anomalous activity, and the system accordingly forwards the same to each monitoring user through alert notices for review.

Sensor data integration in this regard provides synergistic advantages over simply detecting and reporting disparate sensor activity.

Other supporting instrumentation for bedroom monitoring may include, for example, one or more separation sensors 305 attached to dresser drawers. Various other sensors like an accelerometer or a light sensor may be alternatively employed to provide equivalent information. The dresser drawer is but one example of equipment whose use/activation may be monitored in this regard. Other examples of equipment which may provide strategic sensing points include but are not limited to bathroom doors, closets doors, medicine cabinets, pill boxes, or glasses, watches, and other typical daily adornments, among others.

Bathroom monitoring in certain embodiments may include, for example, motion sensors as well as water use monitors attached to pipes in the sink and/or toilet (310), or audio monitors capable of detecting sounds indicative of a fall or consistent with language of distress. Humidity and water sensors may also be placed to detect normal washing events. Sensors may be employed as well to detect potential hazards—examples including sensors to sense water spillage that may indicate unsafe slippery floor conditions or leakage/overflow due to damaged plumbing. Health and fitness monitoring devices may be employed to provide both a data stream and a time context for determining proper activity and medication regimens.

Typical areas of particular interest within a subject's dwelling in the illustrated embodiment are the kitchen and eating areas. As illustrated in FIG. 3(C), one or more motion/occupancy sensors 306 may be employed to monitor such kitchen and eating areas. In addition, sensors 306 for heat may be employed near a stove, and sensors pertaining to light may be employed elsewhere to determine when lighting for the room or area is in use. These sensors sense nominal levels to help the system establish a baseline, so that when aberrant levels are sensed, or when otherwise normal sensed levels collectively exhibit aberrant patterns, anomalous activity may be discerned.

Also illustrated in FIG. 3(C) is a sensor 307 installed to determine when a refrigerator door is opened. Note in this regard that certain modern appliances, including refrigerators, stoves, and others known in the art for the kitchen and elsewhere, now provide integrated smart network enabled technology that may obviate the need for any extraneous sensor to sense door opening or other operating conditions. Where such smart appliances are employed and linked to the system, the system may communicate directly with the device through its built-in operational monitoring and communications interface capabilities to acquire its activity status. FIG. 3(C) also illustrates sensor instrumentation provided for a utensil drawer, the opening/closing activity of which is often associated with food preparation or, more directly, with eating. These are but some examples of the numerous sensor provisions that may be made in the illustrated system.

Other examples in the kitchen context include sensing capabilities incorporated with pantry or cabinet doors, and the like. Instrumentation for various other types of devices such as water, heat, carbon monoxide, and smoke sensors may also be placed in the kitchen context to monitor activity and safety. Particularly within the kitchen, multiple types of sensors are preferably employed not only to acquire information, but also to trigger immediate automated actions on the premises. A sensed lack of activity for a certain extended period coupled incongruently with elevated temperature or ongoing energy use of stove, for instance, might prompt the system to trigger a 'burner off' automated command mechanism to shut the stove off and/or notify a designated caregiver. Such other incongruent conditions as low temperatures and differentials between the kitchen area and other living spaces of the monitored site may also trigger automated actions like notifications, especially where the potential consequences for failure to take prompt remedial action are severe (for example, lack of heat unduly jeopardizing safety in the wintertime).

Based on patterns of sensor information within the food-prep and eating areas, the system preferably determines whether and when a target subject is preparing meals, snacks, and so forth. The system generates a set of reporting displays consistent with the determination whose contents effectively and preemptively answer basic questions that would come to mind for concerned family members, caregivers, or other monitoring users. Answers to questions like whether the subject is eating and whether he/she is doing so regularly and consistently are presented, so that monitoring users may be reassured or alerted accordingly. This provides one of numerous information data points that may be reflected in the system's periodic or as-needed reports and alerts to monitoring users.

As indicated in FIG. 3(D), other distinct areas preferably monitored by the system are doorways. Suitable devices such as contact sensors, for instance, acquire entrance and exit data which, when coupled with other data points indicative of certain activity or lack of that activity, enable reliable determination of the monitored subject's leaving and returning to the monitored environment.

Figure 4:
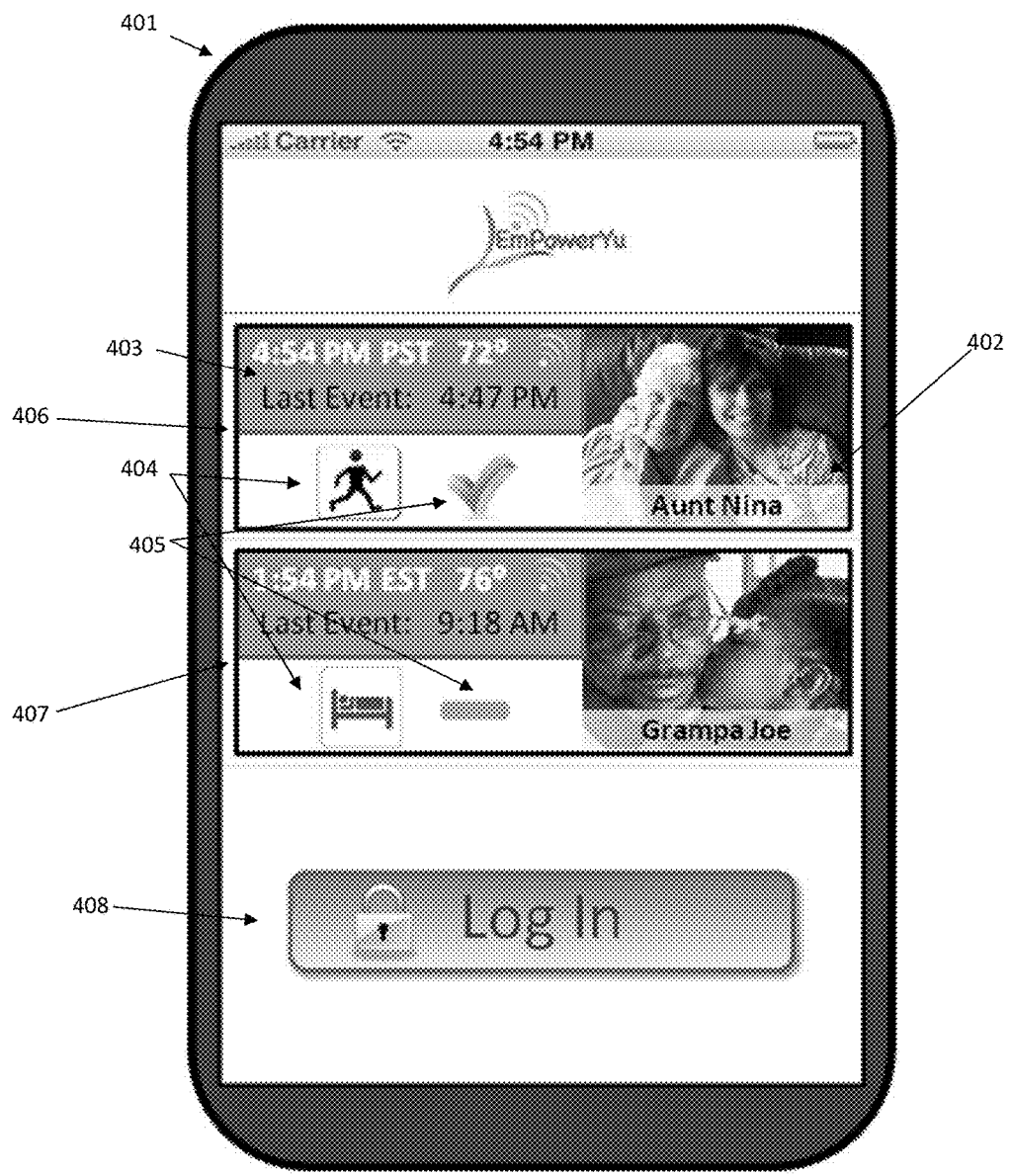
FIG. 4 is an illustrative view showing one example of graphic user interface display established as a mobile log-in page for a monitoring user during operation of the embodiment of FIG. 1, wherein information of various subjects' activity state information are presented in reduced form.

FIG. 4 shows one example of a high level graphic user interface reporting page generated and displayed initially for a monitoring user on his/her system-linked device in one sample application of the illustrated system embodiment. The graphic reporting page generated and displayed by the system reflects a culmination of guiding factors, or goals. One goal is the reduction of data to "at-a-glance" status summaries from which a monitoring user may instantly glean the current overall well-being of the monitored subject. Another goal is to provide simple yet emotionally favorable, attractive, and easily identifiable visual representation(s) of the subject(s). Yet another goal is to provide clean, convenient dissemination of information to monitoring users, preferably through a graphic user interface which reports salient information using minimal textual content.

Figure 5:
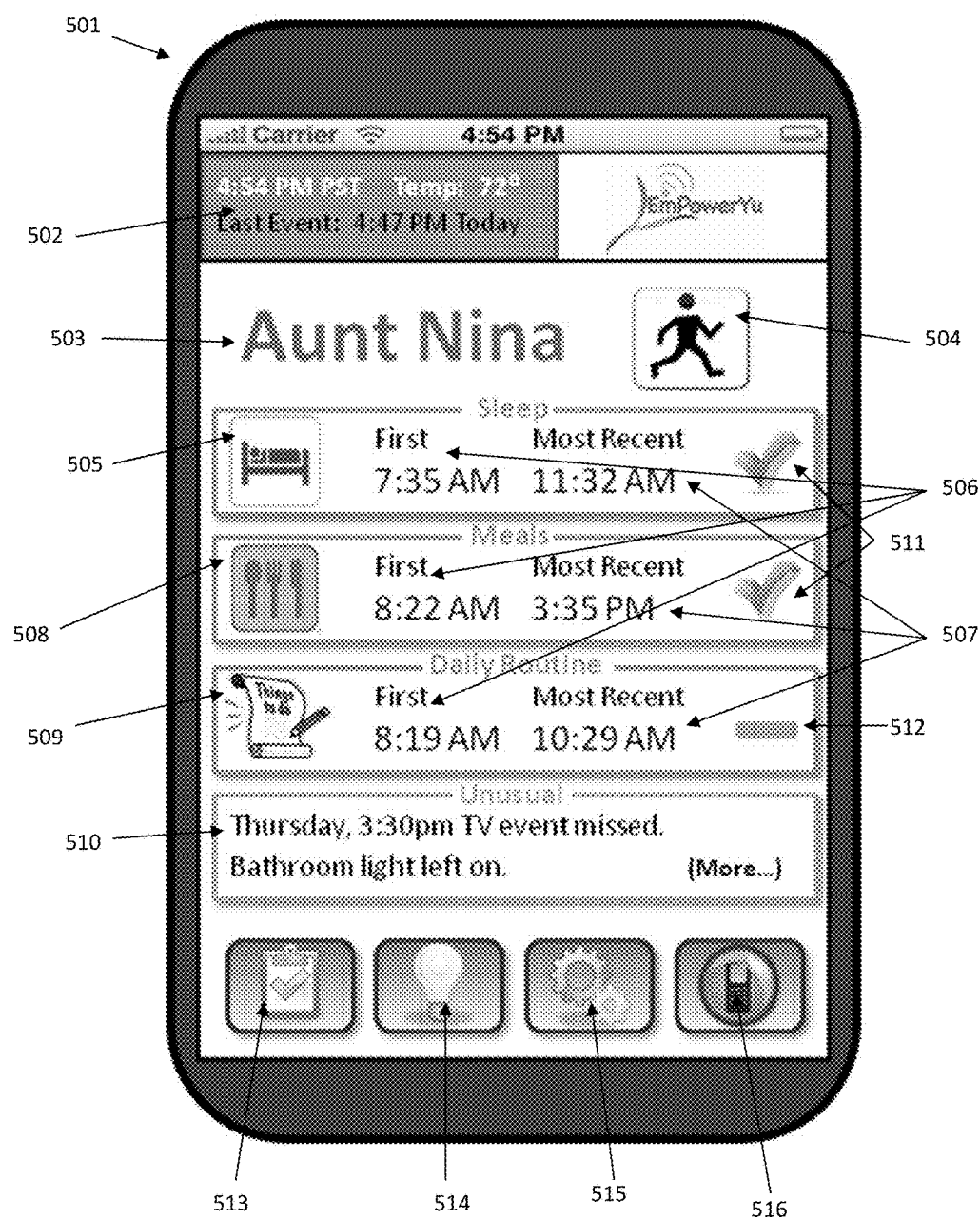
FIG. 5 is an illustrative view showing another example of graphic user interface display established as a more detailed level mobile page for a certain monitoring user relating to the monitoring of one selected subject identified on the page of FIG. 4 during operation of the embodiment of FIG. 1.
Figure 6:
FIG. 6 is an illustrative view showing another example of graphic user interface display established for another monitoring user as a larger screen format display of similar information presented in FIG. 4, but suited for a tablet, lap-top, desktop computer or other such display device, during operation of the embodiment of FIG. 1.

As illustrated, salient information is thus presented to monitoring users through graphic reporting pages which reflect the system's adaptive mapping of various events indicated by acquired data points (via the various sensors) to particular behavioral conduct of the subject. This event-based mapping of events to particular conduct is processed by the system from an inferential synthesis of acquired sensor data having disparate type in view of known or learned data relating to the subject, the subject's health condition and/or particular infirmities, data relating to the monitored setting, time of day, season during the year, and/or other factors applicable to the intended application. Examples of such mappings for the sample scenarios illustratively displayed in graphic reporting pages like those shown in FIGS. 4-6 are addressed below:

Aunt Nina

1. Her wakeup detected by movement in the bedroom and then activity on sensors outside the bedroom occurred at 7:35 AM. She later had a brief morning nap ending at 11:32 AM, as detected in the same fashion. These are within normal limits, therefore a green check is displayed (511) is displayed.

2. Activity in the kitchen including occupancy, refrigerator openings, and utensil drawer openings peaked first at 8:22 AM, thus indicating a first meal (i.e., breakfast). Later meals included, most recently, a tea time snack at 3:35 PM. These all occurred within normal times of day, therefore a green check (511) is displayed.

3. Her daily routine events started with a TV being turned on (sensed by a smart switch) at 8:19 AM (506), and a set of organizational activities in her living room were sensed at 10:29 AM. Both of these activities are typical; however, she did not watch her usual 3:30 PM TV show (510), therefore a conspicuously colored (such as orange) bar (512) indicating anomalous activity is displayed.

4. Based on this aggregate information, her current overall state is still normal as shown by green check (405) in FIG. 4. The missed activity in itself is not sufficient to trigger a concerning anomaly since she did complete her expected tea-time snack at or after the same time frame.

5. Otherwise, Aunt Nina is indicated to be up and about (404), with temperature and system connectivity being nominal (403).

Grampa Joe

1. Grampa Joe's detail page is not shown; however, from his summary page in FIG. 4 we it is evident that temperature in his house is normal, and his gateway is connected. But there is a significant anomaly.

2. His last event was at 9:18 AM, and the system has determined by monitoring the pattern of occupancy and stillness that he is now in bed (404) and has been there all day. As it is 1:45 PM in the afternoon, and his ordinary wakeup time is 8:30 AM, the system interprets this as a strong anomaly, as indicated by the colored (orange) bar (405). This suggests that the monitoring user should investigate.

3. In certain preferred embodiments, such a strong anomaly also triggers a push notification to the caregiver so that they are directed to check the GUI details and check on the subject.

In the example of FIG. 4, the high level graphic reporting page also serves as a Login page for a monitoring user. The reporting page is graphically presented to the user through a suitably configured software application, or "app," running on a hand-held smartphone device 401. The reporting page may be alternatively presented on a communication device of numerous other types known in the art, facilitated by other known software interface tools such as through website pages accessed through a suitable internet browser or other known data presentation modality. This initial (high level) user interface display in the illustrated example is divided into different display blocks/frames 406 and 407, which respectively summarize the individual status of two target subjects being separately monitored. In the sample scenario, the subjects are labeled "Aunt Nina" and "Grampa Joe."

To provide instant recognition, each block includes a personalized title and picture in one frame area 402, the picture preferably being uploaded by the monitoring user. Each block further includes a textual summary of pertinent situational status information 403, which include in this example indications of: the local time at each individual subject's monitored setting (dwelling place), the current temperature in their dwelling, and status of the system's operational connectivity (whether the gateway at that dwelling is on-line and actively reporting information), and the time of the last event recognized by the system's analytics portion. Thus the monitoring user knows from a quick glance at the reporting page whether the dwelling is sufficiently comfortable for each subject, whether the monitoring system is in place up and running, and how current the last updated of pertinent information is.

In addition, each display block preferably includes a summary icon 404 that informs the monitoring user at a glance of the current status of each individual subject. In the sample scenario, Aunt Nina is reported currently as being active (denoted by a walking stick figure in the subject's icon 404), suggesting that she is up and about the house, while Grampa Joe is reported as still being in bed. These icons 404 represent a state-estimate of each target subject as determined by the system's analytics portion. Other icons that may be employed, including for example: a meal symbol for eating (not shown), an empty-house icon for having left home (not shown), and numerous others suited for the particular application intended.

Another graphic feature employed for enhancing at-a-glance retrieval of information in each display block is preferably a nominal vs. negative (likely of concern) anomalous indication 405. Aunt Nina is reported by virtue of the green check symbol 405 to be following her usual daily event course and therefore without anomalous conduct. But Grampa Joe is reported by virtue of the brightly colored (orange) dash to not be doing so. Thus the monitoring user is informed at a glance which subject is currently OK, and which subject potentially needs to be checked on.

The system in this manner reduces a multiplicity of potentially confusing event sensor streams by collecting then appropriately combining and inferring therefrom, so as to map the same to qualitative estimations of the subject's behavioral activity. The pertinent activities are presented in at-a-glance information summaries, which may be accessed remotely with one tap of an identifying icon on the main smartphone display page for the system. The pertinent activity information is presented in a manner that minimizes intrusion into the privacy of the target subject. This is of particular importance to many elders concerned about their privacy, whose consent to monitoring may be conditioned on adequate assurance in this regard. The system balances the often competing interests of restraining and limiting intrusion into the subject's privacy with those of maintaining meaningful access to concerned caregivers needing fast and easy access to up-to-date information on the subject's well-being. The system preferably enables access to monitoring caregiver(s) with minimum numbers of screens to navigate through, such as by enabling one tap on a system-designated icon to a high level reporting screen for any individuals being monitored by that caregiver.

In the illustrated example, the app shown in FIG. 4 preferably includes a log-in button 408, by which the monitoring user may log into the system to get more information about the status and recent activities of the target subjects that particular user is authorized to monitor. Authorization will in certain embodiments be controlled only by the subject or by his/her duly appointed representative (such as individual granted the subject's power of attorney).

FIG. 5 shows another example of a graphic user interface reporting page generated and displayed for a monitoring user on his/her system-linked device in one sample application of the illustrated system embodiment. As opposed to the reporting page shown in FIG. 4, the reporting page displayed in FIG. 5 is displayed at more detailed level once the monitoring user has actually logged into the system. In this case, an expanded view of the updated activity data is presented for one of the multiple subjects being monitored in this example, "Aunt Nina's," whose selection corresponds to the high level summary presented in display block 406 of FIG. 4. This more detailed access to the given subject's monitored information, which goes beyond the initial alert of any anomalies in the subject's activity, is included in this particular example. In alternate embodiments and/or applications, the system may simply provide a monitoring user access only to the high level summaries of activity pertinent to a given anomaly alert, as illustrated in the initial login page of FIG. 4, recognizing that the alert would invariably prompt a monitoring user to take immediate remedial action, like phoning the subject or otherwise arranging the necessary intervention rather than reviewing further analytics at that point.

In the example shown in FIG. 5, the display block 502 reports ambient data such as time/date/temperature, similar to that reported in display block 403 of FIG. 4. The target subject's name or other identifying designation serves to label the page 503, and the overall status icon 504 is placed clearly and conspicuously (such as near the top) on the page display. The display page is subdivided beneath that into various frames each relating to certain selected categories of interest for the given application. In display block 505, for instance, sleep-related information is graphically denoted and summarized. A graphic icon is preferably displayed in each frame to highlight the type of information to be presented in that frame. Time tags 506, 507 for the First and Most Recent events of the day in the frame's category are reported for quick reference in this example.

Thus, if the system were to determine by virtue of an extended period of inactivity in the bedroom (and elsewhere) followed by activity after 7:35 AM, the system would infer that the subject got out of bed at 7:35 AM, and log the activity as constituting a sleep-related event. If, for example, the system were to determine by virtue of the reverse sequence of events (bedroom activity followed by extended period of inactivity there and elsewhere), the system would infer that the target subject laid down for a rest at the delineating time, or 11:32 AM in this particular example. This too would likewise be logged as a sleep-related event.

Within each framed category, a clear, prominent icon or other indicia 511, 512 is displayed for each frame, so as to communicate nominal (511) vs. anomalous (512) conditions. This helps the monitoring user to quickly recognize—at a glance—whether the target subject is following his/her typical behaviors/conduct for the day in each event category. Also shown in this example are frames for a meals category 508 and a daily routine category 509. The meals category is linked, for instance, to events occurring in the kitchen and eating areas as described above. The daily routine category that encompasses various activities such as the subject's movements about the house, his/her use of appliances like TVs or reading lamps, and passage into and out of the house (entry/exit). The system preferably provides each monitoring user with the option to selectively configure other categories of interest (e.g. bathroom events, occupancy events, etc.) and display their graphic presentation frames as a supplement to or substitute for one or more of the categories shown.

A display block 510 is preferably generated on this reporting page for one or more of the framed categories in which an anomalous event is detected (denoted by indicia 512). The display block 510 is graphically highlighted for visual reference to the indicia 512 for anomaly detection (outlined by a brightly colored border to match the brightly colored dash of indicia 512 in this example). The block 510 displays therein available information pertaining to the anomalous condition(s) from one or more categories. The pertinent information is summarized to aid the monitoring user's quick apprehension of the anomalous situation, such that the monitoring user may learn the nature of the anomaly and immediately determine whether it warrants further action or remedial response. In this example, the details for the detected anomaly indicate a missed TV watching event and that a bathroom light was left on when it is usually turned off.

The monitoring user may access unusual events and indicate whether this category of event should result in a notification; a bathroom light left on may be an anomalous event, but not worthy of notification, whereas a specific missed TV event may be a strong indication of harm that is desirous of notification by the caregiver. System flexibility is given to the caregiver whenever possible to customize the notifications to reflect the caregiver's knowledge of the subject user.

At the bottom of this graphic reporting page are preferably displayed one or more other reporting pages, each selectively represented by respective graphic buttons for access thereto. In this example, button 513 provides selective access to a log of events so that the monitoring user can review in more detail the occurrences on which the analytics processing portion has based its inferences/conclusions. Button 514 provides selective access to instant status reporting of the sensors within the subject's environment so that conditions may be monitored substantially in real-time. Button 515 provides selective access to setup and configuration information. Button 516 provides convenient actuation of the given device's telephone or other designated voice communication resource to verbally contact the target subject him-/herself or another party on the subject's behalf. For example, activating button 516 may in this instance pull up Aunt Nina's phone number and place a phone call to her directly through the given smartphone device.

FIG. 6 illustrates an example of an alternate layout for presenting much the same information presented by the more detailed information reporting page of FIG. 5. In this alternate example, the reporting page is displayed in an extended layout formatted for a larger-screen device. Such extended layout may be suitably configured and employed when a monitoring user checks activity status of the target subjects from a desktop, lap-top, or table computer device, for example. The changes in this extended layout (from the layout shown in FIG. 5) include more textual details in the information category frames. An emergency button is also included in this example, which permits the monitoring user to immediately initiate a call to emergency services should their review of a target subject's activity status warrant such measures. Such an option when present is preferably provided with suitably incorporated safeguards known in the art to protect against accidental activation (for example, by employing one or more layers of activation/command confirmation).

Figure 7:
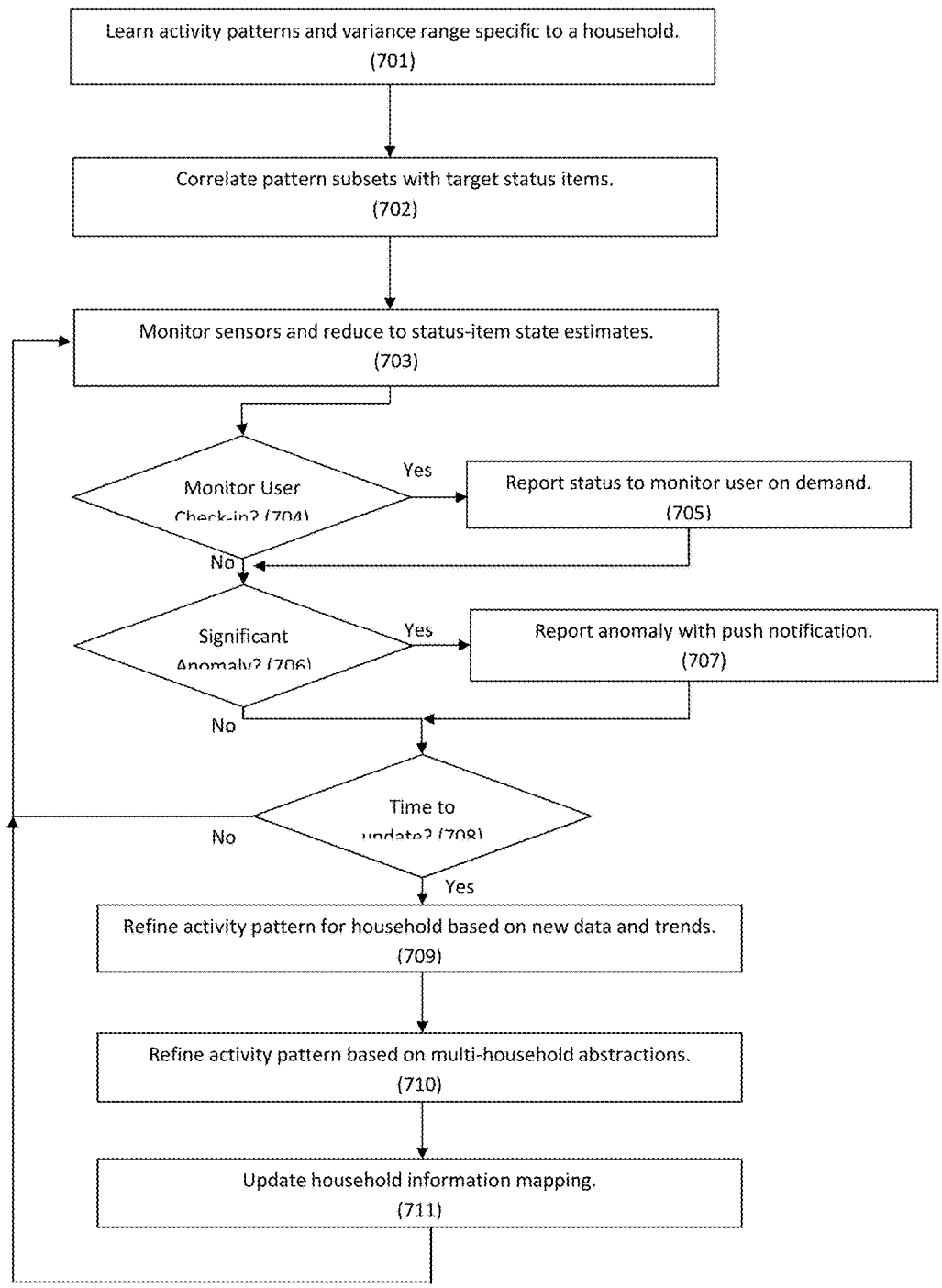
FIG. 7 is a flow diagram illustrating a flow of processes carried out during operation of the embodiment of FIG. 1 in one exemplary application.

FIG. 7 illustrates a flow of processes carried out in one example of the operational details of the system. When a monitoring system is initially deployed, the analytics component of the system is preferably activated to record and learn typical time course activity patterns of the subject(s) in the monitored environment, as indicated at process block 701. Such patterns are preferably established with respect to standardized period time references, including daily 24 hour periods with allowance for variation over the course of a given week, and in certain embodiments, with allowance for variation over longer periods such as monthly, quarterly, or seasonal variations. Calendar overlays may also consider cultural contexts such as religious events (e.g. month-long Ramadan eating changes would significantly impact both the daily pattern of eating and kitchen activity, but would likely also affect system analytics if not taken into account). An individual subject or monitoring user anticipating such pattern changes may effectuate adaptive accommodation in the system by entering known events into a system calendar. Entries such as vacation time away, medical procedures, family events, monthly meetings at the home, etc. may be made in this regard. Access to such a calendar may be shared or restricted in much the manner that access to the data stream and summary information of the subject is selectively controlled, in view of privacy and other applicable concerns.

Using domain knowledge about the setting and specific locations in which sensors are installed, coupled with general rules of typical behavior established for the subject type (e.g. elder) among other things, the system's analytics component maps sensed event/activity patterns to event types which denote certain conduct of the subject, as indicated at process block 702. For example, night time bedroom activity followed by a quiet period (little or no activity) is mapped to a "gone to bed" event. A quiet period followed by morning bedroom activity, then activity outside of the bedroom, is mapped to a "wake up event." Morning kitchen events in certain time ranges and duration are mapped to breakfast eating events. Midday kitchen events of consistent duration are mapped to a "lunch" eating event, and so forth. Other examples for various other areas within the monitored setting, and for different applications involving different types of subjects and/or setting will be apparent to those skilled in the art.

The system in the illustrated embodiment makes such inferences for: wake-up and sleep events; nap events; and, breakfast, lunch, dinner, snack/coffee consuming events. The system also makes such inferences for daily activity periods and appliance or lighting usage patterns, as learned for a particular target subject (as further exemplified in FIG. 9).

The system then enters its active monitoring mode. At block 703, sensor data streams are continuously monitored and periodically mapped to state estimates, corresponding to the event types of interest. This status information is maintained in quasi real-time and is available for a monitoring user to check on demand. In accordance with block 704, if a monitoring user checks for a status update, then the system at block 705 presents the information using, for example, one of the interfaces illustrated in FIGS. 4-6.

In accordance with block 706, if a significant deviation from one or more normal activity patterns is detected, and the system determines for the prevailing context that there is possible reason for concern, the system at block 707 pushes this information actively to the monitoring user via their preferred mode of notification. What categories are of interest and the degree of anomaly that rises to a level of significance is determined in accordance with each monitoring user's preferences and selective configuration of system settings. The level of significance pertaining to particular activities in certain embodiments, is also dependent upon the system's determination of whether deviation from a pattern is benign (e.g., increased activity due to Grandma's bridge night) or potentially of concern (e.g., increased activity remains unexplained, or occurs in association with alarming sensor events such as a smoke detector or environmental sensor indicating out of range conditions.)

At block 708 the system determines if it is appropriate to update the patterns initially established at blocks 701 and 702. In various embodiments of the system, different analytic approaches are used singularly or jointly to determine when such an update is warranted. In one example, updates may occur on a regularly scheduled basis. In another example, updates may occur when records of activity patterns indicate that the subject(s) in a setting (household) is no longer conforming to those initially established at block 701. Thus, the system progressively adapts to changing behaviors of the target subject. In a further example, updates may occur when sufficient data is gleaned from aggregate analysis of other subjects (households) to establish new generalizations appropriate for propagation to the monitoring of other individual subjects within the group. In still another example, updates may occur because changes in software or in event categories warrant such updates.

Should updates be in order, the updates generally relate to two refinement types. The first, indicated at block 709, effects a re-analysis of current data logs to update household specific (or subject and/or setting specific) patterns that were originally recorded at block 701. The second, indicated at block 710, effects refinement in the understanding and abstraction of these patterns based on other information learned in aggregate from multiple households (subjects and/or settings) of a similar category. At block 711, the affected event patterns are re-mapped to the target status event items of interest, so that the analytics component may begin reporting states and events of interest in accordance with the goals of the system.

Other examples of scenarios relevant to monitoring subjects in the particular case of elderly subjects, whose infirmities derive primarily from their advanced age, include the following:

Grandmother A has a predictable morning wake time, and consistently opens the refrigerator for milk for her coffee and cereal between 7:15 and 7:30 AM every morning for 3 months. The next morning activity is seen in the bedroom at 7 am as usual, but the hallway motion sensor does not detect activity as usual, and the refrigerator door is not opened as usual by 8 am. The analytics component of the system infers based on the combination of sensed events that Grandmother A got up, didn't feel well, and went back to bed. Depending on the system's settings configuration, this contextualized conclusion constitutes detection of Grandmother A's conduct sufficiently anomalous to trigger alert notification to one or more monitoring caregivers to check on her.

Grandfather B watches the 5 pm news every day of the week, but not on weekends. On a Tuesday early in July Grandfather B fails to watch the news, which would normally constitute an anomalous event for Tuesdays. However, the calendar overlay identifies that particular Tuesday as the $4^{th}$ of July, so the system does not immediately report the event to the monitoring caregiver (Grandfather B's son) based on known similarities of July $4^{th}$ holiday to a weekend day. However, when Grandfather B does not turn on his reading light in his family room by 8 pm, an event consistent with event patterns for both weekdays and weekends, anomalous conduct is detected and Grandfather B's caregiver is notified. The son, however, knows of Grandfather B's whereabouts (with his own family at that moment), so the alert notification is disregarded not followed up on, yet the son remains reassured that the system's analytics are operating properly.

These are but examples, and numerous other scenarios such as these are supported by the illustrated embodiment.

Suitable software and hardware measures for machine learning known in the art may be employed to carry out such automated decision making according to the particular requirements of the intended application. In a first configuration, the system provides for a plurality of predefined pattern event scenarios, and the conditions required for detection as anomalous conduct. These are preferably recorded in a set of expert system rules, and acted upon based on logic described according to the sensor inputs that have been tokenized into events of specific types. This provides a fully enabled mechanism by which to implement many of the features and goals noted herein.

However, in certain preferred embodiments of the present system and method, the discovery and processing of pattern event scenarios is substantially automated, rather than pre-defined by human analyst(s). In particular, as discussed with reference to FIG. 7, the system undergoes a learning phase of operation to first form an event frequency distribution according to defined time cycles, including hours in a day, days in the week, etc. The system then tokenizes consistent patterns and associates them with a priori classes of typical events (bed times, meals, etc.), and/or subject-specific events (time-consistent room use activities or appliance-use activities). The degree of deviation or compliance with such learned schedules of events, as will be understood by those skilled in the art, may be readily determined by statistical or Bayesian estimates of likelihood and confidence in the appropriate context. Information both learned in the context of a particular subject's household activities and directly established by human analysts may be combined through joint and conditional probabilities to provide maximum likelihood estimations of the target subject's state of well-being.

Figure 9:
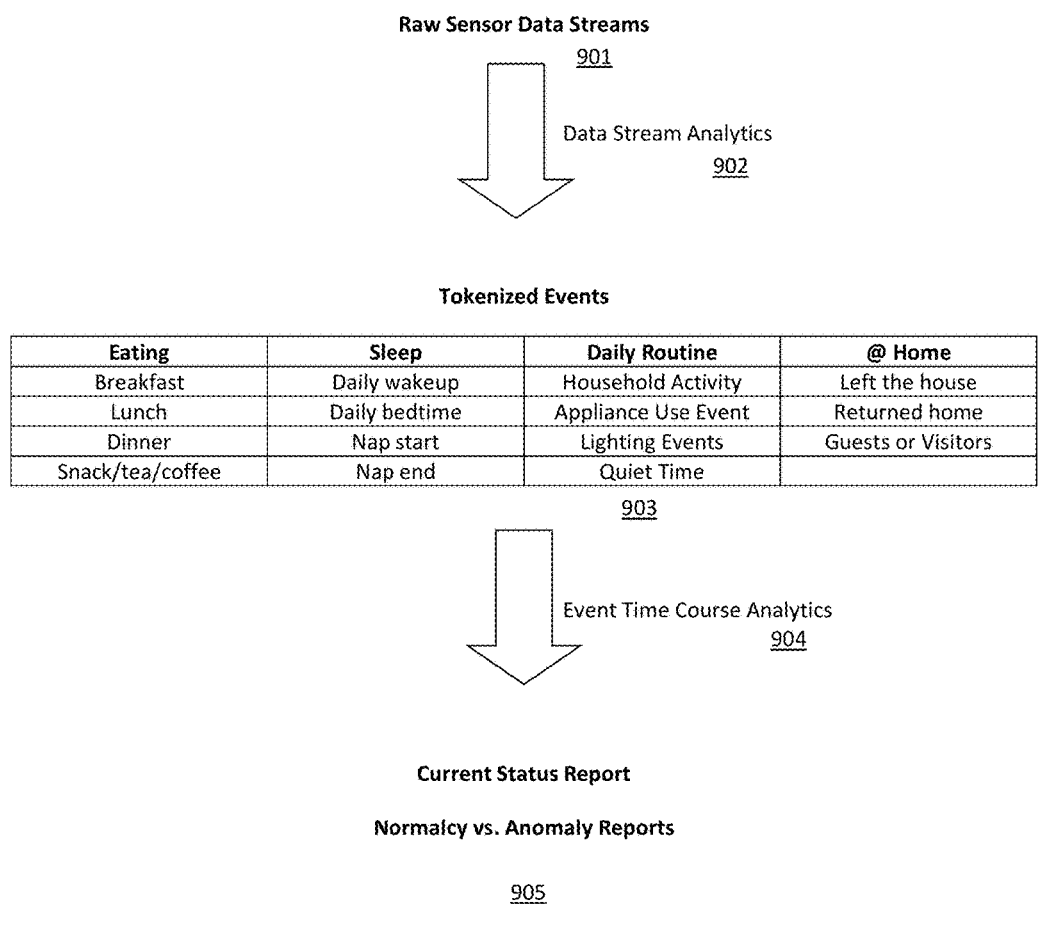
FIG. 9 is schematic diagram generally illustrating a reduction of sensor data streams from raw sensor data, to tokenized events of interest, then to an at-a-glance presentation for a monitoring user during operation of the embodiment of FIG. 1 in one exemplary application.

FIG. 9 schematically illustrates a general approach carried out in accordance with the illustrated embodiment for reducing the sensor data acquired by the system. Raw sensor data streams 901 are mapped by data stream analytics portion 902 to certain tokenized events 903. The examples of tokenized events shown are provided for purposes of illustration with reference to the illustrated embodiment and sample application, and obviously without limitation of other embodiments and applications thereto. These event courses are analyzed with respect to their expected time courses 801, to determine (a) the current activity state of the monitored individual and (b) whether that activity state is nominal or anomalous.

Figure 8:
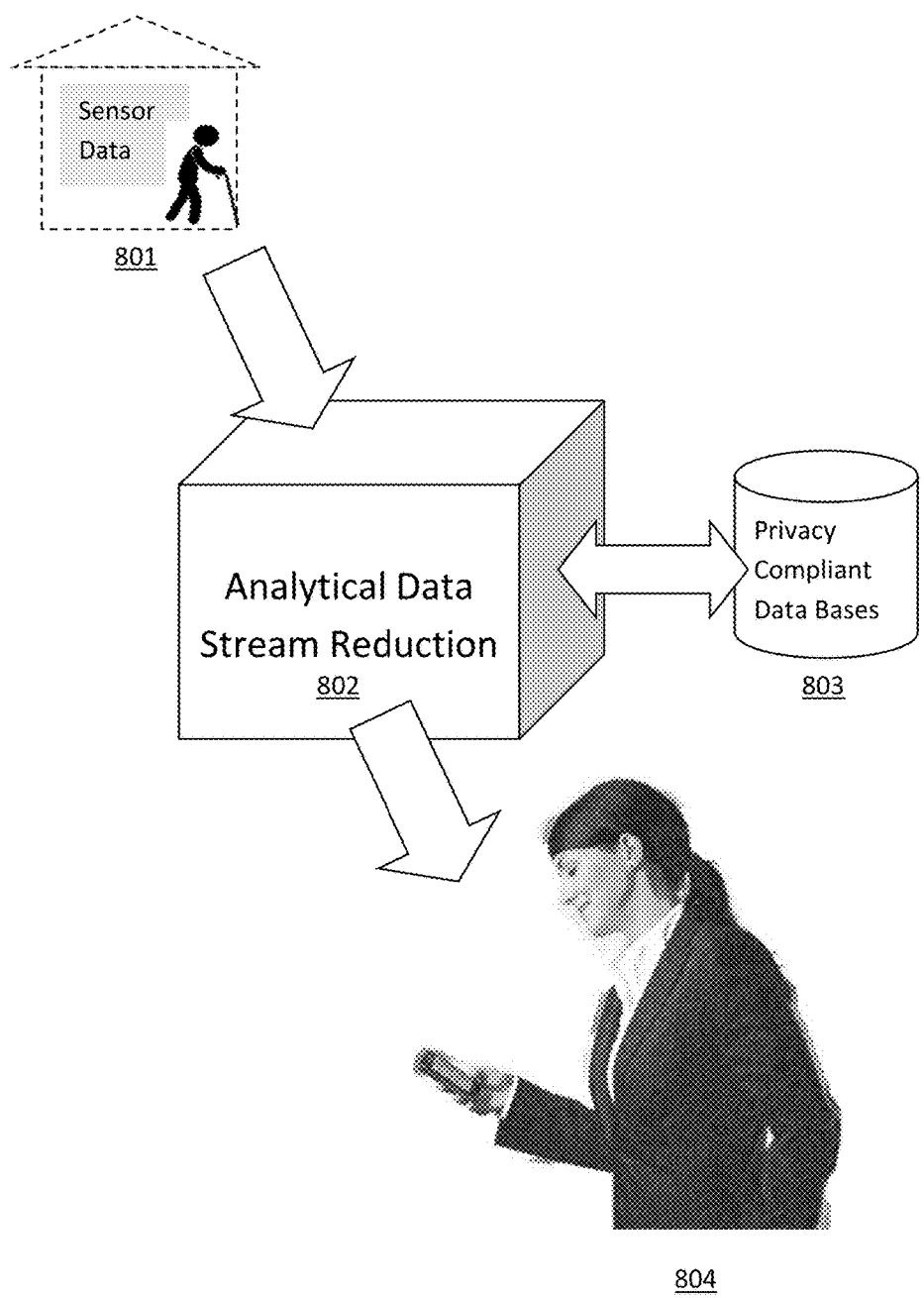
FIG. 8 is schematic diagram illustrating a flow of data as it is reduced from a complicated, as-available sensor data stream to a clear, concise, privacy compliant presentation for a monitoring user during operation of the embodiment of FIG. 1 in one exemplary application.

The event data-activity report mapping measures illustrated in FIG. 9 support the general monitoring operation schematically illustrated in FIG. 8. As shown in FIG. 8, the complex streams of sensor data are collected using available sensors in the quasi-controlled setting 801 in spaces and equipment surrounding a target subject. The collected data is reduced through the analytical processing portion 802 to produce at-a-glance, quickly understandable reports of status information about the target subject's activity, and made available to a monitoring user 804 anywhere in the world through a linked personal communication device. The monitoring user is thereby presented with quick, easily understood, and to the point information on the subject's current state of well-being. The target subject enjoys maximum privacy with respect to the moment to moment details of their activities, as they and their immediate movements are not directly monitored. Moreover, the target subject need not take active steps to facilitate the monitoring, even while sufficiently complete presentation of pertinent well-being information is made available to a monitoring user through simple reference to a display screen generated by the system.

Certain displays generated by the system, and accessed accordingly by the touch of a displayed icon or other suitable user interface input, provide for uniquely concise conveyance of historical and current behavior activity information, which serve to simply and efficiently display data pertaining to a Monitored Person. Such displays reflect certain portions or aspects of the ACTIVITY PORTRAIT models generated by the system, as illustrated for example by the various display components shown in FIGS. 13, 14, and others for sample behavior and activity data.

Although the subject system and method may be implemented in various embodiments and configured for various applications, the subject system and method contribute to a comprehensive approach for helping families or other care-givers stay continually informed and assured that a loved one or other person within their care at a controlled environment/setting (such as their home) is remaining active, and that the activity is relatively consistent with his/her historical activity patterns.

Figure 10:
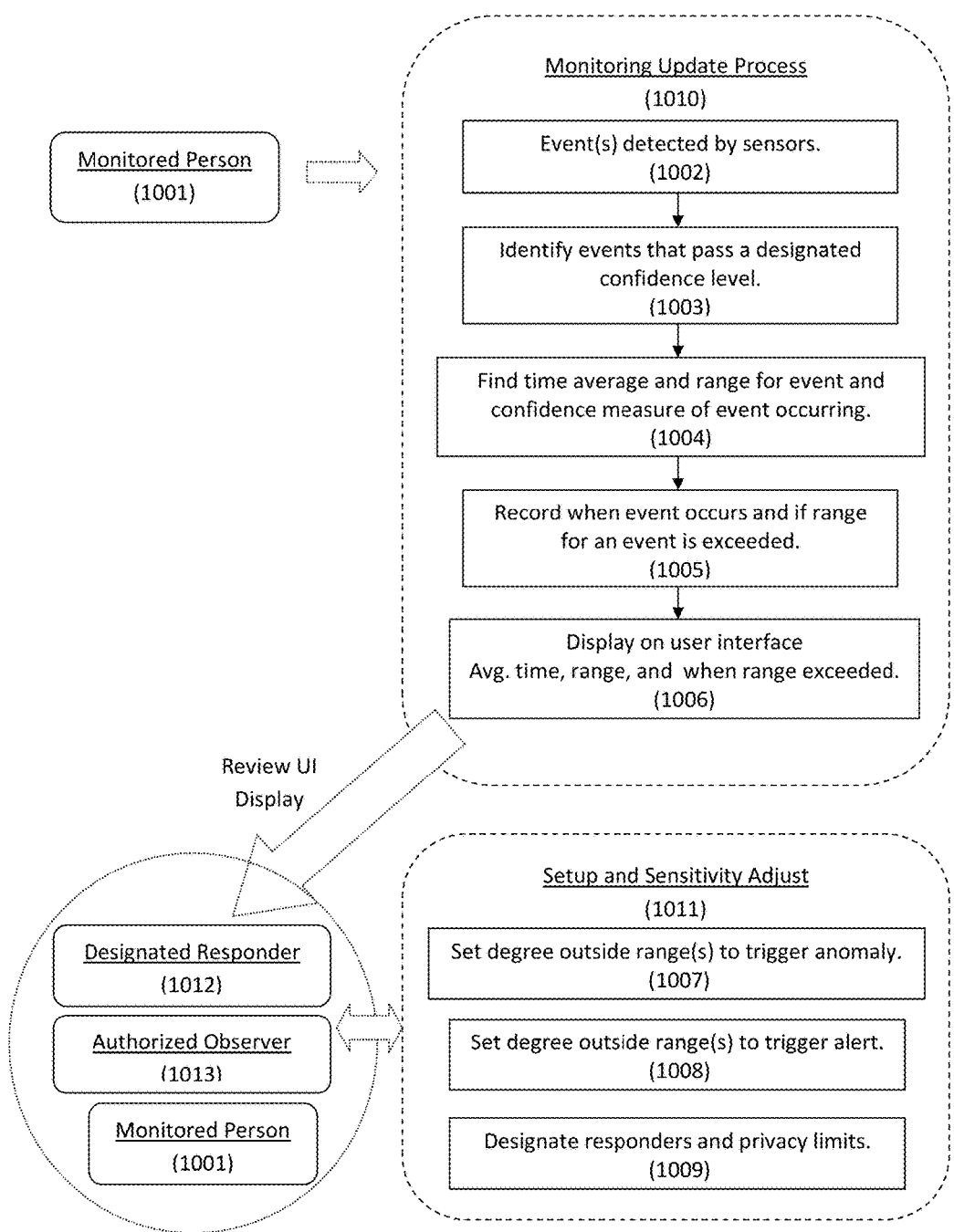
FIG. 10 is a schematic diagram generally illustrating a flow of processes carried out during operation in one exemplary of a system and/or method for monitoring once the system/method has been set up, initialized, initially trained.

FIG. 10 illustrates a flow of processes carried out in one exemplary embodiment and application once the system has been suitably established, initialized, trained, and otherwise set up for monitoring. For the purposes of clear illustration, the following definitions are reflected in connection with the illustrated embodiment and application:

Monitored Person: A person whose activities are monitored by the given activity monitoring system implementation.

Authorized Observer: A person whom the Monitored Person has authorized to access certain specific activity data relating to his/her monitored activity.

Responder: A person who has been designated to check on a Monitored Person if a pre-defined anomalous situation of concern is detected The processes shown in FIG. 10 illustrate certain operational details of the one system implementation in its monitoring mode 1010 as the operation progresses from sensing the activity of one or more Monitored Persons 1001 within the predefined setting, on to the reporting of such to one or more monitoring users 1012, 1013 (who may include the Monitored Person 1001 him-/herself). The flow of processes generally illustrates the reduction of events for the Monitored Person are to normal vs. anomalous events and the responsive notification of various authorized participants in accordance with certain privacy and sensitivity settings. The Monitored Person's activity within the predefined, monitored setting is detected at block 1002 as events by the various sensors employed. Those events that pass a predetermined metric, such as a suitable confidence level threshold value or exhibit certain confidence level conditions are identified at block 1003. This effectively filters out false event detections due to noise or other system or sensor aberrations, and leaves only those detections deemed with a reasonable level of confidence responsive to actual activity (or inactivity) of the Monitored Person. At block 1004, a time average and applicable range (in terms of duration, proximity to other events, or other such conditions) are preferably computed for each identified event, as is a measure of confidence as to the detection indicating actual occurrence of a given event.

For each identified event, a suitable record is made at block 1005. This preferably includes recording when the event occurred, and whether any applicable ranges of conditions are exceed by the event. The results, preferably including the time of occurrence, any exceeded range of conditions, and time of range transgression, are reported and suitably displayed as described in preceding paragraphs on a user interface at block 1006. Monitoring users may then view the display on their respective monitoring devices.

FIG. 10 also illustrates the processes relating to the system setup and sensitivity adjustments measures 1011 which one or more of the monitoring users 1012, 1013, 1001 may be authorized to access, preferably though not necessarily via their monitoring devices. These measures include at block 1007 selectively setting for each monitored condition having prescribed range limit(s) the degree to which a particular event must exceed that prescribed limit(s) to be deemed an anomaly. At block 1008, the degree to which a particular event may be permitted to exceed the prescribed limit(s) an anomaly alert to actually be triggered is selectively set for each monitored condition having such prescribed range limit(s). At block 1009, selective designations are made as needed for responders and any limiting measures for suitable privacy factors/concerns (for example, monitoring time limits for certain activities or for certain sensors, option to deactivate sensors, or the like).

Figure 11A:
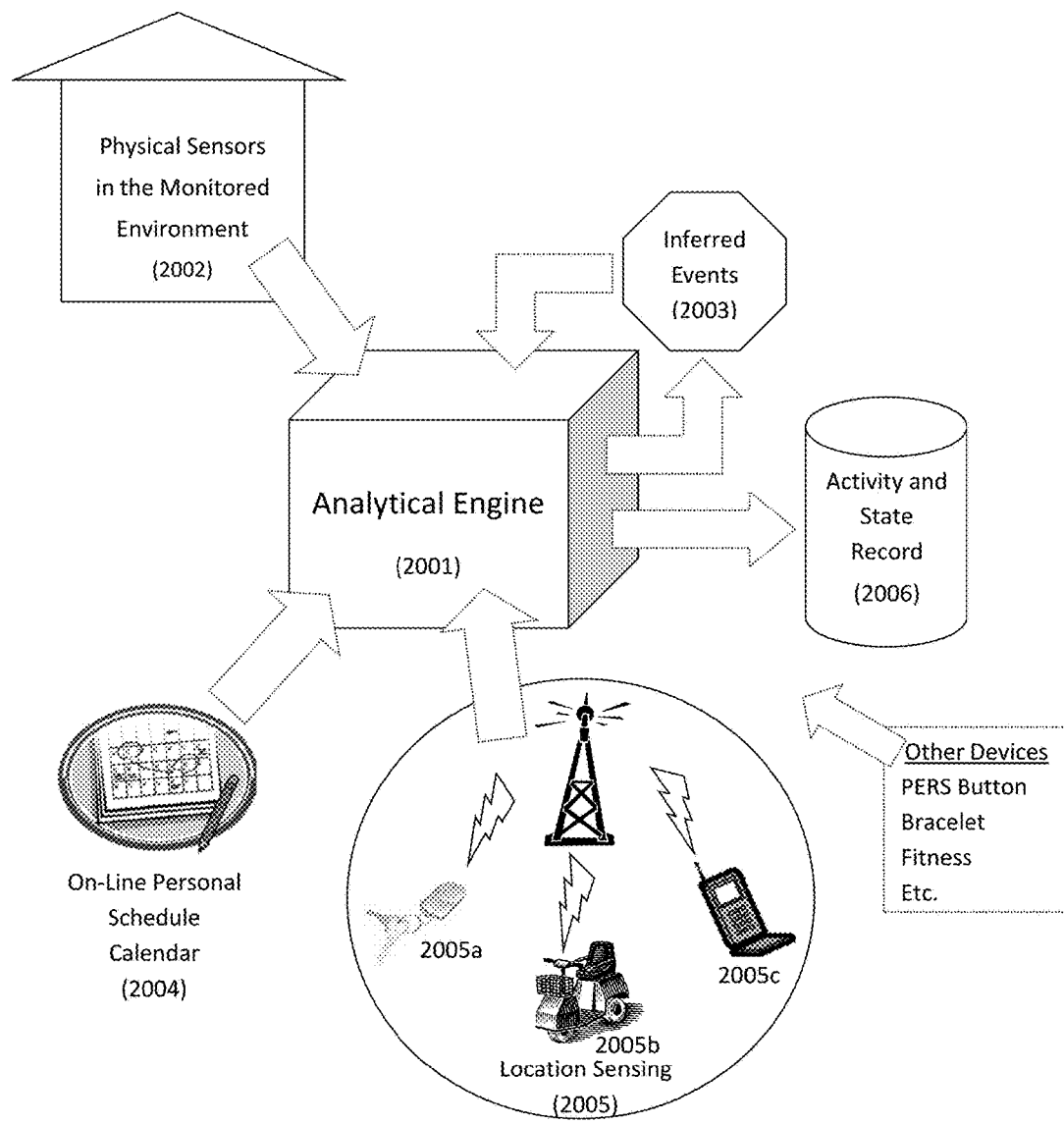
FIG. 11A is a schematic diagram generally illustrating the interactions and operational intercoupling of various system portions during typical monitoring mode operation of a system implementation of the embodiment shown in FIG. 10.

FIG. 11A schematically illustrates system level interactions and operational intercoupling of various system portions, including the flow of certain data therebetween, during typical monitoring mode operation in one exemplary application of the system embodiment illustrated in FIG. 10. FIG. 11A illustrates the central role of the analytical engine 2001 in reducing sensor detections and other piecemeal information in deriving inferred events and determination of the Monitored Person's activity and/or state of well-being therefrom.

In the particularly illustrated application, the system is configured with various supplemental event sensing sources 2002', such as a personal emergency response system (PERS) sensors incorporated with jewelry, fitness accessories, or other suitable devices worn or carried by the Monitored Person. These supplemental sensing sources add to the event detections acquired through the use of direct physical sensors installed within the monitored environment 2002. The event data collectively acquired by physical sensor detection is augmented in this application by the analytical engine 2001. Preferably, the analytical engine 2001 is programmably implemented on a suitable computer processor-based platform. It is configured to execute computer readable programs in such manner as to, among other things, generate inferred events 2003 from combinations of other input, or absence of input, in accordance with programmed logic and learned patterns, as described in greater detail in following paragraphs. This other input may include, for instance, information from a schedule calendar 2004 personalized to the Monitored Person, and information from one or more location sensing mechanisms 2005, as also described in greater detail in following paragraphs.

Out-of-Home Inferred Event

The inferred events 2003 preferably include in the illustrated embodiment an out-of-home determination. Typically, the normal daily activities of a Monitored Person include some activities away from the controlled environment 2002. Accurate, reliable determination of those periods where the Monitored Person is physically 'away' from the controlled environment 2002 is essential to keep consequent periods of inactivity sensed within the controlled environment 2002 in proper context. Acquired sensor output may be analyzed in this regard either directly or indirectly. Direct analysis may employ for instance data acquired from a locating device known to remain with or in close proximity to the Monitored Person. Indirect analysis may include such things as pattern analysis of sensors both within and without the controlled environment to determine the Monitored Person's location to be outside the controlled environment 2002. Such location information provides effective event sensing for the system, where a set of logic rules are applied to properly infer that a lack of human-triggered sensor readings within the controlled environment 2002 is due to the Monitored Person's therefrom. Preferably, more than one such inference measure is employed to establish a valid 'out-of-home' determination, given the safety-sensitive nature of the system implementation. The redundancy minimizes the likelihood of false positive or false negative system inferences.

More specific examples of suitable measures for establishing or verifying the Monitored Person's being out-of-home include those which productively exploit devices and equipment already used by the Monitored Person to expand the system's sensor capabilities. Examples include:

1. Attachment of a sensor for the purpose of detection and localization of a key-chain, hat, shoe, belt, cane or other movement aid/enhancer, or any device typically worn, carried by, or otherwise remaining in proximity of the Monitored Person when said person leaves the controlled environment 2002. FIG. 11A illustrates a z-wave linked key fob 2005a, as but one example. Suitably configured to wirelessly communicate with the system's analytical engine 2001, geo-location tools incorporated in the key fob 2005a would generate location data for transmission to the analytical engine 2001. Incidentally, the wireless communication key fob 2005a may be additionally equipped with ancillary features to enhance practical utility, features such as a light source at the key receiving area, and/or auto-locating hardware to provide visual or auditory cues to aid the Monitored Person to find the key and key fob when misplaced.

2. Localization of a mobile communication device such as a mobile phone 2005c carried and used by the Monitored Person to send and receive wireless mobile signals. Mobile transmission signals of the device may be used suitably to geo-locate the device 2005c. The device 2005c then serves effectively as a sensor for purposes of monitoring with respect to the environment/setting 2002, which indicates whether the Monitored Person is or is not physically within the boundary of the controlled environment 2002. Mobile devices may be geo-located through, for example, triangulation with nearest signal towers (e.g., e911 services or local in-building routers), or through direct localization (e.g. GPS-enabled phones).

3. Localization of a transport system external to the controlled environment such as a vehicle, scooter, or wheelchair. Localizing technology equipped on a personal transport vehicle or the like may be used to provide sensing input to the system's analytical engine 2001. The transport vehicle's geo-location may be transmitted to the analytical engine 2001 for use as reliable indication of the Monitored Person's current location, and on that basis determine whether he/she is or is not within the boundary of the controlled environment 2001. In FIG. 11A, the transport vehicle is shown to be a mobility scooter 2005b, by way of example.

4. Wearable sensor capable of wireless communication. Regardless of its primary purpose, any wearable sensor capable of wireless communication, its wireless communications may be directed or shared with the analytical engine 2001 for the added purpose of ascertaining the current and instantaneous physical location of the Monitored Person, so that his/her whereabouts relative to the controlled environment 2001 may be determined. A personal emergency button or location tracking bracelet (not shown) are but two of numerous examples which may be employed in this regard.

In each of the examples described in paragraphs 1-4 above, the whereabouts of the Monitored Person need not be known with exacting precision for the illustrated system embodiment's purpose of determining out-of-home conditions. Precision is needed only insofar as the localizing data transmitted to the system's analytical engine 2001 unambiguously positions the given device or equipment accompanying the Monitored Person either inside or outside the controlled environment 2002.

5. In addition to these direct analysis measures described in paragraphs 1-4 above for out-of-home determination, one example of an indirect analysis measures the prediction or scheduling of an event occurring away from the controlled environment 2002. As described in following paragraphs (relating to the inclusion of a scheduling process in the system), prior knowledge of an event outside the controlled environment 2002, coupled with factors giving rise to the expectation of the Monitored Person attending that event, serve to weight (in the sense of decision quantification) the event toward an 'out-of-home' inference. FIG. 11A illustrates, for example, the use of an on-line calendar link 2004 to that effect. The system may comprise a built in calendar scheduling function executed by the analytical engine 2001 in certain embodiments, and in certain other embodiments, may link to an external calendar scheduling system such as through a desktop application, a server linked application such as OUTLOOK, or through a cloud based service such as GOOGLE, and the like.

6. Indirect inference based on detection/non-detection data acquired from one or more sensors within the controlled environment 2002 that the Monitored Person has left the zone of monitoring. A pattern of activity may be learned by the system indicative of the Monitored Person's history of departures from the controlled environment 2002. For example, if a person generally leaves through a garage doorway attached to the kitchen, then a consistent pattern of activity may be established in the following sequence: activity in the kitchen, followed by opening of the garage doorway, followed by activity in the garage and resetting of activity in the kitchen to quiet, and subsequent resetting of activity in the garage to quiet thereafter. Detection of this sequence of activity by appropriate sensors would suggest that the Monitored Person has departed according to his/her typical pattern. The system may learn one or more such departure activity patterns typical of each of the monitored individuals, with respect to the various departure portals available in the controlled environment 2002. These departure activity patterns may form adaptive bases for reliable departure inferences upon detections/non-detections by the sensors at or near each departure portal.

As noted, the silence (or lack of activity) within an area of the controlled environment 2002 constitutes an event type in itself. Thus, a period of silence after such a departure activity sequence is reliably interpreted as a strong indication of the Monitored Person's departure from the premises; whereas, a period of silence not preceded by such a departure activity sequence may demand closer scrutiny. Generally, the goal is to discriminate an out-of-home, or away-from-home state from a genuinely anomalous silence in activity, more acutely consistent with incapacitation or similarly alarming mishap. Because a Monitored Person may have such mishap even in the course of an ordinary departure pattern, any inference of departure is preferably cross-checked against other information such as that obtained as described in paragraphs 1-5 above. This is but one example of the numerous inferred events 2003 that may be employed, depending on the particular requirements of the intended application.

Notification of Authorized Persons

At the time an individual agrees to become a Monitored Person within a controlled environment 2002, multiple categories of roles for other individuals are preferably designated for use and administration of the system. Examples of categories include (as indicated in FIG. 10): Authorized Observers 1013 who have been granted permission by the Monitored Person to access some or all of the data and information available in the monitoring system pertaining to the Monitored Person; and, Responders 1012 who have been given permission by the Monitored Person to respond to notifications and alerts sent by the monitoring system pertaining to the Monitored Person.

Further examples include certain individuals having social network contact (Social Contacts) with the Monitored Person who have agreed to communication within the system platform with and regarding the Monitored Person. Examples also include individuals known to the Monitored Person having acquaintance with him/her through certain mutually accessed function(s) supported by the Monitoring System. These Acquaintances may include, for instance, various service or system support personnel.

In the case of Authorized Observers, each Authorized Observer is preferably assigned a designated level of access to information and data on the system pertaining to the Monitored Person. As an example, a primary UI screen may summarize all event data into a combined summary indicator consistent with the Monitored Person's personalized behavioral history. The Authorized Observer may then be presented with an indicator as to whether the Monitored Person's current behavior fits within the expected bounds of his/her normal activity history. The indicator may be as simplified as a green checkmark indicating 'OK' or a visually contrasting alternate mark indicating that current behavior falls outside the bounds of normal activity history and rises to a level of concern (for instance, an orange dash indicating 'not OK').

The primary UI screen may also display other details, such as to show certain current conditions within the residence or other monitored environment 2002, and indicate whether certain sensors or the overall monitoring system is active, as illustrated in FIG. 4. The primary screen is preferably configured to give access to one or more other secondary screens providing greater detail(s). Depending on the particularly intended application, a secondary screen may, for instance, present a summary of event types, such as sleeping, eating, and other activities, such as illustrated in FIGS. 5 and 6. Functions relating to system maintenance (such as monitoring battery levels for sensors) and response to system alerts may be included in one or more secondary screens. Information that reveals a prior day's activity pattern or cumulative average time spent on certain predetermined activities is preferably though not necessarily provided in a primary screen.

Figure 12:
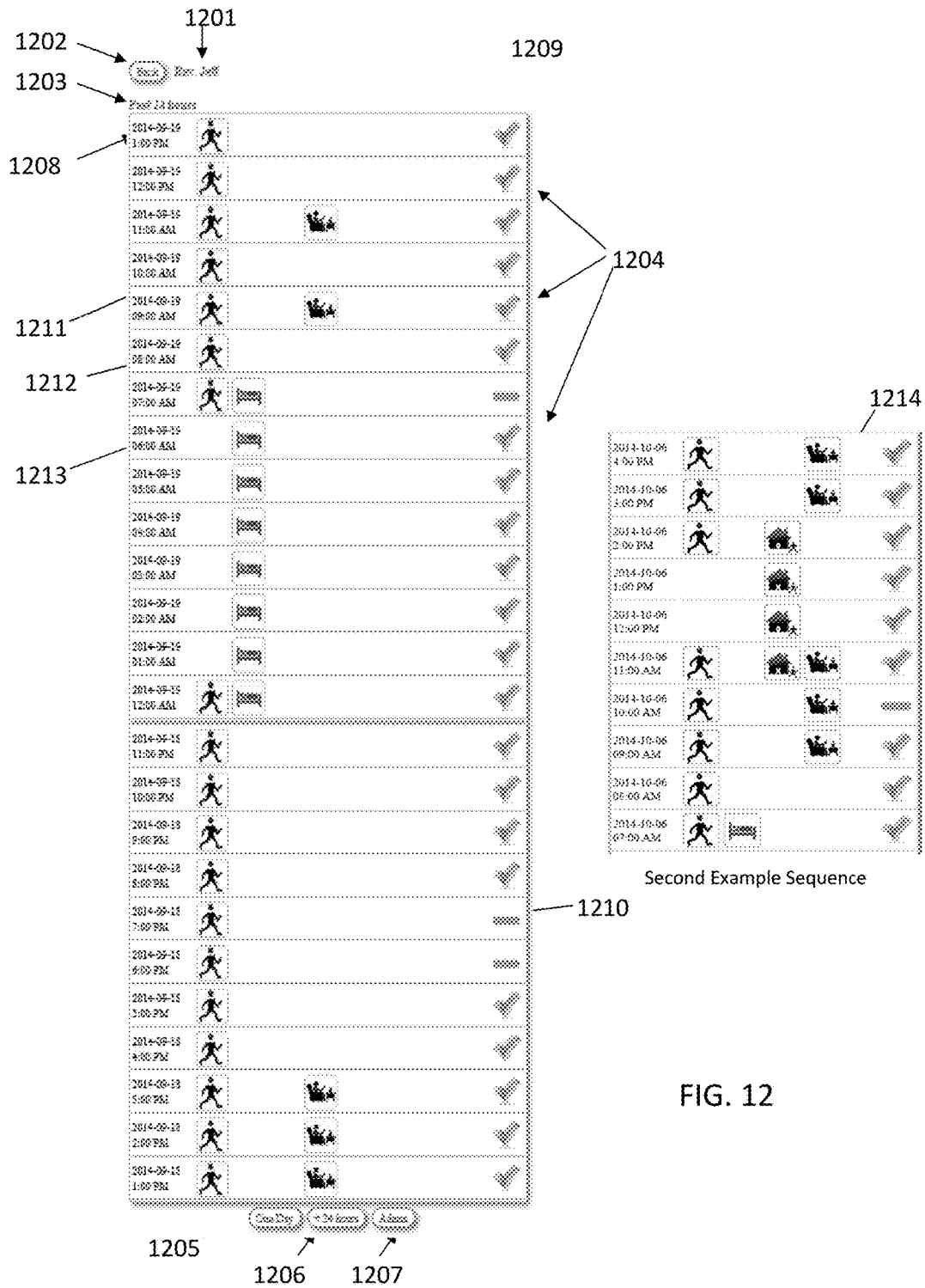
FIG. 12 illustrates one example of a GUI display component generated during operation of the system implementation of the embodiment shown in FIG. 10, used to convey a monitored person's state history information to certain authorized persons.
Figure 13:
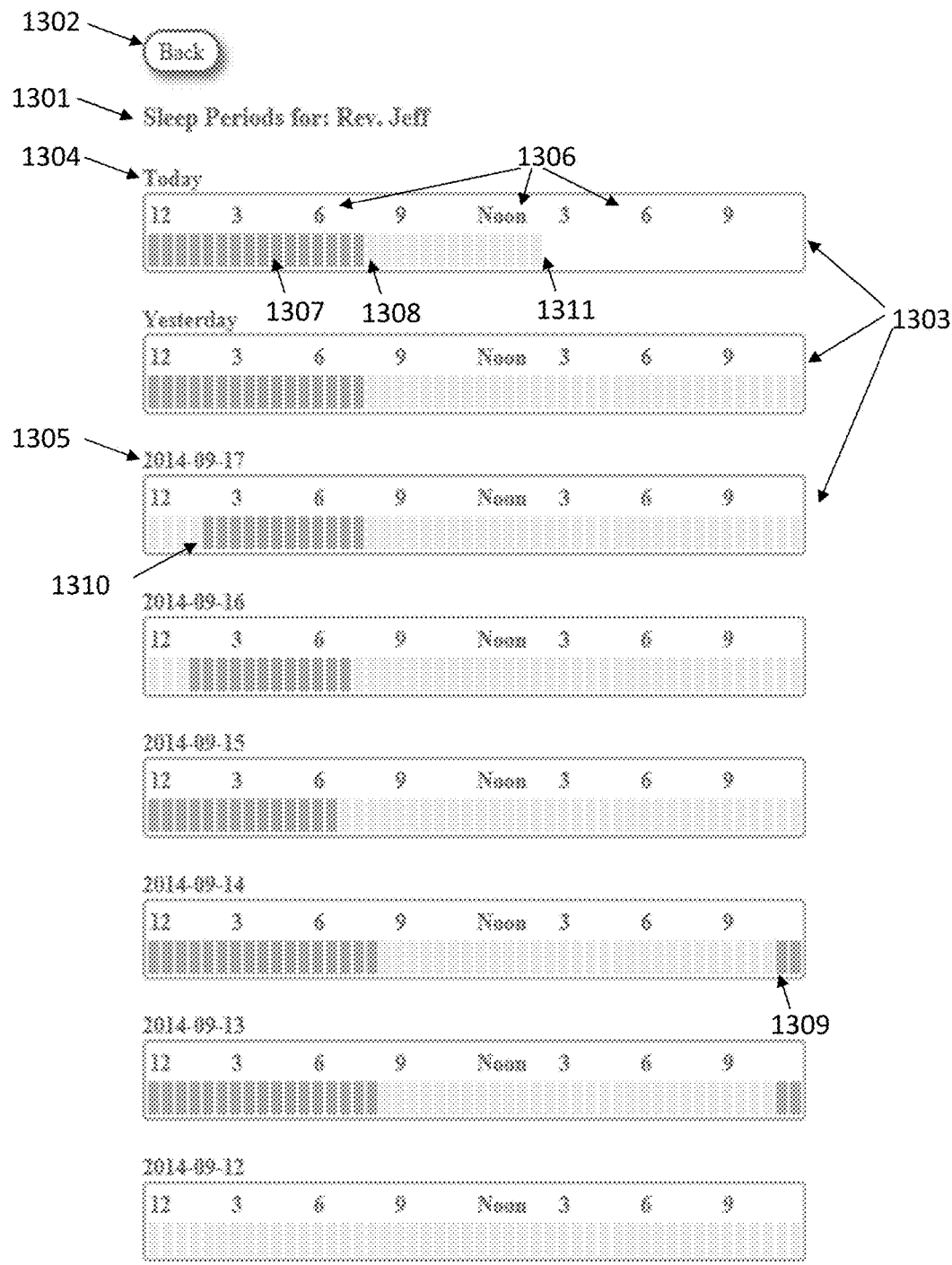
FIG. 13 illustrates one example of a GUI display component generated during operation of the system implementation of the embodiment shown in FIG. 10, used to convey a monitored person's recent sleep period history information to certain authorized persons.
Figure 14:
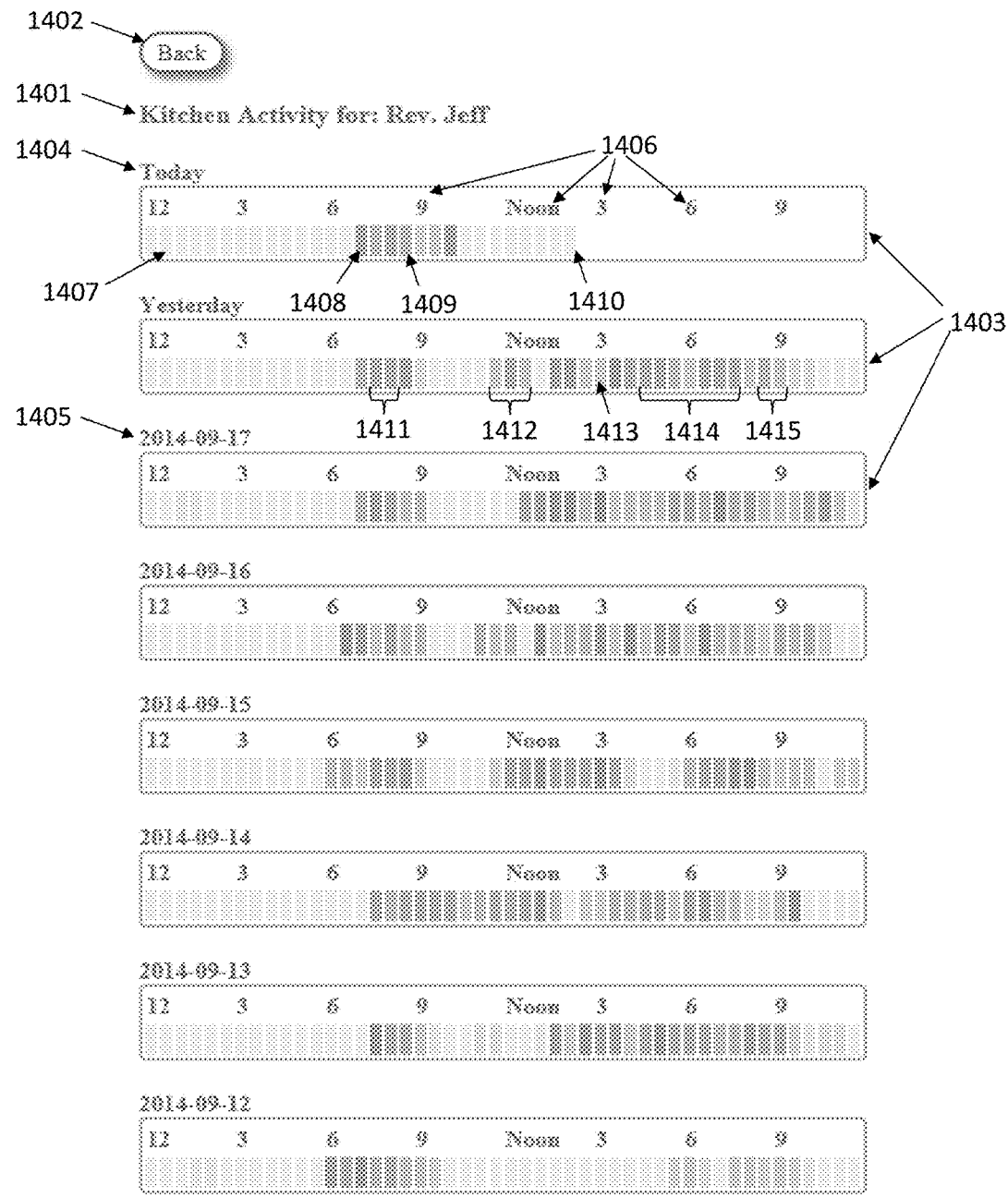
FIG. 14 illustrates one example of a GUI display component generated during operation of the system implementation of the embodiment shown in FIG. 10, used to convey a monitored person's recent meal and kitchen use history information to certain authorized persons.

Depending on the particularly intended application, one or more tertiary screens may be accessed from a secondary screen. Preferably, such tertiary screen displays information or data, broken down into visual or quantitative representations (suitably, in applicable units such as hours, minutes, or the like) over a certain period of time (over one day, for instance). The information or data may alternatively be displayed, among other things, as a representation of a statistically averaged time period (such as a day or a week). FIGS. 12-14 illustrate examples of such screen displays, as described in further detail in following paragraphs. In some embodiments and applications, a further level of display—one or more quaternary screens accessed from a tertiary screen—is added to display actual data. Where this quaternary detail level is provided, the system is preferably configured to enable the same to be selectively suppressed/disabled from Authorized Observer views, in order to limit the Monitored Person's privacy exposure, but preferably remains available at least to system administrators for use in providing technical support and accommodating system tracing and debugging.

Separate from this hierarchically accessed configuration of primary to secondary, tertiary, quaternary, or more levels of screens, one or more other extraneous categories of screens is preferably employed, depending on the needs and resources of a particular embodiment and application. For example, one category of screens is preferably activated in connection with responsive actions taken when an Alert is issued. When a Monitored Person is determined by the monitoring system to be exhibiting sufficiently inappropriate inactivity (as determined according to applicable system settings), an alert signal/message is pushed to designated Responders, whereby the actions taken by the system may be viewed. Another category of screens preferably displays contact information relating to Authorized Observers/Persons and Responders, and other persons designated by the Monitored Person. Yet another category of screens displays relevant personal information for the Monitored Person, such as medications, copies of health directives, list(s) of contact information for professionals such as personal physician or lawyer, or the like.

The entry for any Authorized Person preferably includes an individual's full name, street address, phone number(s), and designated access (for instance to selectively authorized ones of the hierarchical and extraneous screens). Preferably, a read-only, read/change, or other such limit on permitted screen/system access is selectively designated for each Authorized Person.

The monitoring system preferably provides for categorization and prioritization of designated individuals given permission by the Monitored Person to access different levels of communication within the system. In certain cases, the prioritization entails successive communication by the monitoring system, and structured feedback from contacted individuals back to the monitoring system. One example is where an individual designated by the Monitored Person to be a Responder when a sufficiently suspicious lack of activity (concerning anomaly) within the controlled environment is recorded by the monitoring system (for instance, at a time when the Monitored Person is expected to be within the controlled environment). The Responder is contacted by the system in this regard, to determine if the Monitored Person in fact needs assistance. Preferably, a set of Responders is pre-designated by mutual agreement with the Monitored Person, such that the system upon detecting the potentially harmful condition first sends suitable communication to one or more highest priority Responder(s), with the Responder having readily accessible measures for acknowledging receipt of the communication and promptly contacting the Monitored Person. If receipt is not acknowledged top the system, or if the Responder cannot establish contact with the Monitored Person within a pre-defined period of time, the system preferably sends a communication to the next designated Responder(s). This sequence is repeated until a Responder acknowledges both receipt of the communication and initiation of efforts to contact the Monitored Person. Otherwise, the system preferably defaults to a paid service such as a call center, or a public emergency response system such as 911. The system then prompts the acknowledging Responder at predetermined time intervals after initial contact for update report as to the Monitored Person's confirmed condition. The update reports (or their results/effect) are made available to designated Responders and Authorized Persons.

Depending on the particular embodiment and application, a designated Responder may or may not be a professional caregiver or emergency personnel. The designated Responder may be a family member or other interested party, who may even have other designations within the system like an Authorized Person.

Figure 17A:
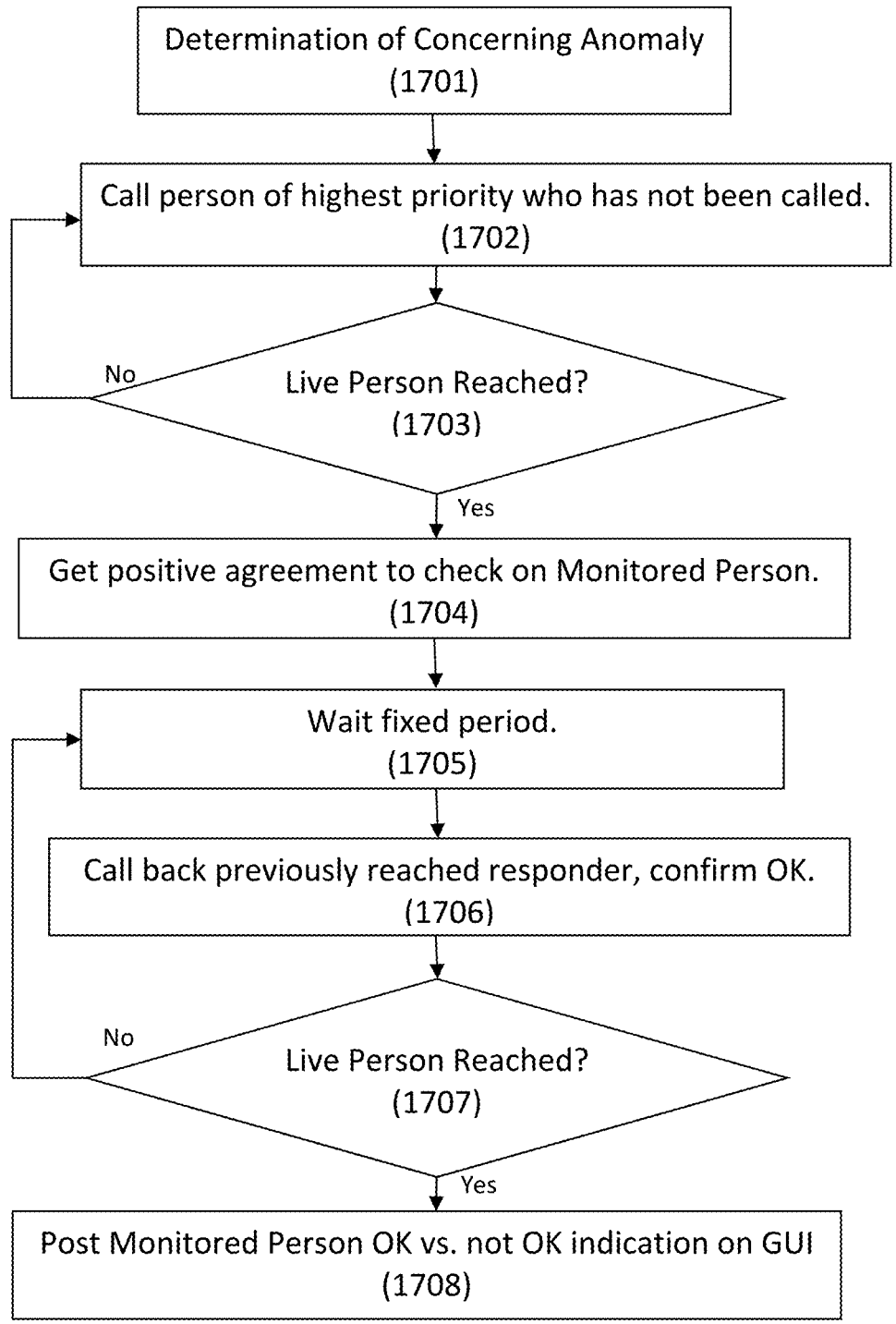
FIG. 17A is a flow diagram illustrating a flow of certain processes carried out during operation of the embodiment of FIG. 10, for automatically contacting one or more Authorized Observers and/or Responders in one exemplary application.

FIG. 17(a) illustrates a flow of processes involved in an illustrative Responder communication sequence as described in preceding paragraphs, in accordance with one exemplary embodiment and application. When a concerning anomaly is detected by the system at block 1701, the process flows to the system automatically actuating a call (via telephone, email, text, or any other suitable mode of communication employed) to the highest priority Responder not yet called on a designated Responder list. Such a list is exemplified by the table illustrated in FIG. 17(b). Each Responder is adaptively assigned a rank order that is preferably dependent on the time of day at which a given event occurs. If the list or rank order have not been set, or if call/confirmation attempts through all Responders on the list have been unsuccessfully exhausted, then the system falls back to a pre-established default to establish human contact such as actuating a public response system like 911 or prompting a pre-arranged private call center.

The highest ranked Responder not yet called is phoned by the system at block 1702, and if a Responder fails to answer live within a designated period of time at block 1703, a call is attempted to the next Responder on the list. If a live answering Responder is reached, positive agreement is obtained from the Responder that he/she will check on the monitored person, as indicated at block 1704. If the system makes the call(s) using an automated phone system, the response may be in suitably efficient and convenient form, such as through touch tone button entry or the like. As noted in preceding paragraphs, the term "call" is used in a general sense herein, referring to a "call" made via various other suitable communications means or media known in the art, such as text messaging, email, or push data to a Smartphone app. Preferably, media appropriate measures to confirm agreement are suitably provided in support of these Responder calls. In the absence of positive agreement, the system treats the situation much as if a live answering Responder were not reached, and the flow returns to block 1702, to attempt another call to the next Responder, if any, on the list.

Once positive agreement is received from a Responder to check on the Monitored Person at block 1704, a fixed waiting period ensues at block 1705. The duration of this waiting period is set depending on the particularly intended application. A typical waiting period may be set in the illustrated example within a range of approximately 15-30 minutes, but remain adjustable as needed via system setup provisions. After the waiting period elapses without confirmatory update by the Responder, the system again calls the same Responder at block 1706 to confirm if the subject Monitored Person is found to be OK. If no live answer is obtained at block 1707, then this callback is preferably deferred by another fixed waiting period. Although not shown, this callback process may be limited in certain embodiments and applications to a fixed number of attempts, so that if a Responder agrees to attempt contact with the Monitored Person, but fails to update the system or fails to accept a subsequent check-back phone call within three tries, for instance, the system gives up on that Responder and returns the flow back to step 1702 to find another potential Responder, if any remain on the list.

If, however, a live answering Responder is reached at block 1707, the system invites the Responder to update the system on the status of the Monitored Person. This status— whether OK or not OK—is preferably indicated in a portion of the GUI to be made available to other Responders and Authorized Observers for viewing.

Preferably, this system serves to encourage a social network of Authorized Observers and Responders to check up on a Monitored Person. The system thus promotes a social network that facilitates more appropriate responds to preliminary indications of potential emergencies. That is, with duly restrained and graduated response action to first take reasonable verification measures, then prompt more critical response measures as needed if the verification measures warrant. The serious, high-medical concern, and fast emergency response are thereby reserved for truly exigent situations. The system, by virtue of its fall back default settings, is nonetheless able to automatically prompt conventional emergency responses measures to err on the side of abundant caution where reasonable verification measures are not available, unclear, or otherwise inconclusive.

Monitoring Process and When to Notify

Referring more closely back to FIG. 10, the monitoring update process implementation example 1010 illustrated a case where the controlled environment is the residence or other dwelling place of the Monitored Person 1001, in which a predetermined set of sensors have been installed to detect various actions. The Monitored Person 1001 manifests behaviors through actions that are detected by these sensors as events 1002 triggering the monitoring update process 1010. These events may include but are not limited to causing or permitting electrical consumption devices to turn on or off (such as effecting flow of electricity by placing a rechargeable unit like an electric toothbrush into its charging station, switching a nightlight to turn, or triggering a corresponding motion detector to indirectly switch the same). Other detected events may include moving an object in space, emitting non-visible energy from an appliance or device (such as a WiFi signal emission from a device or appliance, or activating a remote control device for an appliance), triggering a motion detector switch to control water to flow, generating sound, or maintaining operation of devices or appliances (continually using a computer to keep it actively powered on as opposed to leaving the computer dormant and thereby letting it enter standby power).

These and/or other various events are preferably identified and grouped in time, space, and/or sequence such that each event may be assigned a confidence level corresponding to their tendency for repetition in time and/or space and/or sequence. The monitoring update process 1010 preferably includes computing (or recalling previously computed) statistics and accordingly applying a threshold approach to determine whether a currently detected event matches or exceeds profile limits with a designated confidence level, as indicated at block 1003. Upon determination of the event satisfying the detection confidence level, the time of day at which these events occur is generated at block 1004, preferably as an average and range, with suitably determined statistical confidence intervals. Again, these may be computed on the fly, or computed in advance and recalled from a database. After determining the average time and range, a confidence score for recurrence of that event is preferably generated, including for the time of day, the day of week, or day of month. The system is preferably configured in the illustrated example to monitor those events, track the occurrences of those events, and record when such events fall outside a previously determined range (block 1005) upon identification of events traversing a designated level of confidence for periodic repetition.

The system preferably displays on the UI certain available details of an event, or group of events, as indicated at block 1006. Depending on the particularly intended application, the available details may include for an event average time of the event, range of time for the event, and measure of confidence that the event will be repeated consistent with prior events. The system may also indicate on the UI those days on which computed event details are not consistent with those of prior events, and nature of the inconsistency.

The UI display may be monitored by the Monitored Person and/or any of the designated Responders, preferably at will. This is typically achieved by one of these reviewers either logging in through an access controlled interface to view the UI, or by accessing it from a designated mobile or desktop application. Within the UI, the Monitored Person and a designated Responder may selectively adjust such settings as a notification time related to the range within which an event is expected to occur. This is a sensitivity adjustment, made relative to the statistics generated for each event type for each Monitored Person. Thus increasing sensitivity triggers more alerts, while decreasing sensitivity triggers fewer alerts. This sensitivity may, in preferred embodiments, be set either globally for all designated Responders, or individually, to suit individual Responders' personal preferences as to viewing and receiving such alerts.

Generally, Authorized Observers 1013, Designated Responders 1012, and Monitored Persons 1001 are each permitted sufficient access to can adjust system preferences by execution of a setup and sensitivity adjustment module 1011. Preferably, the degree to which normal ranges applicable to certain events, in either time of event or intensity of event detection, may be exceeded to trigger different levels of system response is adjustably set. A first degree, preferably in the form of a first threshold, outside the given range for triggering anomaly determination of anomalous condition and displaying the same on the UI is adjustably set at block 1007. A second degree, also preferably in the form of a second threshold, outside the given range for actuating transmission of push notices to the Responder(s) is adjustably set at block 1008. As described herein, the Monitored Person(s) 1001 typically designates their Authorized Observers 1013 and Responders 1012, and sets suitable controls for privacy limits, as indicated at block 1009. In some instances, appropriately privileged Authorized Observers may be permitted to designate one or more Responders as well.

Should any event in question not occur before the expected notification time, although the Monitored Person is expected to be on the premises and an alternative activity is not present, as determined according to the degree setting at block 1008, the system generates an alert to the Responder to initiate verification measures. This includes the attempts described in connection with FIGS. 17(*a*)-17(*b*) to contact the Monitored Person and check up on them. Such alert determination, for example, considers the time of day at which the Monitored Person normally leaves his or her bedroom, relative to his/her expected wake up time. If the Monitored Person's range of wake up times is typically 7 am to 8 am, and a notification time parameter is set at one hour, then an alert is generated for the Responder if the Monitored Person does not leave the bedroom by 9 am. False positive notifications related to inactivity may be minimized by adjusting the time of notification in accordance with the repeat confidence level for that event, or set within a certain degree of statistical confidence in time variation (for example, within 3 standard deviations from the average time).

Events within a preceding time duration (such as number of immediately preceding hours) may also be used to optimally refine notification time or notification message. Examples include linking the use of electrical devices within the previous 12 hours to wake up time (for example, one hour of unusual late night TV watching could extend notification time by one hour to preserve total sleep time at the normal level), or extending notification time based on a calculated sleep time totaling a specified number of hours (for example, setting notification to occur when sleep time has exceeded 10 hours within a given 24 hour time span).

The existence of a notification may also be affected by the confidence level of a repeat event. For example, an event such as wake up having, say, a 98% confidence of repeat occurrence when the Monitored Person is in the residence may warrant a relatively short 15 minute notification interval, whereas an event such as watching a TV program having, say, a 90% confidence of repeat occurrence may warrant a longer one hour Notification.

Inclusion of Scheduling Process to Inform Discreet Monitoring as if Schedule were Event Sensor It is advantageous for the monitoring system to be initialized or otherwise configured with certain a priori knowledge, including a schedule of irregularly timed and planned events relating to the Monitored Person(s). The known schedule would inform activity pattern and event inference processing executed by the system's analytical engine 2001, and provide opportunity for the Monitored Person and other authorized persons to communicate and/or schedule the Monitored Person's events. These planned events provide effective event sensor input for system monitoring purposes, and also contribute redundancy for out-of-home verification.

One example of a scheduling process employed by the system incorporates a digital Calendar on which appointments, meetings, and occurrence notifications are recorded, preferably along with additional information regarding whether the scheduled event was to be attended within the controlled environment or not. Similar to the process of granting data access permissions, the Monitored Person may selectively configure the system to grant read or read/write authority to designated persons. A scheduled appointment such as a healthcare conversation and checkup may be conducted at the Monitored Person's home, or at the Healthcare Provider's office. There is informational value to both the Monitored Person as well as to the monitoring system in identifying on the schedule the physical location at which the conversation takes place. Similarly, with the increasing number of social interaction opportunities through digital communication devices, verification of the site at which a scheduled interaction or activity is expected to occur is likewise beneficial to both the Monitored Person and the monitoring system.

For an event that is to recur, the scheduling process preferably opens the user interface to allow the Monitored Person access to the event with minimum effort. In one illustrative embodiment and application, a GUI window on the Monitored Person's communication device enables participation in a scheduled group activity (for example, card game, BINGO game, video game, book club meeting, or the like), or to view or hear a certain entertainment program. However, the Monitored Person or an authorized scheduler must initiate or approve the group activity in order to register the same as an event within the monitoring system scheduling process.

The inclusion of scheduling as an effective event sensor input is indicated in FIG. 11A by block 2004. The exploitation of such input is illustrated for one implementation example shown in the flow chart of FIG. 16. In the illustrated example, the system continuously monitors at block 1601 for events of various types, including physical sensor detected events (motion, switch on, off, etc.), as well as computed virtual events (such as meals and sleep, house departure, and the like). The system preferably also monitors for expected and scheduled calendar events. Expected events include those activities which have been determined from past behavioral history to occur with a predetermined threshold of likelihood at a particular time of day, or at a particular combination of day of week and time of day.

For example, the system may determine from relevant past behavioral/activity history that a Monitored Person watches TV with 95% likelihood at 1:00 pm each Tuesday afternoon, while it may determine from relevant past history that the Monitored Person consumes a snack at 3:00 pm with only 65% likelihood. Based on a predetermined threshold of 90%, the TV watching event at 1:00 pm would constitute an expected event in this instance, while the snack consuming event at 3:00 pm would not. Calendar events entered (as described with reference to FIG. 11A) that predict a corresponding detectable change in the Monitored Person's environment would also be considered missed if the change in the corresponding environment is not detected (for example, events that predict an out-of-house state up to one hour before the current time).

Figure 16:
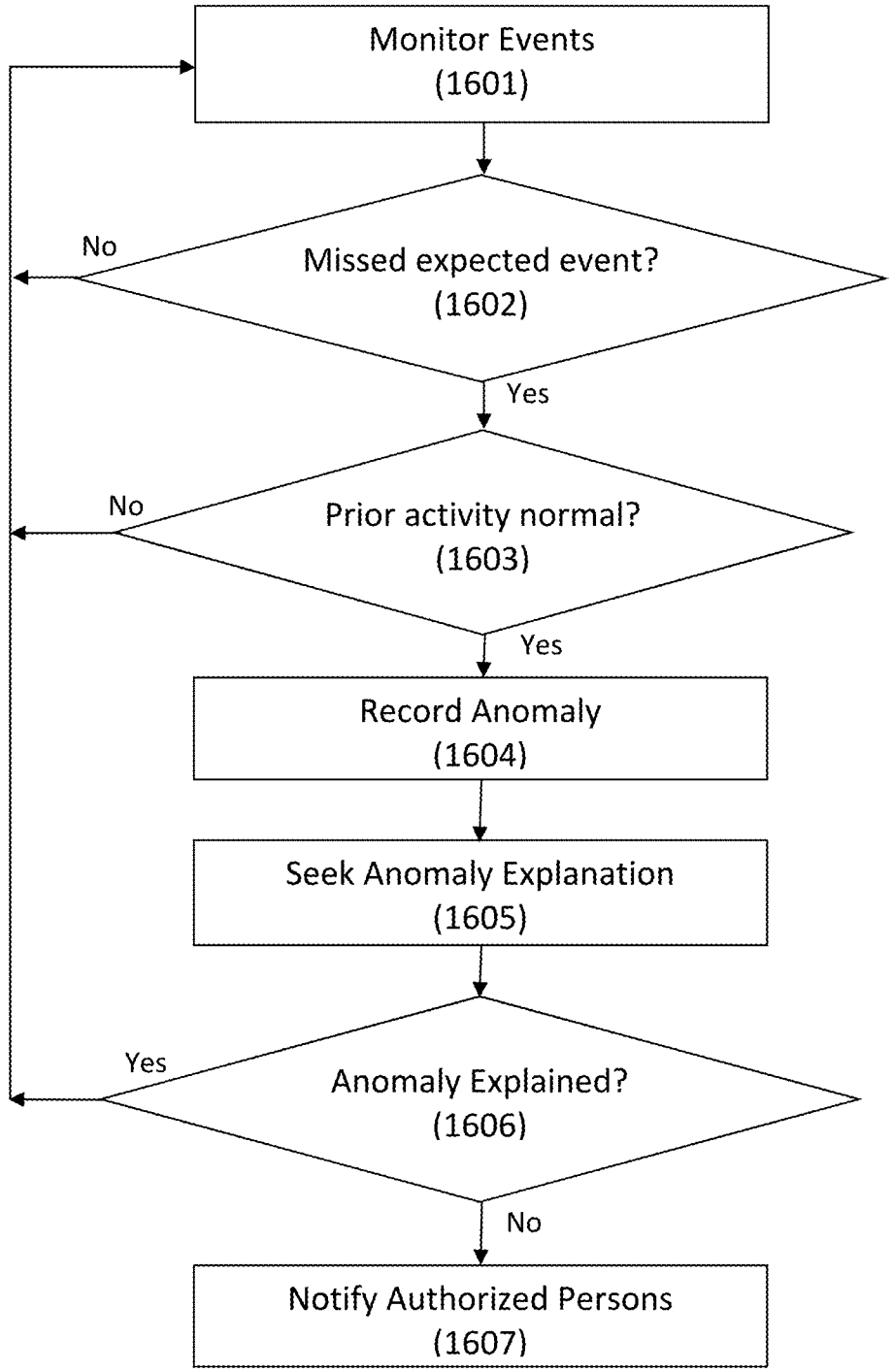
FIG. 16 is a flow diagram illustrating a flow of certain processes carried out during operation of the embodiment of FIG. 10, for detection of anomalous events and reasoned filtering thereof, in one exemplary application.

As shown in FIG. 16, if such a missed event is detected at block 1602, the system makes a further check at block 1603 for prior activity in the controlled environment that may have been anomalous within an immediately preceding time period of selectively pre-set duration (such as 2 hours immediately before the missed event). This is a preferable though not necessary feature which contributes to avoiding a cumulative chain of anomalies and/or notices from being generated based on a single missed event. Thus, if normal activities were already disturbed within the preceding time window of, say, two hours, the new missed event is properly de-emphasized in context, as it was likely triggered, or precipitated by, prior disruption in normal activity such as prior missed events. Otherwise, if the missed event is in fact a new disturbance, then it is recorded as an anomaly at block 1604, and flow proceeds to block 1605, where an explanation for the anomaly is sought.

Explanations for such anomalies preferably include but are not limited to the following: (1) If a Monitored Person is verified out-of-house, then missed events within the house are not in and of themselves deemed a concern. Failing to return home, or being away from home at an unusual time, however, may be deemed anomalous in accordance with system settings. (2) If a Monitored Person has entered an event on the calendar that indicates he/she will be out-of-house at the given time, then missed events within the home during the scheduled out-of-house event are not in and of themselves deemed a concern. One or more redundant checks in this regard are preferably employed for safety-enhancing verification purposes. For example, redundancy verification is made by the Monitored Person having both pre-scheduled an away-from-home event, and missed activity detections within the home confirms the Monitored Person to indeed be out of the house during the scheduled event.

Other examples of anomaly explanations may include the Monitored Person's failing to undertake a normally expected activity for the reason that he/she is still in bed. Again, the late rising itself may constitute a concerning anomaly, but the failure to undertake the other activity may be explained by the late rising.

If the anomaly is explained at block 1606, the flow returns to block 1601 to resume monitoring. If the anomaly is not explained, the anomalous missed event is escalated to a concern of note, and appropriate steps are taken to indicate the anomalous state on the GUI and to alert and notify appropriate authorized Persons.

Figure 11B:
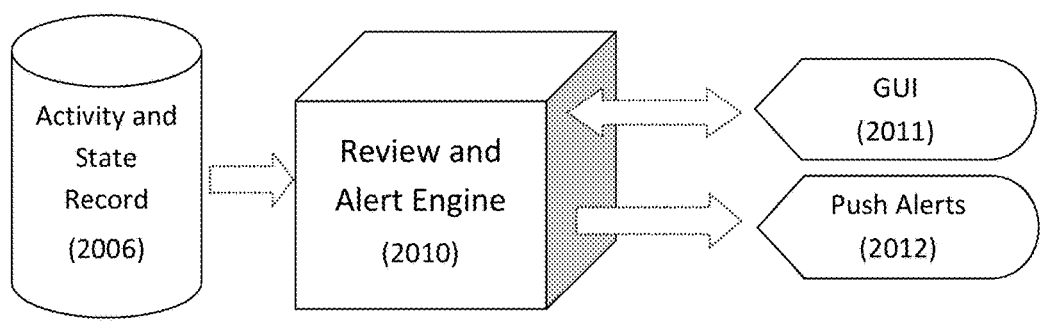
FIG. 11B is a schematic diagram generally illustrating the interactions and operational intercoupling of various system portions in connection with the system implementation shown in FIG. 11A.

Review and analysis of acquired event data and the generation of appropriate alerts is preferably carried out by the system through a review and alert engine 2010 illustrated in FIG. 11B, in accordance with one exemplary embodiment of the present invention. The engine 2010 may be implemented as part of the analytical engine, programmably integrated into its computer processor-based platform, or may be otherwise implemented on a separate computer processor-based platform. The engine 2010 accesses historical activity data accumulated and stored for the Monitored Person in the activity and state record 2006 (implemented by any suitable memory device(s) known in the art) to carry out such review and alert processing as illustrated in FIGS. 16 and 17A-17B. The engine 2010 thereby operates to communicate with control various operational processes in connection with configuring and generating GUI displays 2011 and pushing alerts 2012 for various authorized Persons of the system. Among other things, the engine 2010 preferably uses state information and based on its observed regularity or irregularity to prompt updates to the GUI display and/or initiate pushing of alerts to authorized Persons.

Inclusion of Environmental Emergency within Anomaly Detection and Notification Related to Monitored Person The monitoring system may be linked in certain embodiments and applications to a locally relevant environmental monitoring system (such as one derived from a weather monitoring station). In the case of an extreme event such as an earthquake, tornado, hurricane, or others noted within a designated number of miles from the monitored environment (or from the Monitored Person in certain applications), the system may then record the extreme natural event as an external anomaly for consideration in subsequent pattern analyses. The system may also alert designated Observers, Responders, and any other predesignated individuals—such as from a predefined Contact List—of the extreme event's proximate occurrence and the activity of the Monitored Person thereafter. Similarly, detection of an in-home emergency event detected by a sensor such as a smoke or water detector may be immediately recorded by the system as an anomaly for consideration in subsequent pattern analyses. The system may accordingly alert the designated Observers, Responders, and any other predesignated individuals of the in-home event's occurrence, and the activity of the Monitored Person thereafter.

Communication Network for Support and Wellbeing of Monitored Person

The monitoring system effectively establishes a de facto support network of associated persons through permissions mutually agreed upon with the Monitored Person. Social associations with individuals approved by the Monitored Person may be promoted with a simplified configuration of the monitoring system to communicate in real time, or to enter a future communication time on the schedule(s) of persons within the effective support network. Activity associated with setting or accepting scheduled events may be considered an event within the monitoring system.

Various aspects of data and scheduling within this system are preferably governed by the Privacy level(s) selectively assigned by the Monitored Person. For example, access to any part of the system by non-authorized users is protected at the highest feasible level to protect the privacy and preferences of the Monitored Person.

In certain embodiments and applications of the system, a network of Authorized Observers and Designated Responders is linked, using suitable application programming interface units (API's) to an available social media network known in the art. For example, these same authorized Persons may interact through LINKED-IN, FACEBOOK, or other such known profiles in order to maintain their social contacts.

In certain embodiments and applications of the system, such social relationships may form the basis for mutual sharing of monitoring patterns. Thus, two neighbors in a building, or two friends even far apart from one another, who are themselves Monitored Persons may each choose to designate the other as an Authorized Observer or Designated Responder for their monitoring.

Use of Descriptive Survey Information as Proxy for Analytic Schedule Learning

The monitoring system preferably exploits primary analytics on historical data for the Monitored Person, as well as longitudinal analytics on historical data acquired for sets of similar individuals also being monitored. The analytic results are used by the system to learn such things as when expected events typically happen, what sensor patterns are indicative of events of interest, and what variance occurs in the patterns as a means of estimating confidence values.

However, when the system is initially configured for a new user (Monitored Person), there typically exist little or no historic data specific to that individual. Thus, the System preferably employs common features from longitudinal analyses to seed the expected patterns and confidence values, while also acquiring data from actual monitoring of that individual. The system refines the patterns of activities to suit that individual as it carries out monitoring over a period of time.

A notable advantage afforded by a system and method implemented in accordance with certain embodiments of the present invention is that individualized patterns and confidence analytics may also be seeded using data from a survey form, preferably completed by the Monitored Person or by a close relative or friend as part of system set up. Responses provided through this survey form may inform the system to establish, for example: whether the Monitored person eats regular meals, whether the meals are eaten at regular times or at varying times; or, conversely, whether the Monitored Person tends to be a grazer rather than a meal eater. Similarly, the Monitored Person's sleeping habits and schedule, as well as sleeping location habits may be pre-established. For example, whether the Monitored Person tends to sleep in bed each night, or occasionally falls asleep on a living room chair; whether the Monitored Person take naps, stay up late, rises early, and so forth.

Likewise, survey responses may pre-establish activity patterns relating to such things as: time spent away from home, regular daily in-home activities, regular daily media usage, and frequency of visitors. The degree to which the Monitored Person is consistent versus casual and therefore inconsistent in seemingly habitual activities may also be ranked from survey responses. Any or all of these factors, preferably provided using an on-line form accessed at the Monitored Person's discretion, may be matched to a set of expert rules and to profiles already established by/for other users, to form an initial trial ACTIVITY PORTRAIT for the Monitored Person, or may be otherwise used explicitly for that individual. For example, if a Monitored Person states that he/she regularly gets out of bed between 6:00 am and 6:15 am every morning, and that any inactivity in this regard extending to 6:30 am would signal illness, the system may record and productively use this prior knowledge as to Monitored Person's personal regimen.

Consequently, complex behaviors for a Monitored Person need not be learned from scratch. Assuming a reliable, forthcoming source of information, event detection of meals, sleep, and so forth, may be more accurately determined and activity pattern range limits/behavioral boundaries may be set early in or near the system's initial installation and configuration, rather than potentially taking weeks for the system to learn.

Using Frequency of Activation of Kitchen Sensors as Proxy for Eating and Meal Detection It is difficult to directly sense and monitor activities like the Monitoring Person's eating a meal. The difficulty is compounded where the intended application requires minimized numbers of sensors and their degree of invasiveness. In accordance with certain aspects of the present invention, the monitoring system exploits suitable indirect measures, which upon adaptation to the Monitored Person's personal habits, provides a powerful measures for estimating given activities such as the occurrence of meal times, and for detecting anomalous behavior.

One measure that the system preferably exploits in this regard is occupancy of the kitchen. Because kitchens frequently serve as transit points within many dwellings, and because visits to the kitchen may not necessarily involve significant food intake on any given occasion, among other reasons, a kitchen occupancy indicator alone may not be sufficiently revealing. The subject system thus preferably factors in accompanying detections of such correlated events as: (a) door openings on a refrigerator, (b) drawer openings of a utensil drawer, (c) door openings of a cabinet or pantry, and/or (d) activation of one or more kitchen appliances.

Each of these correlated events may be directly detectable via sensors. For example, suitable separation sensors may serve to detect openings and closings of doors and drawers, as may vibration and/or motion sensors. Appliance activation may be detected, for instance, by use of a suitable smart switch energy monitor electrically interposed between an appliance and a mains power outlet.

Obviously, these sensors do not measure food consumption directly. The system toward that end preferably exploits the frequency of occurrence for the correlated events as a proxy for meal consumption. In-home studies indicate that such frequency counts correlate very well with actual meal events as reported by a Monitored Person. In accordance with certain aspects of the present invention, therefore, meal and snack consumption behavior detections are each preferably derived on the basis of local peaks in the frequency count of multiple correlated event detections.

Figure 18A:
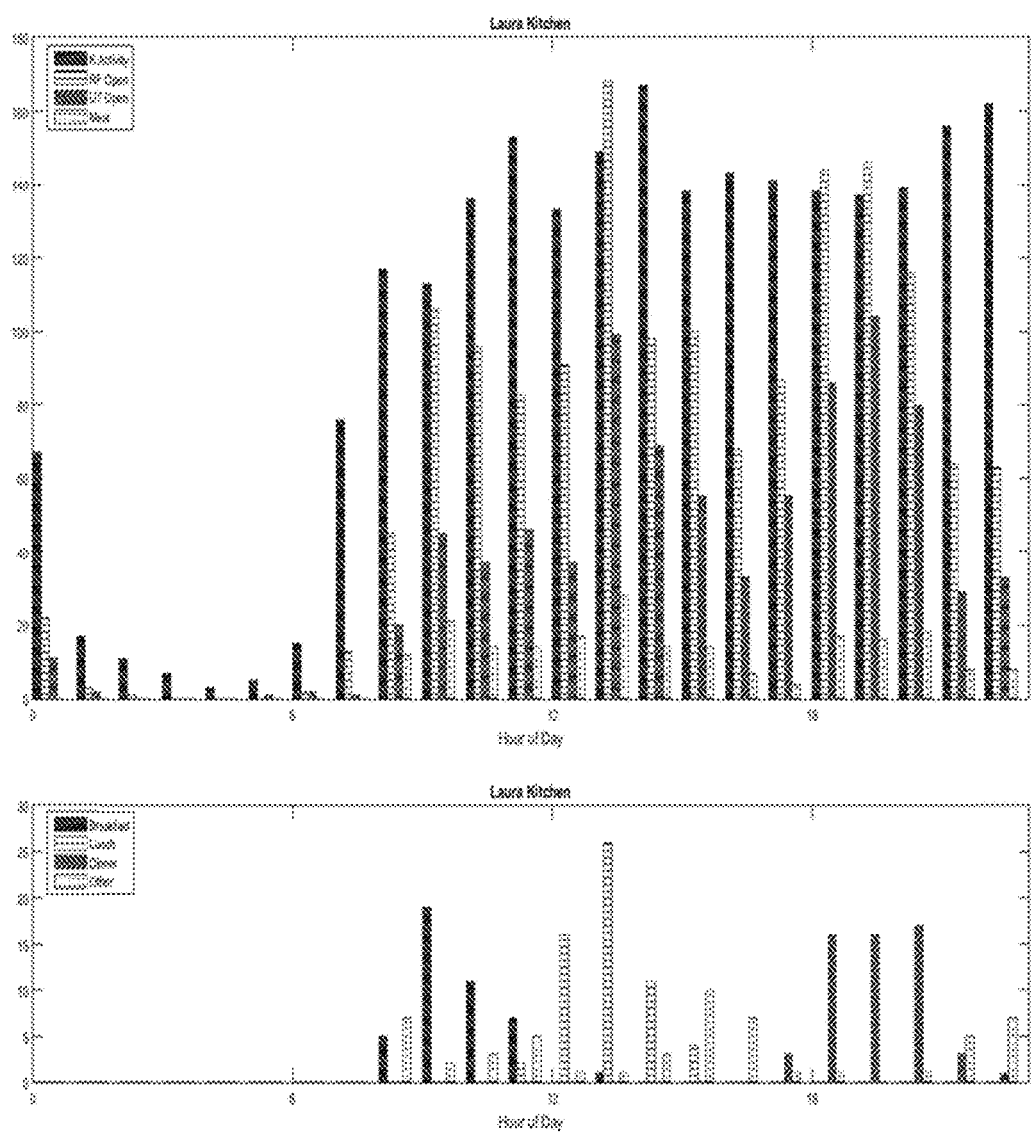
FIG. 18A is a comparative set of histograms illustrating cumulative information of the type used during operation of the embodiment of FIG. 10, in formulating a proxy detector for meal activity of a monitored person; and, FIG. 18B is a comparative set of histograms illustrating information, broken out by days of the week, of the type used during operation of the embodiment of FIG. 10, in formulating a proxy detector for meal activity of a monitored person.
Figure 18B:
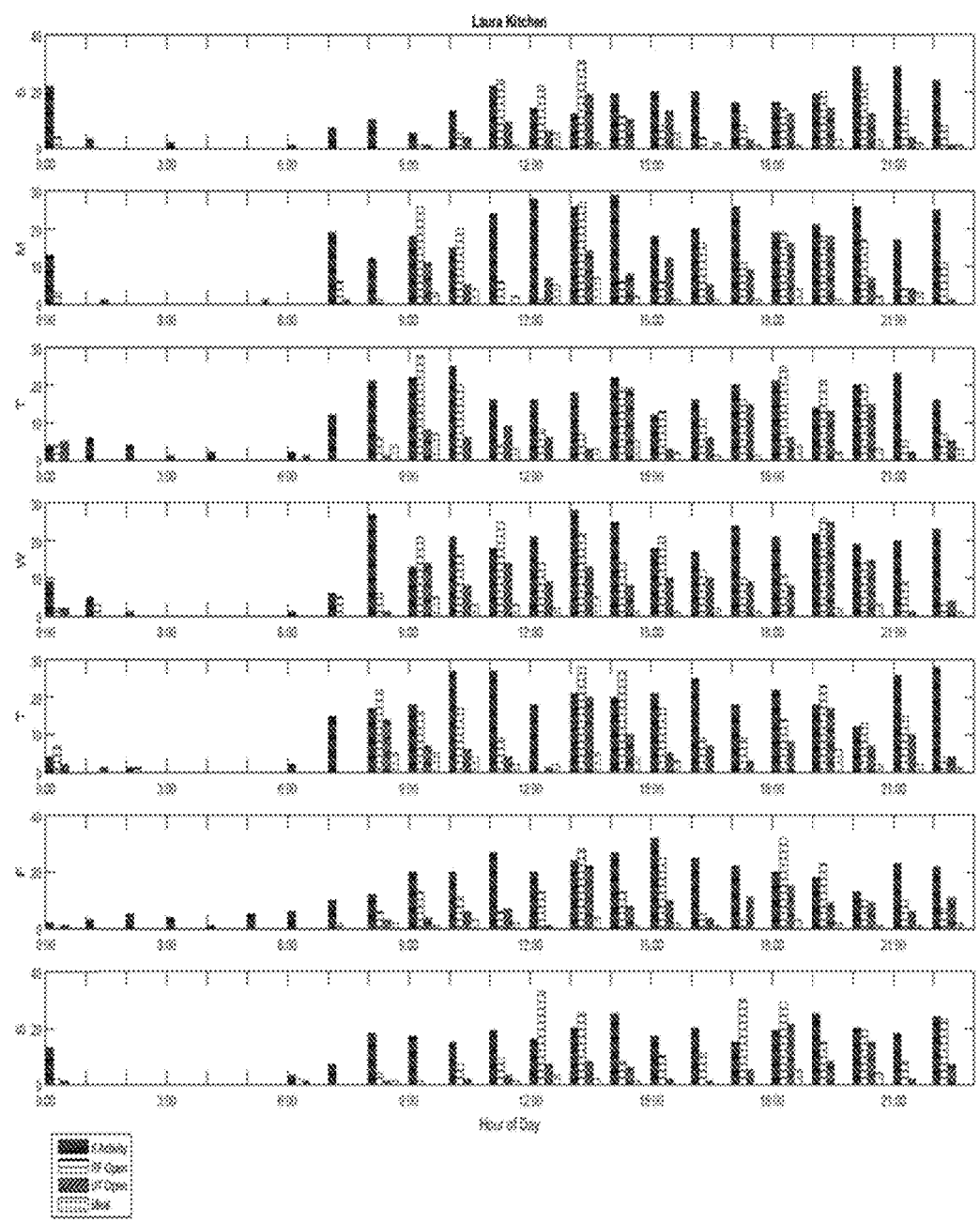

FIGS. 18A-18B illustrate the effectiveness of kitchen event count histogram information in formulating a proxy detector for meal activity. The histograms of FIG. 18A reflect frequency of occurrences based upon all available data accumulated for each 24 hour day period, more specifically concurrent frequency of occurrence histograms for certain correlated activities/events (collectively referred to as 'events') for detecting meal consuming activity in one example of system operation are illustrated. As shown, the correlated events include detections of kitchen activity (K Activity), refrigerator door opening (RF Open), and utensil drawing opening (UT Open). Detections for these activity parameters are accumulated over each 24 hour day period during the Monitored Person's history of monitoring and plotted according to time of occurrence. They are shown for explanatory purposes, alongside confirmatory data—in this case occurrences of Meal activity events (including breakfast, lunch, dinner, or other meal activity collectively in the upper histogram of FIG. 18A) actually documented for the Monitored Person also plotted according to time of occurrence.

The comparison of directly sensed events and actual meal activity reveals the degree to which frequency of occurrence peaks for the correlated events do in fact coincide strongly with actually recorded meal activity events. The system thus learns and adaptively exploits such correlation to implement the indirectly detected proxy sensor for such inferred events as those relating to meal activities, sleep activities, and/or others.

For confirmatory reference, the lower histogram of FIG. 18A shows the actually documented meal activity from the upper histogram broken out into different specific meal activity types. The different meal types in this particular example are grouped into Breakfast, Lunch, Dinner, and Other meal activities.

The histograms of FIG. 18B reflect frequency of occurrences data accumulated and categorized by weekday. FIG. 18B likewise reveals the strong correlation between the detected events and actual meal activity when the accumulated detections over a 24 hour day period are broken out and according to the individual days of the week on which they occurred.

Preferably, a weighted sum of frequencies of correlated events is generated. This weighting is determined by use of longitudinal analytics to obtain a single figure of merit corresponding to instant likelihood of an eating event taking place. The result is further as follows. Within each household, the occurrences of correlated events (as detected by sensors of the relevant type described in preceding paragraphs) are recorded within in a given time interval. For example, intervals of 15 minutes or ½ hour typically provide reasonable resolution in many applications. In certain other embodiments and applications, longer windows that overlap one another may be employed.

Having established personal household historical data (or drawing from standardized data in the event the system has just been installed, as described in preceding paragraphs), a baseline frequency of correlated events is computed for each sensor over a pre-defined look-back period. Alternatively, this baseline frequency may be computed for subsets of time intervals such as: morning, afternoon, evening, and night, as delineated by preselected interval breaks. As a further alternative, this baseline may be computed according to day of the week, or according to weekday versus weekend. Any combination of categories may be suitably employed to subdivide the base-line frequency into a time period model.

Preferably, the system adaptively employs different combinations of categories. For example, a lumped computation is employed on all days initially, when the historical dataset is small. Then, as the dataset increases with sufficient monitoring history, a weekday versus weekend computation is employed. Finally, computation differences by individual days of the week are derived once sufficient historical data is accumulated on which to base confident distinctions. Here confidence is to be understood in the technical sense, as will be familiar to those skilled in the analytics and statistics arts. Furthermore, the data is preferably re-computed on a period basis so as to compensate for gradual or seasonal shifts in behavior.

Having established one or more such frequency baselines for the Monitored Person, the system may distinguish between meal activity detections and snacking activity detections by, for example, setting a threshold of frequency on a monitoring decision time window (of 15 minutes, ½ hour, etc.). The target threshold may be uniform, or may be time/day specific in accordance with the preceding paragraph. When the frequency exceeds the target threshold, a meal activity is detected. Conversely, the absence of a peak in such frequency data within a prescribed time interval based on the learned range of typical daily meal occurrences for the Monitored Person provides grounds to indicate an anomaly.

As a simple example in setting thresholds, in certain embodiments the system executes its analytical engine to compute a mean frequency over a prescribed period, and applies a first predetermined factor to a standard deviation of this frequency above the mean frequency, the product serving as a threshold for detection of a meal activity event. In similar manner, the system applies a second predetermined factor to the standard deviation of this frequency below the mean frequency, the product serving as a threshold for detection of an anomalous missed meal.

Thus, if $\mu$ represents the mean frequency over the prescribed training interval, and $\sigma$ represents the sample standard deviation, the system sets a first threshold=$\mu+\alpha\sigma$ such that the count of events within each decision window is computed and checked as follows:

$$\sum_{\substack{decision \\ window}} events \geq \mu + \alpha\sigma$$

where $\alpha$ represents the first predetermined factor. Where the count is found to meet or exceed the first threshold, system determines that a meal class event has occurred in the decision window. A positive meal event detection is thereby derived indirectly.

The first predetermined factor $\alpha$ is preferably set to a positive value for detection of meals. Use of decision windows of 15-30 minutes in duration tends to be appropriate for monitoring of persons with regular meal habits, in many applications.

The system derives missed meal detections by preferably setting a longer decision window typically extending several fixed hours of the day. The decision window is determined for a given application in accordance with the Monitored Person's particular behavior patterns. The count of missed meal events within each decision window is computed and checked as follows:

$$\sum_{\substack{decision \\ window}} events \leq \mu - \alpha_{missed}\sigma$$

where $\alpha_{missed}$ represents the second predetermined factor. Where the count is found to be at or below the second threshold $\mu-\alpha_{missed}\sigma$, the system determines that a meal within the decision window has been missed. A positive missed meal 'event' detection is thereby derived indirectly.

The system preferably takes an alternate approach where the Monitored Person has demonstrated, or is otherwise prone to exhibit, grazing type habits. The system in those cases acquires total integrated events over longer periods (e.g., 4-12 hours) rather than seeking and generating event detection decisions based on individual peaks in the frequency of occurrence data. The system, in such alternate implementations, executes the analytical engine to compute a mean daily event count $\mu_{daily}$ over a prescribed training interval, along with the daily sample standard deviation $\sigma_{daily}$. The system then determines a threshold=$\mu_{daily}-\alpha_{daily}\sigma_{daily}$, and computes and checks the count of events within each decision window as follows:

$$\sum_{\substack{decision \\ window}} events \geq \mu_{daily} - \alpha_{daily}\sigma_{daily}$$

where $\alpha_{daily}$ represents a third predetermined factor, typically of relatively small positive value in most applications. This third predetermined factor is set in accordance with behavior variance as described herein, and the decision window is defined to span that portion of a day during which the grazing events in question are typically observed. This may span up to the entire 24 hour period of a day. The system then determines that sufficient food consumption has occurred to meet typical behavior over the course of the day. Such meal inference process forms but one example of inferred event detection 2003 actuated by the analytical engine 2001 as illustrated in FIG. 11A.

User Interface Component for Rapid Conveyance of Eating Activity

FIG. 14 illustrates one example of a user interface component generated by the system during operation, which simply and efficiently displays data pertaining to a Monitored Person's eating habits for viewing by an Authorized Observer. The display is configured to quickly conveys succinct yet detailed information to the viewer regarding such monitored activity.

The generation of such display is tied to the correlated event frequency proxy for indirect meal detection described in preceding paragraphs. This GUI component may be rendered on or through a suitable mobile device screen, desktop application, web browser interface, or the like. As shown, the GUI display preferably includes a title line 1401 that conveys that Kitchen Activity is being reviewed for a particular Monitored Person, in this case an individual known as "Rev. Jeff." A Back navigation button 1402 allows the user to return to the previous screen. The display is generally divided into a plurality of monitoring frames 1403 arranged in visually stacked manner, with monitoring frames 1403 respectively configured in this particular example to summarize activity information during the course of the week, one day at a time. The monitoring frames 1403 are accordingly labeled by day 1404 or date 1405, for instance, and preferably arranged and labeled in adaptively updated manner with reference to the present day, which is shown in this example presented toward the top of the display. The display preferably presents monitoring frames consecutively covering the present day (Today) and a selected number of immediately preceding days of similar historical activity data, in this particular example the immediately preceding seven days. This is but one example, and monitoring frames 1403 for any number of days (which may be consecutive or otherwise) may be similarly presented in the display, depending on the particularly intended application.

Each day's monitoring frame 1403 preferably includes a time scale 1406, labeled at selected intervals in this example by hours of the day, but which may be alternately labeled at different intervals, with different units. For each fixed step in time (½ hour in this particular example) within the day, a short graph bar 1407 is generated. Each graph bar 1407 corresponds to the determination window described in preceding paragraphs over which frequency of occurrence data has been counted. The graph bar 1407 may be visually modulated in any suitable manner—such as by color, grayscale darkness, or the like—according to the frequency count. In the particular example illustrated, each graph bar 1407 is variably modulated by grayscale darkness, the intensity of darkness increasing to indicate increasing density, hence frequency, of occurrence counts, over a particular time step hence in the bar, is adjusted to represent the frequency counts for that particular time period.

Consequently, a graph bar in this example is generated in light gray tone where frequency counts are zero, and in progressively darker gray tone are displayed where the window frequency count is higher, such as shown for graph bar 1408. The range of visual modulation (grayscale tone darkness in this example) is preferably adjusted automatically by the system to reflect a suitable proportion of the historical mean frequency of occurrence for each particular time period covered by a graph bar's time step, within in the given household setting. A graph bar's modulation is adaptively self-adjusting in this manner, so that its indications are within the natural range normally exhibited the household. The number of steps in grayscale tone within the range is preferably set to optimally exploit the available color/tone depth of the display device employed.

As described in preceding paragraphs, various thresholding measures may be applied to derive meal activity detections for a particular household setting. The GUI display preferably 'reports' those determination time window periods where a given event occurrence count exceeded the applicable threshold by applying another distinct visual indication—for example, by replacing the gray tone of a corresponding graph bar with a particularly colored tone (different and contrasted from the gray tone) or other visual demarcation. In the example shown, a color such as green may be applied for threshold-meeting graph bars 1409 and 1411-1415, among others, with modulated variation in darkness/intensity preserved even with the color replacement. Thus, it becomes clear to a viewer at a glance, for example, that this Monitored Person Yesterday had breakfast (graph bars 1411) within a 7:30 am-8:30 am window, a lunch meal (graph bars 1412) just before noon, a snack or tea meal (graph bars 1413) at 3:00 pm, and an extended dinner meal (graph bars 1414) centering around 6:00 pm. In addition, it is apparent that the Monitored Person also consumed a follow-up bedtime snack meal (graph bars 1415) between about 8:30 pm and 9:00 pm. Since the current day is not yet over in the illustrated example, the monitoring frame 1403 for the current day, aptly labeled Today, is shown with its graph bars abruptly stopping at graph bar 1410, which coincides with current real time to indicate that data is not yet available for this and later time periods which have yet to occur.

Monitoring frames for other days in this illustrated example visually reveal different eating patterns of the same Monitored Person. The differences are easily discerned for quick interpretation at a glance by the viewer. The variation in darkened and/or colored tones of graph bars for the same, visually aligned time periods during the different days are comparatively presented by the respective monitoring frames 1403. Taken together, this GUI display provides uniquely concise conveyance of historical and current behavior activity information.

User Interface Component for Rapid Conveyance of Typical Event Times and Setting of Alert or Anomaly Notices Relative to Learned Typical Behavior of Monitored Person As described in preceding paragraphs, it is desirable in many applications to learn and develop a personalized ACTIVITY PORTRAIT of the Monitored Person, and to set alerts and/or anomaly detection points based upon such personalized information rather than generalized information. Thus an individual who tends have consistent wake up times may be tracked in a suitably different fashion than an individual who tends towards wide variation in wake up times. Further, it is desirable in many applications to facilitate Authorized Observer's optimal setting of parameters for notifications in view of this information.

Figure 15:
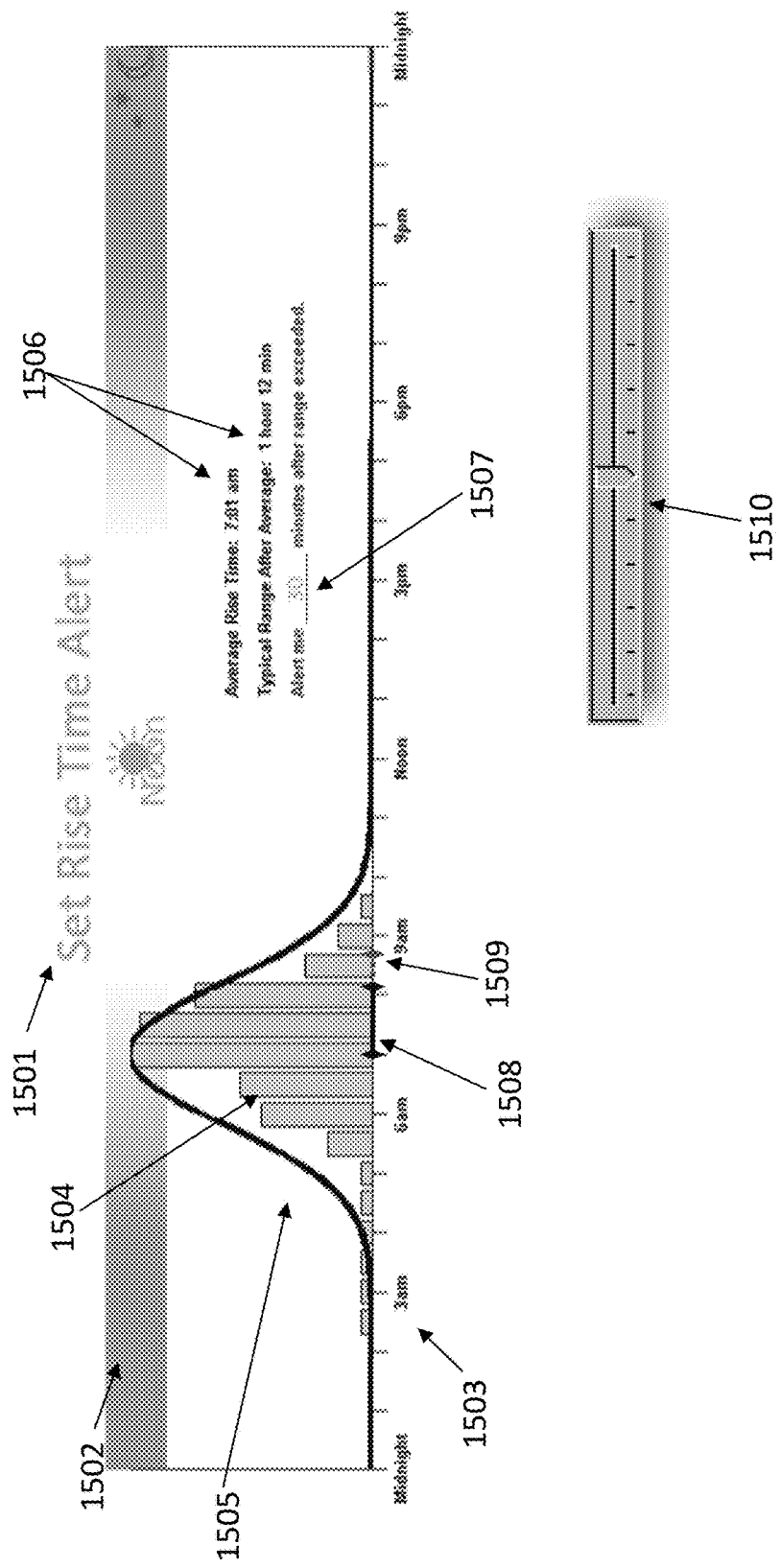
FIG. 15 illustrates one example of a GUI display component generated during operation of the system implementation of the embodiment shown in FIG. 10, used to convey a monitored person's consistency of rise time information to certain authorized persons, while allowing for certain control entries by such persons.

FIG. 15 illustrates graphical display components generated by the system to facilitate optimal configuration of Authorized Observer notifications in this regard, according to one exemplary embodiment and application. The GUI display components may be used to convey the Monitored Person's consistency of rise time to an Authorized Observer while allowing that Observer to adjust sensitivity for alerts in an intuitive fashion. The resulting graphical display provides graphical controls for alert notifications relating to a rise time parameter in this particular example; however, similar graphical display controls for other parameters such as sleep time, meal time, out of house time, TV viewing time, other activity times, or the like may be employed. Further, the displayed data may be broken down over any suitable period other than over the hours shown in this example, such as by day of week, by weekend or weekday categorization, or the like.

The graphical display component is preferably labeled with a conspicuous title 1501 indicating that the parameter whose statistical information is displayed, namely rise time in this example. The graphical display component presents both a graphical representation of a cyclical day's progression 1502 and a matched set of numeric time marking 1503. The day's cycle preferably begins and ends with midnight, with noon time disposed in the middle; however, this time window may be shifted to any suitable center point time reference for other applications. The data for a certain learning period (for example, the previous month, the previous three months of weekends, etc.) is presented in histogram form, with frequency of occurrences shown at half hour intervals 1504. It is graphically evident in this particular case that the Monitored Person's rise time, as detected by the system, exhibits a substantially natural distribution over time. From this substantially normal distribution of data, corresponding mean and standard deviation are computed, and an approximate distribution curve 1505 is preferably fitted to and visually overlaid on the histogram, to be conspicuously discernible to the viewer. In the case of the normal distribution, it is well understood by those skilled in the art that such mean and standard deviation parameters define the curve fit.

The normal distribution applied in this example is shown merely for illustrative purposes and the disclosed process is not limited thereto. In other embodiments and applications, various other statistical distribution curves such as a skew normal distribution or the like may be applied to provide an optimal curve fit model for the acquired data. Depending on the model employed other statistical parameters such as estimates of average and range of variance may be determined and suitably applied. In certain other embodiments, nonparametric measures known in the art may be suitably applied in this regard.

The graphical display component also presents to the viewer numeric estimates 1506 of the average rise time (in this case a mean of the normal distribution curve applied) and the typical range of variance (in this case standard deviation of the normal distribution curve). Note, however, that although the variation curve for this rise time data is two-tailed, the relevant system focus in most applications is preferably on late waking times rather than early waking times. This reflects a concern of the Monitored Person failing to get out of bed due to some ailment or other abnormality, rather than their energetically getting up earlier than usual.

As shown, a Typical Range After Average parameter may be computed in this instance based on the standard deviation, either directly or as multiplied by a predetermined scaling factor. Thus, for example, a scaling factor may be computed to account for any given proportion of wake up times falling before that typical range value. Assuming normal statistics, this may be accomplished by selecting a factor based upon the normal curve; for example, a factor of 1.96 being typical for 95% coverage of the data. As will be understood by those skilled in the art, other embodiments may avoid reliance on a predefined statistical model by alternatively applying a direct sum of the histogram data to estimate a target range representative of a given proportion of the data.

Preferably, the viewer is permitted in this example to enter a numeric value 1507 that indicates the time past the typical range at which an alert should be generated and/or an anomaly should be declared. In certain alternate embodiments, this numeric entry may be supplemented in the graphical display component with a slider bar 1510 for quick adjustment. In certain other embodiments (not shown) an early rise time limit may be further set in addition to a late rise time limit.

In order to graphically convey relative setting information to the user, the graphical display component preferably incorporates a first graphic bar 1508 spanning the time reference from the average rise time to the typical late range point, and a second graphic bar 1509 visually differentiated by color and dash pattern or the like, which indicates the alert delay after this typical range point. The graphical display component in certain other embodiments may include graphical measures for setting a fixed time alert; for example, declaring that regardless of the Monitored Person's typical behavior an alert shall be declared after a predetermined time of day, if they are not awake. The graphical display component may also include an alert based on the number of hours the Monitored Person has slept before rising.

Contextual Application of "Non-Events" or "Quiet Events" to Create Event Detector A notable advantage of the subject system is its ability to infer information and thereby exploit combinations of both affirmative events and non-events to measure behaviors. The system efficiently obtains maximal behavioral monitoring information with as few sensors as may be available. One type of non-event derived by the system to constitute an event in itself is a so-called "quiet event," denoting a failure to detect any new activity or change within the monitored premises within a predetermined period of time. Given its indirect (and contextually non-determinative) nature by itself in most applications, this lack-of-activity event is not acted upon in isolation. Instead, it is contextually interpreted in light of other event occurrences. The quiet event preferably forms the basis for deriving (indirectly detecting) numerous classes of inferred events.

For example, if the last event preceding a quiet event were a bedroom occupancy event, then the quiet event may be a candidate for triggering a sleep period detection. As a further example, if a quiet event were preceded by certain activity within the premises but outside the Monitored Person's bedroom, then it may be generally interpreted as a quiet period of stillness. If such quiet event, however, were prolonged and were to occur in with atypical pattern, it may be elevated by the system to a concerning anomaly.

As a further example, a Monitored Person may have a history of typically settling in front of the TV at 5:00 pm each day. If the TV is sensed to be activated and the last motion/occupancy event is consistent with this TV watching activity, a quiet period of inactivity otherwise at 5:00 pm may be safely interpreted as matching the relevant historical activity pattern. On the other hand, prolonged quiet period of inactivity following a most recent activity event in another part of the house may rise to the level of a concerning anomaly.

In appropriate situations, the system may determine from the immediately preceding pattern(s) of events leading up to a quiet event that departure from the home has occurred. Preceding patterns may include, for example, sequential activation of a specific set of motion sensors in order, followed by a door opening event. Such departure from the home is preferably though not necessarily confirmed by one or more other event detections which may be readily available, such as detections from tracking a key-fob or other direct tracking measures for out-of-house status.

For valid interpretation of a quiet state, the system records not only the quiet event indicating events, but also the preceding states and events leading up to the quiet state. Preferably, each time a prolonged quiet period is observed, it is comparatively analyzed thereby against past examples to determine whether or not the quiet period in actuality constitutes a concerning anomaly. This aspect of the system is particularly important in elder care applications, for prolonged periods of quiet correlate to such common yet serious episodes as a fall, a seizure, or other medically critical event. Given the high potential for false alarms intrinsic to negative inferences, however, the system's approach to first distinguishing and classifying the activity patterns leading up to a prolonged quiet state towards verification provides notable advantages.

Use of Quiet Event Following Bedroom Occupancy as Sleep Event Detector

Turning more specifically to the sleep inference detection process described in preceding paragraphs, such process forms but one of numerous examples of inferred indirect event detection 2003 (FIG. 11A) carried out by the system, depending on the requirements of the particularly intended application. A sleep event is preferably inferred from a combination of events terminating in stillness or quiet. In a simple case where all other activity in the monitored house has ceased, and the last sensor event was a bedroom motion or occupancy detection, the system properly detects this inferred event as a bedroom stillness event. Each such inferred event becomes a candidate for indicating the start of a sleep cycle, preferably subject to additional collaborative event data being sufficiently acquired to confirm the sleep start state.

In an exemplary embodiment and application, each bedroom stillness event begins a monitoring process in which the system seeks detection of other collaborative events. This may be recorded as a tentative sleep start, and is preferably indicated as such on an Authorized Observer GUI display. If no events occur outside the bedroom within a predetermined period of time, then the system concludes the Monitored Person to have, indeed, gone to sleep and updates the tentative sleep status to a confirmed sleep start event. Likewise, if the system detects other activity events beginning again outside the bedroom before the designated period has elapsed, it updates the sleep state by essentially canceling the tentative sleep status, taking the other activity as reliable indication that the Monitored Person is up and about and that the previously detected bedroom stillness event amounted to just a quiet, brief visit to the bedroom area. If other event detections outside the bedroom ensue at some time after the designated period has elapsed, the system concludes the Monitored Person to have completed a sleep cycle and is waking up to start their day again.

In certain embodiments, reliable detection of a wakeup event may require prolonged or multiple activity events outside the bedroom. This would guard against premature wakeup event detections, allowing for such brief interruptions of sleep as visits to other rooms during the night (for example, to an unattached bathroom) without halting the tokenized sleep period. In certain embodiments, the system may reference past behavior ACTIVITY PORTRAITs to predict a sleep or wakeup state before it is actually confirmed. Thus, if a Monitored Person usually retires to the bedroom for sleep by 11:00 pm, and the system enters a bedroom stillness state at 11:05 pm, it prompts an indication on the Authorized Observer GUI that the Monitored Person has indeed gone to bed even though such determination may not actually be confirmed by collaborative events, and to that extent still tentative. If the Monitored Person should thereafter resume other activity again, starting at 11:45 pm, the system would revise the prediction and update the GUI display accordingly.

Similarly, if the Monitored Person is usually up by 8:00 am and is active within the Bedroom at 8:15 am, the system may post an active state to the Authorized Observer GUI. If, however, the Monitored Person fails to thereafter leave the bedroom or resume stillness, the system revises the posted state back to the Monitored Person still being asleep. If the Monitored Person fails to get up by the designated alert period (as described with reference to FIG. 15), the system preferably ignores the tentative state and alerts the Authorized Observers accordingly.

User Interface Component for Rapid Conveyance of Sleep Activity

FIG. 13, illustrates another example of a user interface component generated by the system during operation, such as illustrated in FIG. 14, but for simply and efficiently displays data pertaining to a Monitored Person's sleeping habits for viewing by an Authorized Observer.

The generation of such display is tied to the correlated event frequency proxy for indirect sleep detection described in preceding paragraphs, but may be adapted for other applications for detecting sleep or non-sleep states on a decision time-window basis. This GUI component may be rendered on or through a suitable mobile device screen, desktop application, web browser interface, or the like. The GUI display preferably includes a title line 1301 that conveys that Sleep Periods activity is being reviewed for a particular Monitored Person, again for an individual known as "Rev. Jeff" in this case. A Back navigation button 1302 allows the user to return to the previous screen. The display is generally divided into a plurality of monitoring frames 1303 arranged in visually stacked manner, with monitoring frames 1303 respectively configured in this particular example to summarize activity information during the course of the week, one day at a time. The monitoring frames 1303 are accordingly labeled by day 1304 or date 1305, for instance, and preferably arranged and labeled in adaptively updated manner with reference to the present day, which is shown in this example presented toward the top of the display. As in the example of FIG. 14, the display preferably presents monitoring frames consecutively covering the present day (Today) and a selected number of immediately preceding days of similar historical activity data, in this particular example the immediately preceding seven days. This is but one example, and monitoring frames 1303 for any number of days (which may be consecutive or otherwise) may be similarly presented in the display, depending on the particularly intended application.

Each day's monitoring frame 1303 preferably includes a time scale 1306, labeled at selected intervals in this example by hours of the day, but which may be alternately labeled at different intervals, with different units. For each fixed step in time (½ hour in this particular example) within the day, a short graph bar 1307 is generated. Each graph bar 1307 corresponds to the determination window over which sleep event determinations have been made; however, each bar graph may be adjusted in scale to provide any suitable resolution in alternate embodiments and applications. The graph bar 1307 may be visually distinguished in any suitable manner—such as by color, grayscale darkness, or the like—to indicate sleep or non-sleep over a particular time period. In the example illustrated, each graph bar 1307 is presented in light gray (such as the graph bar marked 1308) where the Monitored Person is awake during a given time period, and dark gray (such as the graph bar marked 1307) where the applicable sleep state threshold is exceeded and the Monitored Person is taken to be asleep.

From the visual contrast, it becomes clear at a glance to a viewer, for example, that this Monitored Person in this particular example slept Yesterday between midnight and 8:00 am (graph bar 1308). On the date of 2014 Sep. 17, it is evident that the Monitored Person went to sleep after midnight at about 2:00 am (graph bar 1310), whereas on the date 2014 Sep. 14 the Monitored Person went to sleep at about 11:00 pm (graph bar 1309) and slept through to the following day until about 6:30 am. Since the sleep graph bars are aligned with the daily clock times as marked, the dark gray sleep period is interpreted as extending across midnight in this last example. As the current day is not over yet, the gray graph bars for the monitoring frame 1304 labeled Today abruptly cease at the point 1311, which coincides with current real time to indicate that data is not yet available for this and later time periods which have yet to occur. The monitoring frames for other days on the display show differing sleeping patterns which may be easily compared and interpreted at a glance by a view, with reference to one another and the actual times of day over which they occurred.

An additional feature, not shown, is exercised in the event the monitoring system has only tentatively determined the Monitored Person to be asleep. Rather than a dark gray graph bar tone for fully indicating a sleep state, the graph bar in question may take on a medium gray tone to provisionally indicate a probable sleep state, which has yet to be confirmed. The provisional tone of the graph bar would be subsequently updated to either a full sleep tone or a light gray non-sleep tone, pending confirmation or not. This provisional indication feature is preferably evoked by the system in such situations as when the Monitored Person has just fallen asleep or just woken up, before the transition can be confirmed with high confidence. Among the advantages this offers, an Authorized Observer is rapidly informed by the system of Monitored Person's provisional sleep status, enabling them to then, in their own discretion, attribute due weight to the provisional determination of sleeping or waking state, without having to wait for the system to process acquisition of sufficient collaborative event detections for confirmation before seeing even an initial indication of a change in sleeping/waking state.

Use of Sensor Duration, Frequency, and Time Patterns to Detect General Activities Areas other than bedrooms and kitchens within a controlled setting may be monitored by the system in the manner described herein. The consistency of power off/on interval timings on a media device may be used by the system to develop a prediction of typical behavior and as an inferred event detector of for instance a "watching show" event. The frequency of activation of certain motion/occupancy detectors recorded by time of day may be used to establish movement and occupancy patterns.

In certain applications, frequency of occurrence may be a strong, reliable indicator for indirect inferred event detection, such as with refrigerator door or utensil drawer openings in the kitchen. In other cases, duration of occurrence may prove a better indicator, such as in the use of appliances or the occupancy of a room. The system preferably executes to reduce one or more sensor events to one inferred event, such that this inferred event is individually tokenized and its occurrences start and end times tracked. Any event, whether inferred or directly sensed, that is repeated on a daily, day of week, or monthly basis may be discovered by the system, and its statistics accumulated in the manner variously described herein. A mechanism such as described in connection with FIG. 15 may be used to examine an event's typical range of time occurrences, and to set anomaly detection and alert triggering parameters based thereon.

Dual Time Scale Predictive Analytics

The system makes use of predictive schedule matching to provisionally notify Authorized Observers promptly as to any omission anomaly or tentative confirmation of an expected event for instance within a short time scale. Thereafter, the system carries out suitable analytics over a longer time scale to potentially adjust the provisional notice(s) when confidence levels are sufficiently satisfied. There are practical benefits of such prompt provisional notices and confirmations even before marginal parametric confidence levels are met. This is consistent with a non-parametric Bayesian probability model, or where probability of occurrence is weighted by expectation history of its past frequency of occurrence at the time. Examples are described in connection with detecting sleep and wake periods in preceding paragraphs.

User Interface Component for Rapid Conveyance of Inferred State History and Anomalies In tracking the patterns of inferred events, it becomes both feasible and useful within the disclosed implementations of the subject system and method to track a time history of activity states for the Monitored Person. This time history is useful both for internal inference purposes, as described in preceding paragraphs, as well as for use as a direct tool to enable an Authorized Observer to review the daily patterns of the Monitored Person without invading their privacy in ways that permitting direct access to each event record would permit. The subject system and method enables such course grained monitoring.

FIG. 12 illustrates one example of a GUI display component generated by the system during operation which provides for the clear and concise presentation of such state pattern information. The display is labeled with the short hand identifier 1201 of the Monitored Person in question, again an individual known as "Rev. Jeff" in this case. A Back navigation button 1302 allows the user to return to the previous screen or menu. The range of time is stated at line 1203, in this case indicating that the event list reflects the Past 24 hour period. That time may be extended using a +24 hours button 1206 arranged at the bottom of the display. Once extended, the range of time may be shortened back to 24 hours using a One Day button 1205. An Admin button 1207 provides access to deeper levels of administrative pages, and serves as a representative/illustrative stand in for other functions that may be placed here, depending on the requirements of the particularly intended application.

Each line 1204 of the display list defines a monitoring box containing information corresponding to one hour of the given day. This information includes the date and time 1208, and whether or not the Monitored Person entered any of a set of given activity states during that hour. Respective predetermined icons are preferably employed for the activity states. In this example one predetermined icon 1211 indicates that the Monitored Person was active, another predetermined icon 1212 indicates that that they were quiet or dormant for a period of time, and another predetermined icon 1213 indicates that they were determined to be in bed sleeping. Other icons may include an "away from home" icon 1214 (shown in the second inset example sequence), and in other embodiments an "eating" (not shown). Any or all of these activity events may occur within an hour long window. At the right side of each monitoring box is disposed an anomaly indicator 1209, 1210 which notes whether or not the system observed an anomaly during the given hour period. As described elsewhere herein, a green check 1209 may indicate that no anomalies occurred during a given time period, while an orange bar 1210 may indicate that an anomaly did in fact occur during a given time period.

Use of Activity Monitoring System as Companion Diagnostic for Health Monitoring

An individual's physical activity is a measure of that individual's overall health status, which may be variously quantified as an ACTIVITY PORTRAIT, as described herein. Ideally, the ACTIVITY PORTRAIT will have been established prior to a significant medical event so that return to a pre-existing baseline condition may be measured (for example, slope, time, and completeness of return to baseline of some or all elements of the ACTIVITY PORTRAIT). Nonetheless, the subject monitoring system may be immediately advantageous for trend analysis in post-care patients, as well as for alert system to detect failure or reversal of recovery. Additionally, when used concurrently with other evaluative procedures—in connection with for instance mental health monitoring scales, granular physiological measures like blood pressure or heart rate, fitness measures like distance recorded on an exercise bicycle—or used concurrently with pharmaceutical administration or medical device usage, the ACTIVITY PORTRAIT may provide advantageous information for objective measure of the Monitored Person's functionality and health status.

For example, during a recovery period at home or in a care center, a post-stroke patient might be given a daily cognition test to confirm that the patient's mental function has stabilized or is improving over time. The ACTIVITY PORTRAIT may be used synergistically to track quantity and quality of sleeping, eating, and movement within the residential space. The combination of activity and mental measures may then be analyzed, such that a subjective measure of mental status like depression may be correlated with more objectively derived environmental measures before undergoing trend analysis. Moreover, administration of a pharmaceuticals or installation of medical devices may be objectively evaluated for its effect on the ACTIVITY PORTRAIT of an individual, using suitable activity event correlation and trend analysis.

By way of illustration regarding an ACTIVITY PORTRAIT, with explanatory reference to certain of the embodiments and applications described herein, the system preferably creates for wellness monitoring a dataset for each individual being monitored. As illustrated in FIG. 8, for instance, an analytical data stream reduction 802 may lead to system generation of a display component on a user interface 804 such as exemplified by the samples shown in FIGS. 4-6 and 12-14. As these samples show, the display component preferably reflects such things as recent information on the events detected by sensors, inferred events and states that pass a confidence threshold, and/or whether an event fits into the range of normalcy specific to that individual. These events may be passed through the analytical engine 2001 to yield a personalized Activity and State record(s) 2006. Such quantified description of an individual's event and state information over time, along with the learned information quantifying the typicality of patterns within this information, is preferably encompassed by that individual's ACTIVITY PORTRAIT, subject to the requirements of the particularly intended application.

Upon reviewing the novel combinations of elements disclosed in the specification and figures and the teachings herein, it will be clear to those skilled in the art that there are many ways in which the subject system and method may be implemented and applied. The above description relates to the preferred modes and example embodiments of the invention. The descriptions above are intended to illustrate possible implementations of the present invention and are not restrictive. The inventors contemplate variations and additional features and functions within the skill of the art, including advances in operational technology. Various modifications other than those discussed above may be resorted to without departing from the spirit or scope of the invention. Variations, modifications and alternatives will become apparent to the skilled artisan upon review of this disclosure. For example, equivalent elements may be substituted for those specifically shown and described. Certain features may be used independently of other features, various methods independently described may be combined, and in certain cases, particular locations of elements may be reversed or interposed, all without departing from the spirit or scope of the invention as defined in the appended claims.

What is claimed is:

1. A system for indirect event-based monitoring of a subject for well-being within a predefined unattended setting, comprising:
    a plurality of sensors disposed within the predefined setting for respectively sensing data indicative of events disparately occurring within the predefined setting;
    a record portion storing in computer readable memory a history of activity and state data corresponding to the events, the activity of the subject being defined by at least one corresponding event;
    an analytical processing engine coupled to said sensors and record portion, said analytical processing engine including a monitoring update portion programmably configured on a processor for execution to:
        collectively acquire the sensed data respectively from a selected combination of said sensors without video surveillance, wherein:
            each of said sensors in the selected combination transduces a physically measurable condition,
            at least one of said sensors in the selected combination indirectly detects activity of the subject, and is selected from the group consisting of: light sensors, energy management sensors, power use sensors, entertainment device use sensors, contact sensors, drawer opening/closing sensors, work space sensors, lighting actuation sensors, home automation sensors, glass breakage sensors, water flow sensors, moisture sensors, and pressure sensors; and,
            each of said sensors in the selected combination is situated apart from the subject and independent of subject movement;
        selectively detect the events from the sensed data according to at least one of a plurality of predetermined detection parameters, the detected events including at least one event directly sensed by a sensor configured therefor and at least one event indirectly inferred from at least one directly sensed event;
        screen the detected events according to at least one screening parameter and selectively assign one of a plurality of response conditions for each of the detected events; and,
        actuate generation of a graphic user interface displaying at least one reporting page for access by at least one authorized person, said reporting page containing a graphically rendered activity portrait indicating the response condition adaptively updated for at least one detected event occurring within a selectively defined time window, and based in part on the activity indirectly detected by the at least one sensor;
    at least one monitoring device coupled to said analytical processing engine, said monitoring device being configured to render said graphic user interface for a remotely disposed monitoring user responsive to said analytical processing engine.

2. The system as recited in claim 1, wherein said analytical processing engine further includes a system adjust portion for adjustably configuring said monitoring update portion, said system adjust portion being programmably configured on a processor for execution to:
    selectively set each of said predetermined detection parameters applicable to the detected events; and,
    selectively designate the authorized person as a responder and assigning system access limits therefor.

3. The system as recited in claim 1, further comprising at least one monitoring device remotely coupled to said analytical processing engine by a wireless communications link, said monitoring device being actuated responsive to said analytics processing portion to render said graphic user interface for the authorized person.

4. The system as recited in claim 1, wherein said predetermined detection parameters include at least one of:
an event occurrence confidence level, frequency of occurrence for a directly sensed event;
a quantitative threshold for a sensed or derived parameter value corresponding to a detected event; and,
a set of value ranges for a sensed or derived parameter value corresponding to a detected event, the set of value ranges delineating the plurality of response conditions assignable for the detected event.

5. The system as recited in claim 4, wherein said event occurrence confidence level is statistically computed for each detected event based on past history of activity related thereto.

6. The system as recited in claim 1, wherein the response conditions assignable for each detected event include at least: normal and anomalous levels.

7. The system as recited in claim 6, wherein said monitoring update portion actuates said graphic user interface to generate notification of the anomalous level of response condition for a detected event responsive to a check for prior aberrant activity related to the detected event.

8. The system as recited in claim 1, wherein the detected events include at least one of: an inferred out-of-home event, an inferred sleeping event, an inferred eating event, and an inferred quiet event; each of said inferred events being derived based on a first directly sensed event with reference to corroborating occurrence of at least a second directly sensed event consistent therewith.

9. The system as recited in claim 8, wherein at least one of said inferred events is derived based in part on:
contents of a schedule calendar coupled to said analytical processing engine; and,
communications from at least one location sensing mechanism remotely disposed from the predefined setting to said analytical processing engine.

10. A method for indirect event-based monitoring of a subject for well-being within a predefined unattended setting, comprising:
selectively installing and actuating a plurality of sensors within the predefined setting to respectively sense data indicative of disparate events occurring within the predefined setting;
storing in a computer readable memory record portion a history of activity and state data corresponding to the events, the activity of the subject being defined by at least one corresponding event;
actuating an analytical processing engine coupled to access said sensors and record portion, executing in said analytical processing engine a monitoring update portion to:
collectively acquire the sensed data respectively from a selected combination of said sensors without video surveillance, wherein:
each of said sensors in the selected combination transduces a physically measurable condition,
at least one of said sensors in the selected combination indirectly detects activity of the subject, and is selected from the group consisting of: light sensors, energy management sensors, power use sensors, entertainment device use sensors, contact sensors, drawer opening/closing sensors, work space sensors, lighting actuation sensors, home automation sensors, glass breakage sensors, water flow sensors, moisture sensors, and pressure sensors; and,
each of said sensors in the selected combination is situated apart from the subject and independent of subject movement;
selectively detect the events from the sensed data according to at least one of a plurality of predetermined detection parameters, the detected events including at least one event directly sensed by a sensor configured therefor and at least one event indirectly inferred from at least one directly sensed event;
screen the detected events according to at least one screening parameter and selectively assign one of a plurality of response conditions for each of the detected events; and,
actuate generation of a graphic user interface displaying at least one reporting page for access by at least one authorized person, said reporting page containing a graphically rendered activity portrait indicating the response condition adaptively updated for at least one detected event occurring within a selectively defined time window, and based in part on the activity indirectly detected by the at least one sensor;
establishing at least one monitoring device coupled to said analytical processing engine; and,
configuring said monitoring device for actuation responsive to said analytical processing engine to render said graphic user interface for a remotely disposed monitoring user.

11. The method as recited in claim 10, wherein said analytical processing engine executes a system adjust portion for adjustably configuring said monitoring update portion, said system adjust portion:
selectively setting each of said predetermined detection parameters applicable to the detected events; and,
selectively designating the authorized person as a responder and assigning system access limits therefor.

12. The method as recited in claim 11, wherein said predetermined detection parameters include at least one of:
an event occurrence confidence level, frequency of occurrence for a directly sensed event;
a quantitative threshold for a sensed or derived parameter value corresponding to a detected event; and,
a set of value ranges for a sensed or derived parameter value corresponding to a detected event, the set of value ranges delineating the plurality of response conditions assignable for the detected event.

13. The method as recited in claim 12, wherein said event occurrence confidence level is statistically computed for each detected event based on past history of activity related thereto.

14. The method as recited in claim 11, wherein:
the response conditions assignable for each detected event include at least: normal and anomalous levels; and,
said graphic user interface is actuated to generate notification of the anomalous level of response condition for a detected event responsive to a check for prior aberrant activity related to the detected event.

15. The method as recited in claim 11, wherein:
the detected events include at least one of: an inferred out-of-home event, an inferred sleeping event, an inferred eating event, and an inferred quiet event; each of said inferred events being derived based on a first directly sensed event with reference to corroborating occurrence of at least a second directly sensed event consistent therewith; and, at least one of said inferred events is derived based in part on:
contents of a schedule calendar coupled to said analytical processing engine; and,
communications from at least one location sensing mechanism remotely disposed from the predefined setting to said analytical processing engine.

16. A system for indirect event-based monitoring of a subject for well-being within a monitored environment, comprising:
a plurality of sensors disposed within the monitored environment for respectively sensing data indicative of events disparately occurring within the monitored environment;
a record portion storing in computer readable memory a history of activity and state data corresponding to the events, the activity of the subject being defined by at least one corresponding event; and,
an analytical processing engine coupled to said sensors and record portion, said analytical processing engine including a monitoring update portion programmably configured on a processor for execution to:
collectively acquire the sensed data respectively from a selected combination of said sensors without video surveillance, wherein:
each of said sensors in the selected combination transduces a physically measurable condition,
at least one of said sensors in the selected combination indirectly detects activity of the subject, and is selected from the group consisting of: light sensors, energy management sensors, power use sensors, entertainment device use sensors, contact sensors, drawer opening/closing sensors, work space sensors, lighting actuation sensors, home automation sensors, glass breakage sensors, water flow sensors, moisture sensors, and pressure sensors; and,
each of said sensors in the selected combination is situated apart from the subject and independent of subject movement;
selectively detect the events from the sensed data according to at least one of a plurality of predetermined detection parameters, the detected events including at least one event directly sensed by a sensor configured therefor and at least one event indirectly inferred from at least one directly sensed event;
screen the detected events according to at least one screening parameter and selectively assign one of a plurality of response conditions for each of the detected events, said response conditions including at least: normal and anomalous levels;
actuate generation of a graphic user interface displaying a reporting page for access by a plurality of authorized persons, said reporting page containing a graphically rendered activity portrait concurrently indicating occurrences of at least one detected event and the response condition adaptively updated therefor within a selectively defined time window, and based in part on the activity indirectly detected by the at least one sensor; and,
a system adjust portion for adjustably configuring said monitoring update portion, said system adjust portion being programmably configured on a processor for execution to:
selectively set each of said predetermined detection parameters applicable to the detected events; and,
selectively designate the authorized persons as responders and selectively assign system access limits therefor; and,
at least one monitoring device coupled to said analytical processing engine, said monitoring device being configured to render said graphic user interface for a remotely disposed monitoring user responsive to said analytical processing engine.

17. The system as recited in claim 16, further comprising at least one monitoring device remotely coupled to said analytical processing engine by a wireless communications link, said monitoring device being actuated responsive to said analytics processing portion to render said graphic user interface for one of the authorized persons.

18. The system as recited in claim 17, wherein said predetermined detection parameters include at least one of:
an event occurrence confidence level;
a frequency of occurrence for a directly sensed event;
a quantitative threshold for a sensed or derived parameter value corresponding to a detected event; and,
a set of value ranges for a sensed or derived parameter value corresponding to a detected event, the set of value ranges delineating the plurality of response conditions assignable for the detected event.

19. The system as recited in claim 17, wherein:
the detected events include at least one of: an inferred out-of-home event, an inferred sleeping event, an inferred eating event, and an inferred quiet event; each of said inferred events being derived based on a first directly sensed event with reference to corroborating occurrence of at least a second directly sensed event consistent therewith;
at least one of said inferred events is derived based in part on:
contents of a schedule calendar coupled to said analytical processing engine;
communications from at least one location sensing mechanism remotely disposed from the monitored environment to said analytical processing engine; and,
said monitoring update portion actuates said graphic user interface to generate notification of the anomalous level of response condition for a detected event responsive to a check for prior aberrant activity related to the detected event.

* * * * *